(12) United States Patent
Akintola et al.

(10) Patent No.: US 10,370,266 B2
(45) Date of Patent: Aug. 6, 2019

(54) CROSS-LINKED POLYMERIC RESIN AND METHODS FOR WASTEWATER TREATMENT

(71) Applicant: KING FAHD UNIVERSITY OF PETROLEUM AND MINERALS, Dhahran (SA)

(72) Inventors: Oluwafemi S. Akintola, Dhahran (SA); Tawfik Abdo Saleh Awadh, Dhahran (SA); Mazen Mohammad Khaled, Dhahran (SA); Othman Charles Sadeq Al Hamouz, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 540 days.

(21) Appl. No.: 15/163,360

(22) Filed: May 24, 2016

(65) Prior Publication Data
US 2017/0341955 A1 Nov. 30, 2017

(51) Int. Cl.
*C08G 12/40* (2006.01)
*C08G 12/06* (2006.01)
(Continued)

(52) U.S. Cl.
CPC ............. *C02F 1/285* (2013.01); *B01J 20/262* (2013.01); *B01J 20/264* (2013.01); *B01J 20/267* (2013.01); *B01J 20/3085* (2013.01); *B01J 20/3425* (2013.01); *B01J 20/3475* (2013.01); *C08G 12/043* (2013.01); *C08G 12/40* (2013.01); *C08G 73/0206* (2013.01); *C02F 2101/20* (2013.01);
(Continued)

(58) Field of Classification Search
None
See application file for complete search history.

(56) References Cited

U.S. PATENT DOCUMENTS 3,935,098 A * 1/1976 Oda ........................ B01D 53/64
210/688
5,164,095 A 11/1992 Sparapany et al.

FOREIGN PATENT DOCUMENTS

SU 635094 A1 11/1978

OTHER PUBLICATIONS

O.Akintola, et al., "Removal of mercury (II) via a novel series of cross-linked plydithiocarbamates" Journal of the Taiwan Institute of Chemincal Engineers, Dec. 2015, pp. 1-15.
(Continued)

*Primary Examiner* — Jonathan M Peo
(74) *Attorney, Agent, or Firm* — Oblon, McClelland, Maier & Neustadt, L.L.P.

(57) ABSTRACT

A cross-linked polymeric resin which contains reacted monomer units of an aniline, a diaminoalkane, and an aldehyde, and which is functionalized with at least one dithiocarbamate moiety. A process for producing the cross-linked polymeric resin whereby an aniline and a diamino-alkane are linked together by Mannich-type polycondensation reactions with an aldehyde. The resulting Mannich-type polycondensation product is converted into the cross-linked polymeric resin through functionalization of one or more amine functional groups with dithiocarbamate moieties. A method for removing heavy metals, such as Hg(II), from an aqueous solution, whereby the cross-linked polymeric resin is contacted with the aqueous solution, and the heavy metal is thus adsorbed onto the cross-linked polymeric resin.

20 Claims, 23 Drawing Sheets

(51) Int. Cl.
*C08G 12/08* (2006.01)
*C02F 1/28* (2006.01)
*B01J 20/26* (2006.01)
*B01J 20/30* (2006.01)
*B01J 20/34* (2006.01)
*C08G 12/04* (2006.01)
*C08G 73/02* (2006.01)
*C02F 101/20* (2006.01)

(52) U.S. Cl.
CPC .......... *C02F 2303/16* (2013.01); *C08G 12/06* (2013.01); *C08G 12/08* (2013.01)

(56) References Cited

OTHER PUBLICATIONS

A.El-Shekeil, et al., "Synthesis and electrical conductivity of some poly[4-amino-2,6-pyrimidinodi-thiocarbamate]-metal complexes" Polymers for Advanced Technologies, vol. 10, Issue 3, pp. 146-150.

* cited by examiner

CROSS-LINKED POLYMERIC RESIN AND METHODS FOR WASTEWATER TREATMENT

CROSS REFERENCE TO RELATED APPLICATIONS

This application is related to U.S. Provisional Application No. 62/263,116 filed Dec. 4, 2015, which is incorporated herein by reference in its entirety.

BACKGROUND OF THE INVENTION

Technical Field

The present disclosure relates to cross-linked polymeric resins comprising anilines linked together with dithiocarbamate alkyl chains. Additionally, the present disclosure relates to applications of these cross-linked polymeric resins as agents for the removal of heavy metals, such as Hg(II) from aqueous solutions and compositions.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Throughout the last century water contamination by toxic heavy metal ions has continued to be a problem for scientists and the world in general. The aquatic environment continues to be under siege of eventual exposure to these hazardous substances due to anthropogenic factors. A particular attention is drawn towards mercury as it is considered the most toxic heavy metal after plutonium [Lu W, Singh A K, Khan S A, Senapati D, Yu H, Ray PC. Gold nano-popcorn-based targeted diagnosis, nanotherapy treatment, and in situ monitoring of photothermal therapy response of prostate cancer cells using surface-enhanced Raman spectroscopy. Journal of the American Chemical Society. 2010; 132(51):18103-18114.—incorporated herein by reference in its entirety]. The bivalent form of mercury, Hg(II), is soluble and thus pollutes underground, fresh and sea water and even soil. As a result, consumption of some of these water and seafood from them leads to bioaccumulation which affects the brain, liver, kidney and lungs of humans through mercury poisoning [Farrukh A, Akram A, Ghaffar A, Hanif S, Hamid A, Duran H, et al. Design of Polymer-Brush-Grafted Magnetic Nanoparticles for Highly Efficient Water Remediation. ACS applied materials & interfaces. 2013; 5(9):3784-3793.—incorporated herein by reference in its entirety]. Mercury is also known to cause devastating developmental defects in children whose mothers were exposed to mercury poisoning during pregnancy [Grandjean P, Bellinger D, Bergman Å, Cordier S, Davey-Smith G, Eskenazi B, et al. The Faroes Statement: Human Health Effects of Developmental Exposure to Chemicals in Our Environment. Basic & Clinical Pharmacology & Toxicology. 2008; 102(2):73-75.—incorporated herein by reference in its entirety]. In general, mercury contamination, even in minute levels, poses great threats to the aquatic habitat and to humans [Klerks P L, Weis J S. Genetic adaptation to heavy metals in aquatic organisms: A review. Environmental Pollution. 1987; 45(3): 173-205.—incorporated herein by reference in its entirety].

In order to draw attention to mercury contamination as a worldwide problem, institutions established by international organizations such as the European Union (EU) and the United Nations (UN) have classified mercury and its derivatives as priority hazardous materials [OJEC D. 60/EC of the European Parliament and of the Council of 23 Oct. 2000 establishing a framework for Community action in the field of water policy. Official Journal of the European Communities. 2000; 22; and International Programme on Chemical Safety. Concise International Chemical Assessment Document 50: Elemental mercury and inorganic mercury compounds: Human health aspects. http://www.who.int/ipcs/publications/cicad/cicads.—each incorporated herein by reference in its entirety]. According to the World Health Organization (WHO), the recommended maximum acceptable level of Hg(II) in drinking water is 1 µg/L while a maximum weekly uptake of 0.3 mg/L is advised [Zhang F-S, Nriagu J O, Itoh H. Mercury removal from water using activated carbons derived from organic sewage sludge. Water Research. 2005; 39(2):389-395.—incorporated herein by reference in its entirety]. However, despite the efforts by several international organizations towards creating awareness about the detrimental effects of mercury pollution, irresponsible human activities such as waste incineration, coal burning and mining as well as natural occurrences such as volcanic eruptions and oceanic emissions remain the major sources of mercury pollution [Wagner-Döbler I, Von Canstein H, Li Y, Timmis K N, Deckwer W-D. Removal of mercury from chemical wastewater by microorganisms in technical scale. Environmental science & technology. 2000; 34(21):4628-4634.—incorporated herein by reference in its entirety].

Several methods like adsorption, screening, filtration, flotation, sedimentation/gravity separation, precipitation, oxidation, reverse osmosis, coagulation, evaporation, solvent extraction, distillation, crystallization, ion exchange, electrodialysis, centrifugation, electrolysis, etc. have been developed and used for water and/or wastewater treatment. However, compared to other methods, adsorption remains the most desirable due to the ease of obtaining a wide range of adsorbents which are highly efficient, cost effective, environmentally friendly and easier to use compared to other methods [Ali S A, Al Hamouz O C S, Hassan N M. Novel cross-linked polymers having pH-responsive amino acid residues for the removal of Cu2+ from aqueous solution at low concentrations. Journal of Hazardous Materials. 2013; 248-249:47-58; and Tao Y, Ye L, Pan J, Wang Y, Tang B. Removal of Pb(II) from aqueous solution on chitosan/TiO2 hybrid film. Journal of Hazardous Materials. 2009; 161(2-3):718-722; and Denizli A, Kesenci K, Arica Y, Pişkin E. Dithiocarbamate-incorporated monosize polystyrene microspheres for selective removal of mercury ions. Reactive and Functional Polymers. 2000; 44(3):235-243; and Ali I. New Generation Adsorbents for Water Treatment. Chemical Reviews. 2012; 112(10):5073-5091.—each incorporated herein by reference in its entirety]. However, efficient adsorption is contingent on the use of an efficient adsorbent there is thus a need for continuing research and development in the field.

For heavy metal removal via adsorption from aqueous media, designing an efficient adsorbent is the most important factor. A wide range of adsorbent materials exist amongst which organic polymers remain one of the most relevant. The performance of an adsorbent material, including polymers, is largely dependent on the type of functionality it carries. The presence of chelating functionalities such as thiocarbamate, thiol, carbonyl, phosphoryl and amine moieties is known to enhance the performance of materials towards heavy metal ions removal from aqueous media [Jal P K, Patel S, Mishra B K. Chemical modification of silica surface by immobilization of functional groups for extractive concentration of metal ions. Talanta. 2004; 62(5):1005-1028.—incorporated herein by reference in its entirety]. These moieties have a known ability to form strong complexes with heavy metal ions. For instance, sulfur containing moieties such as thiocarbamate, thiol, mercaptobenzothiazole, benzoylthiourea, etc. are known to be effective for Hg(II) ion removal from aqueous media due to the divalent ion's special affinity towards sulfur and its compounds [Merrifield J D, Davids W G, MacRae J D, Amirbahman A. Uptake of mercury by thiol-grafted chitosan gel beads. Water research. 2004; 38(13):3132-3138; and Parham H, Zargar B, Shiralipour R. Fast and efficient removal of mercury from water samples using magnetic iron oxide nanoparticles modified with 2-mercaptobenzothiazole. Journal of hazardous materials. 2012; 205:94-100; and Antochshuk V, Olkhovyk O, Jaroniec M, Park I-S, Ryoo R. Benzoylthiourea-modified mesoporous silica for mercury (II) removal. Langmuir. 2003; 19(7):3031-3034; and Hutchison A R, Atwood D A. Mercury pollution and remediation: the chemist's response to a global crisis. Journal of chemical crystallography. 2003; 33(8):631-645.—each incorporated herein by reference in its entirety].

For decades, scientists have successfully designed organic polymers bearing sulfur containing moieties, one of which is the dithiocarbamate (DTC) moiety. Although, recent research has focused mainly on nanoparticles and natural/synthetic composites with surfaces modified or grafted with dithiocarbamates, some recent work on organic dithiocarbamate modified polymers (DTCPs) exists [Cheng X, Cheng R, Ou S, Li Y. Synthesis and adsorption performance of dithiocarbamate-modified glycidyl methacrylate starch. Carbohydrate Polymers. 2013; 96(1):320-325; and Liu L, Wu J, Li X, Ling Y. Synthesis of poly(dimethyl dialkylammonium chloride-co-acrylamide)-graft-triethylenetetramine-dithiocarbamate and its removal performance and mechanism of action towards heavy metal ions. Separation and Purification Technology. 2013; 103(0):92-100.—each incorporated herein by reference in its entirety]. The usual route to production of DTCPs is by the conversion of the primary or secondary amine functionality of an existing polymer [Kobayashi N, Osawa A, Fujisawa T. Sulfur-containing Polymers. XIII. The Synthesis and Properties of Soluble Polydithiocarbamates. Bulletin of the Chemical Society of Japan. 1974; 47(9):2287-2291; and Gaur J, Jain S, Bhatia R, Lal A, Kaushik N K. Synthesis and characterization of a novel copolymer of glyoxal dihydrazone and glyoxal dihydrazone bis (dithiocarbamate) and application in heavy metal ion removal from water. Journal of thermal analysis and calorimetry. 2013; 112(2): 1137-1143.—each incorporated herein by reference in its entirety]. A typical production of a DTCP was demonstrated by Liu and coworkers. A copolymer of dimethyldiallylammonium chloride and acrylamide was synthesized and grafted with triethylenetetramine where the amine groups were converted to DTC groups. A typical reaction mixture of such conversions yields a dithiocarbamate polymer solution which can easily be precipitated with acetone [Ward W J. Polymers for chemical treatment and precipitation of soluble metal cyanide and oxoanion compounds from waste water. Google Patents; 2000; and Almirall E, Fragoso A, Cao R. Molecular recognition of a self-assembled monolayer of a polydithiocarbamate derivative of β-cyclodextrin on silver 1. Electrochemistry Communications. 1999; 1(1): 10-13.—each incorporated herein by reference in its entirety].

In view of the forgoing, one object of the present disclosure is to provide cross-linked polymeric resins formed from aniline and diaminoalkane monomers linked together by an aldehyde which maximizes the amine functionality by linking two amine monomers which can easily be converted to a high number of adsorptive moieties, such as at least one dithiocarbamate. Another object of the present disclosure is to provide a process for producing the cross-linked polymeric resins by the use of a Mannich-type polycondensation between an aniline compound and a diaminoalkane compound in the presence of an aldehyde and further functionalization of amine moieties to dithiocarbamates. In addition to the cross-linked polymeric resins and methods for their preparation, the present disclosure further aims to provide methods for efficiently removing heavy metals, specifically Hg(II) ions, from an aqueous solution by employing the adsorbent properties of the cross-linked polymeric resins described herein.

BRIEF SUMMARY OF THE INVENTION

According to a first aspect, the present disclosure relates to a cross-linked polymeric resin of formula (I)

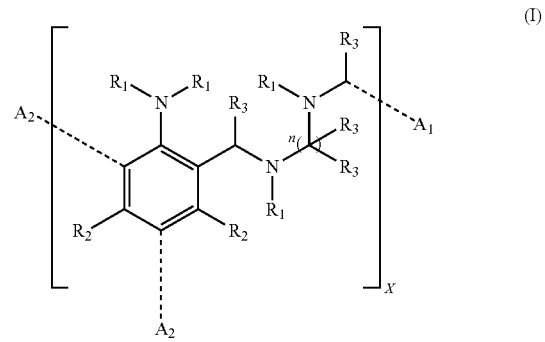

or a salt, solvate, tautomer or stereoisomer thereof wherein i) each $R_1$ is independently —H, —$CS_2^-Z^+$, an optionally substituted alkyl, an optionally substituted cycloalkyl, or an optionally substituted aryl with the proviso that at least one $R_1$ is —$CS_2^-Z^+$, ii) each $R_2$ is independently —H, —F, —Cl, —Br, —CN, —$OR_3$, an optionally substituted alkyl, an optionally substituted cycloalkyl, or an optionally substituted aryl, iii) each $R_3$ is independently —H, an optionally substituted alkyl, an optionally substituted cycloalkyl, or an optionally substituted aryl, iv) Z is —H, or an alkali metal counter ion, v) n is a positive whole number in the range of 2-16, vi) X is a positive whole number, and vii) $A_1$ forms a bond to $A_2$.

In one embodiment, each $R_1$ is —$CS_2^-Z^+$.

In one embodiment, $R_1$ is —$CS_2^-K^+$, $R_2$ is —H, and $R_3$ is —H and the cross-linked polymeric resin of formula (I) is

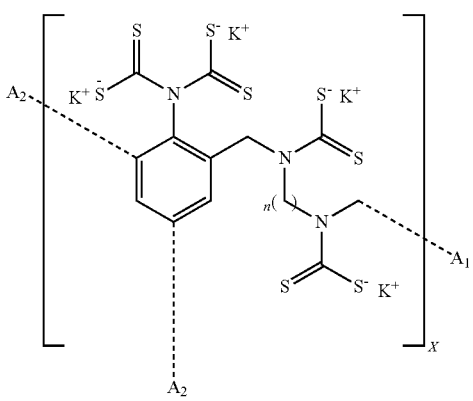

or a salt, solvate, tautomer or stereoisomer thereof wherein i) n is a positive whole number in the range of 4-12, ii) X is a positive whole number, and iii) $A_1$ forms a bond to $A_2$.

In one embodiment, the cross-linked polymeric resin is in the form of polyhedral nanometer sized structures having an average width in the range of 10 to 30 nm and an average height in the range of 4-16 Å.

In one embodiment, the cross-linked polymeric resin has a BET surface area in the range of 2.0 to 15.0 m² g⁻¹.

According to a second aspect, the present disclosure relates to a process for producing the cross-linked polymeric resin comprising i) reacting an aniline compound with a diaminoalkane compound in the presence of an aldehyde to form the cross-linked polymeric resin wherein $R_1$ is —H and ii) reacting the cross-linked polymeric resin wherein $R_1$ is —H with carbon disulfide in the presence of an alkali metal hydroxide to form the cross-linked polymeric resin wherein at least one $R_1$ is —$CS_2^-Z^+$.

In one embodiment, the molar ratio of the aldehyde to the aniline is in the range of 4:1 to 8:1.

In one embodiment, the molar ratio of the diaminoalkane to the aniline is in the range of 1:1 to 5:1.

In one embodiment, the aniline compound is aniline, the aldehyde is paraformaldehyde and the diaminoalkane is at least one selected from the group consisting of 1,4-diaminobutane, 1,6-diaminohexane, 1,8-diaminooctane, 1,10-diaminodecane, and 1,12-diaminododecane.

According to a third aspect, the present disclosure relates to a method for removing a heavy metal from an aqueous solution comprising i) contacting the cross-linked polymeric resin with the aqueous solution comprising at least one heavy metal and ii) adsorbing the heavy metal onto the cross-linked polymeric resin to form a heavy metal loaded cross-linked polymeric resin.

In one embodiment, the method further comprises i) desorbing the heavy metal from the heavy metal loaded cross-linked polymeric resin by treating with an acid to reform the cross-linked polymeric resin and ii) reusing the cross-linked polymeric resin up to 15 times without a loss in adsorption capacity.

In one embodiment, the heavy metal is at least one ion selected from the group consisting of Hg, Cu, Zn, Mn, Fe, and Ni.

In one embodiment, the heavy metal is Hg(II).

In one embodiment, the cross-linked polymeric resin has an adsorption capacity in the range of 15-35 mg of heavy metal per g of the cross-linked polymeric resin.

In one embodiment, the aqueous solution has a pH in the range of 2 to 8.

In one embodiment, the aqueous solution has an initial heavy metal concentration in the range of 0.05 mmol L⁻¹ to 1.0 mmol L⁻¹.

In one embodiment, the cross-linked polymeric resin is present at a concentration in the range of 0.02-5 g of resin per L of the aqueous solution during the contacting.

In one embodiment, the cross-linked polymeric resin is contacted with the aqueous solution for 0.1 to 24 hours.

In one embodiment, the contacting is performed at a temperature in the range of 20° C. to 60° C.

In one embodiment, greater than 90% of the total mass of the heavy metal is removed from the solution.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
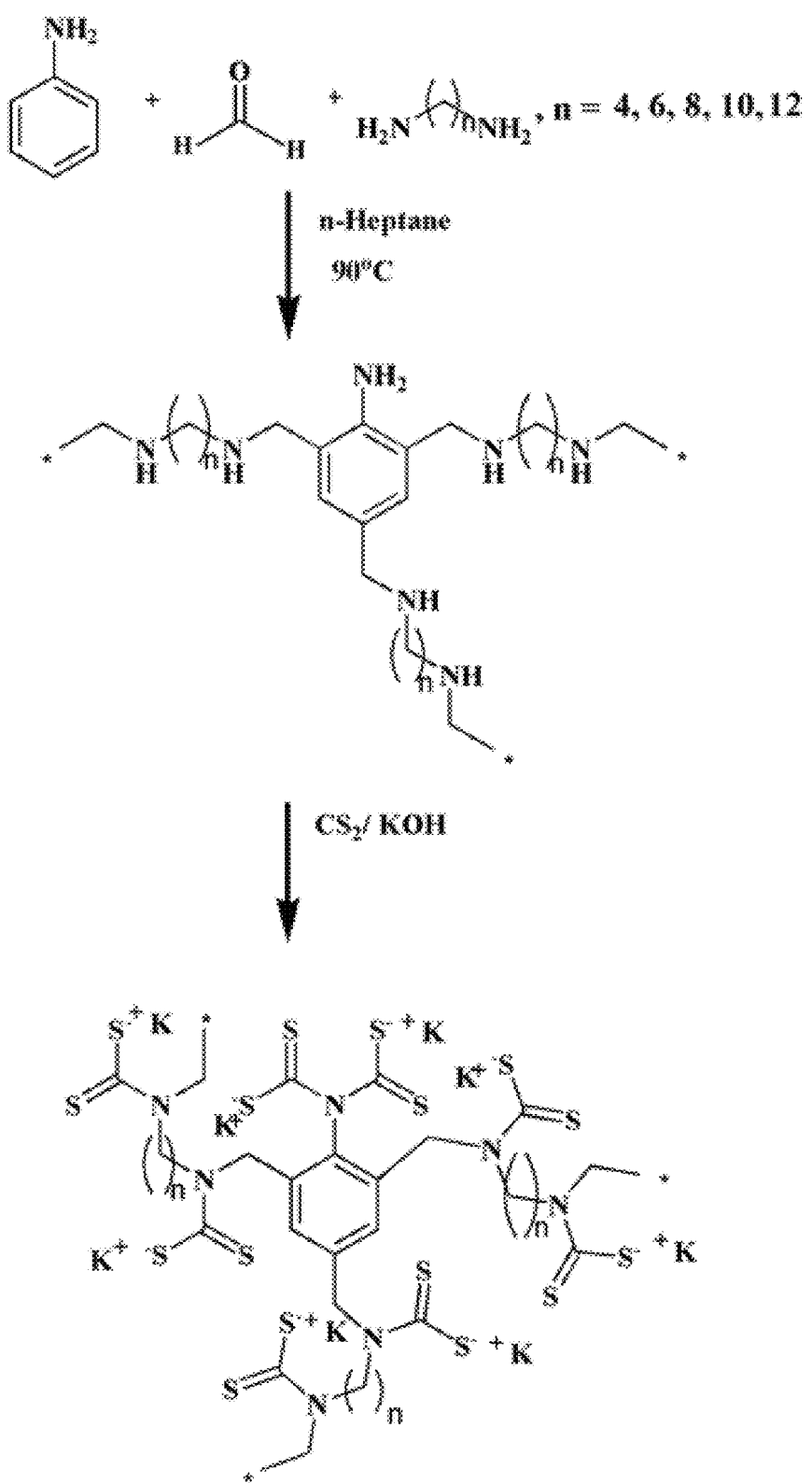
FIG. 1 is a synthetic scheme for the production of a series of dithiocarbamate modified cross-linked polymeric resins of formula (I) wherein $R_1$ is —$CS_2^-Z^+$ from the reaction of aniline and a series of diaminoalkanes in the presence of paraformaldehyde to form a series of precursor terpolymer amino cross-linked polymeric resins of formula (I) wherein $R_1$ is —H followed by subsequent conversion of the amine groups to dithiocarbamates.

Referring now to the drawings. Embodiments of the present disclosure will now be described more fully hereinafter with reference to the accompanying drawings, in which some, but not all of the embodiments of the disclosure are shown. The present disclosure will be better understood with reference to the following definitions.

According to a first aspect, the present disclosure relates to a cross-linked polymeric resin of formula (I)

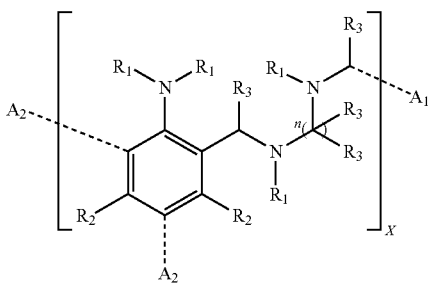

(I)

or a salt, solvate, tautomer or stereoisomer thereof wherein i) each $R_1$ is independently —H, —$CS_2^-Z^+$, an optionally substituted alkyl, an optionally substituted cycloalkyl, or an optionally substituted aryl with the proviso that at least one $R_1$ is —$CS_2^-Z^+$, ii) each $R_2$ is independently H, —F, —Cl, —Br, —CN, —$OR_3$, an optionally substituted alkyl, an optionally substituted cycloalkyl, or an optionally substituted aryl, iii) each $R_3$ is independently —H, an optionally substituted alkyl, an optionally substituted cycloalkyl, or an optionally substituted aryl, iv) Z is —H, or an alkali metal counter ion, v) n is a positive whole number in the range of 2-16, vi) X is a positive whole number, and vii) $A_1$ forms a bond to $A_2$.

The cross-linked polymeric resin of the present disclosure is generally described as central aniline units linked via the ortho, para or mixtures thereof sites of the aniline phenyl ring to another ortho, para or mixtures thereof site of an additional aniline unit through diaminoalkane chains with n representing repeating alkyl $(CR_3R_3)_n$ groups of varying length through a mannich type polycondensation with an aldehyde forming a $CHR_3$ linker. At least one of the amine sites on the aniline amino group or diaminoalkane chain is then converted to at least one dithiocarbamate. Formula (I) may represent the smallest repeating unit of the cross-linked polymeric resin with $A_1$ forming a bond to an $A_2$ group of another aniline core (ortho, para, or mixtures thereof) or central unit As used herein a "polymer" or "polymeric resin" refers to a large molecule or macromolecule, of many repeating subunits and/or substances composed of macromolecules. As used herein a "monomer" refers to a molecule or compound that may bind chemically to other molecules to form a polymer. As used herein the term "repeat unit" or "repeating unit" refers to a port of the polymer or resin whose repetition would produce the complete polymer chain (excluding the end groups) by linking the repeating units together successively along the chain. The process by which monomers combine end to end to form a polymer is referred to herein as "polymerization" or "polycondensation", monomers are molecules which can undergo polymerization, thereby contributing constitutional repeating units to the structures of a macromolecule or polymer. As used herein "resin" or "polymeric resin" refers to a solid or highly viscous substance or polymeric macromolecule containing polymers, preferably with reactive groups. As used herein a "copolymer" refers to a polymer derived from more than one species of monomer and are obtained by "copolymerization" of more than one species of monomer. Copolymers obtained by copolymerization of two monomer species may be termed bipolymers, those obtained from three monomers may be termed terpolymers and those obtained from four monomers may be termed quarterpolymers, etc. As used herein, "cross-linking", "cross-linked" or a "cross-link" refers to polymers and resins containing branches that connect polymer chains via bonds that link one polymer chain to another. The cross-link may be an atom, a group of atoms, or a number of branch points connected by bonds, groups of atoms, or polymer chains. In the majority of cases, a cross-link is a covalent structure or covalent bond but the term may also describe sites of weaker chemical interactions, portion crystallites, and even physical interactions and entanglements. The cross-linking can alter the physical and mechanical properties of the polymer. Cross-linking may formed by chemical reactions that are initiated by heat, pressure, change in pH, and/or radiation, with or without the presence of a cross-linking agent and/or catalyst. In certain embodiments, at least one diaminoalkane or di-dithicarbamate alkane functions as a cross-linking agent for the cross-linked polymeric resin described herein. In a preferred embodiment the diaminoalkane or di-dithiocarbamate chains function as cross-linking agents or monomers.

As used herein, the terms "compound" and "complex" refer to a chemical entity, whether in the solid, liquid or gaseous phase, as well as in a crude mixture or purified and isolated form. The chemical transformations and/or reactions described herein are envisaged to proceed via standard laboratory and experimental techniques in regard to performing the reaction as well as standard purification, isolation and characterization protocols known to those of ordinary skill in the art.

As used herein, the term "salt" refers to derivatives of the disclosed compounds, monomers or polymers wherein the parent compound is modified by making acid or base salts thereof. Exemplary salts include, but are not limited to, mineral or organic acid salts of basic groups such as amines, and alkali or organic salts of acidic groups such as carboxylic acids. The salts include, but are not limited to, the conventional non-toxic salts or the thiocarbamate salts of the parent compound formed, for example, from non-toxic inorganic or organic acids. Exemplary conventional non-toxic salts include those derived from inorganic acids including, but not limited to, hydrochloric, hydrobromic, sulfuric, sulfamic, phosphoric, and nitric; and those derived from organic acids including, but not limited to, acetic, propionic, succinic, glycolic, stearic, lactic, malic, tartaric, citric, ascorbic, pamoic, maleic, hydroxymaleic, phenylacetic, glutamic, benzoic, salicyclic, sulfanilic, 2-acetoxybenzoic, fumaric, toluenesulfonic, methanesulfonic, ethane disulfonic, oxalic, isethionic and mixtures thereof and the like. Further, salts of carboxylic acid containing compounds may include cations such as lithium, sodium, potassium, magnesium, and the like. The salts of the present disclosure can be synthesized from the parent compound that contains a basic or acidic moiety by conventional chemical methods. Generally such salts can be prepared by reacting the free acid or base forms of these compounds with a stoichiometric amount of the appropriate base or acid in water or in an organic solvent, or in a mixture of the two; generally non-aqueous media like ether, ethyl acetate, ethanol, isopropanol, or acetonitrile are preferred. In a preferred embodiment, the cross-linked polymeric resin of the present disclosure may comprise one or more dithiocarbamate salts of the general formula —$CS_2^-Z^+$. In this formula, Z is a counter ion, preferably $Li^+$, $Na^+$, $K^+$, or other suitable monocation, most preferably Z is $K^+$.

As used herein, the term "solvate" refers to a physical association of a compound, monomer or polymer of this disclosure with one or more solvent molecules, whether organic or inorganic. This physical association includes hydrogen bonding. In certain instances, the solvate will be capable of isolation, for example when one or more solvent molecules are incorporated in the crystal lattice of the crystalline solid. The solvent molecules in the solvate may be present in a regular arrangement and/or a non-ordered arrangement. The solvate may comprise either a stoichiometric or nonstoichiometric amount of the solvent molecules. Solvate encompasses both solution phase and insoluble solvates. Exemplary solvates include, but are not limited to, hydrates ethanolates, methanolates, isopropanolates and mixtures thereof. Methods of solvation are generally known to those of ordinary skill in the art.

As used herein, the term "tautomer" refers to constitutional isomers of organic compounds that readily convert by the chemical reaction of tautomerization or tautomerism. The reaction commonly results in the formal migration of a hydrogen atom or proton, accompanied by a switch of a single bond and adjacent double bond. Tautomerism is a special cased of structural isomerism and because of the rapid interconversion; tautomers are generally considered to be the same chemical compound. In solutions in which tautomerization is possible, a chemical equilibrium of the tautomers will be reached. The exact ratio of the tautomers depends on several factors including, but not limited to, temperature, solvent and pH. Exemplary common tautomeric pairs include, but are not limited to, ketone and enol, enamine and imine, ketene and ynol, nitroso and oxime, amide and imidic acid, lactam and lactim (an amide and imidic tautomerism in heterocyclic rings), enamine and enamine and anomers of reducing sugars.

Prototropy or prototropic tautomerism refers to the relocation of a proton. Prototropy may be considered a subset of acid base behavior. Prototropic tautomers are sets of isomeric protonation states with the same empirical formula and total charge. Tautomerizations may be catalyzed by bases (deprotonation, formation of an enolate or delocalized anion, and protonation at a different position of the anion) and/or acids (protonation, formation of a delocalized cation and deprotonation at a different position adjacent to the cation). Two additional subcategories of tautomerization include annular tautomerism, wherein a proton can occupy two or more positions of a heterocyclic system, and ring-chain tautomerism, wherein the movement of a proton is accompanied by a change from an open structure to a ring. Valence tautomerism is a type of tautomerism in which single and/or double bonds are rapidly formed and ruptured, without migration of atoms or groups. It is distinct from prototropic tautomerism, and involves processes with rapid reorganization of bonding electrons, such as open and closed forms of certain heterocycles, such as azide-tetrazole or mesoionic munchnone-acylamino ketene. Valence tautomerism requires a change in molecular geometry unlike canonical resonance structures or mesomers. In terms of the present disclosure, the tautomerism may refer to prototropic tautomerism, annular tautomerism, ring-chain tautomerism, valence tautomerism or mixtures thereof.

As used herein, the term "stereoisomer" refers to isomeric molecules that have the same molecular formula and sequence of bonded atoms (i.e. constitution), but differ in the three-dimensional orientations of their atoms in space. This contrasts with structural isomers, which share the same molecular formula, but the bond connection of their order differs. By definition, molecules that are stereoisomers of each other represent the same structural isomer. Enantiomers are two stereoisomers that are related to each other by reflection, they are non-superimposable mirror images. Every stereogenic center in one has the opposite configuration in the other. Two compounds that are enantiomers of each other have the same physical properties, except for the direction in which they rotate polarized light and how they interact with different optical isomers of other compounds. Diastereomers are stereoisomers not related through a reflection operation, they are not mirror images of each other. These include meso compounds, cis- and trans-(E- and Z-) isomers, an non-enantiomeric optical isomers. Diastereomers seldom have the same physical properties. In terms of the present disclosure, stereoisomers may refer to enantiomers, diastereomers or both.

Conformers (rotamers), or conformational isomerism refers to a form of isomerism that describes the phenomenon of molecules with the same structural formula but with different shapes due to rotations about one or more bonds. Different conformations can have different energies, can usually interconvert, and are very rarely isolatable. There are some molecules that can be isolated in several conformations. Atropisomers are stereoisomers resulting from hindered rotation about single bonds where the steric strain barrier to rotation is high enough to allow for the isolation of the conformers. In terms of the present disclosure, stereoisomers may refer to conformers, atropisomers, or both.

In terms of the present disclosure, stereoisomers of the double bonds, ring systems, stereogenic centers, and the like can all be present in the compounds, and all such stable isomers are contemplated in the present disclosure. Cis- and trans-(or E- and Z-) stereoisomers of the compounds of the present disclosure wherein rotation about the double bond is restricted, keeping the substituents fixed relative to each other, are described and may be isolated as a mixture of isomers or as separated isomeric forms. S- and R- (or L- and D-) stereoisomers of the compounds of the present disclosure are described and may be isolated as a mixture of isomers or as separated isomeric forms. All processes or methods used to prepare compounds of the present disclosure and intermediates made therein are considered to be part of the present disclosure. When stereoisomeric products are prepared, they may be separated by conventional methods, for example by chromatography, fractional crystallization, or use of a chiral agent.

The present disclosure is further intended to include all isotopes of atoms occurring in the present compounds. Isotopes include those atoms having the same atomic number but different mass numbers. By way of general example, and without limitation, isotopes of hydrogen include deuterium and tritium. Isotopes of carbon include $^{13}C$ and $^{14}C$. Isotopically labeled compounds of the invention can generally be prepared by conventional techniques known to those skilled in the art or by processes and methods analogous to those described herein, using an appropriate isotopically labeled reagent in place of the non-labeled reagent otherwise employed.

As used herein, the term "substituted" refers to at least one hydrogen atom that is replaced with a non-hydrogen group, provided that normal valencies are maintained and that the substitution results in a stable compound. When a substituent is noted as "optionally substituted", the substituents are selected from the exemplary group including, but not limited to, halo, hydroxyl, alkoxy, oxo, alkanoyl, aryloxy, alkanoyloxy, amino, alkylamino, arylamino, arylalkylamino, disubstituted amines (e.g. in which the two amino substituents are selected from the exemplary group including, but not limited to, alkyl, aryl or arylalkyl), alkanylamino, aroylamino, aralkanoylamino, substituted alkanoylamino, substituted arylamino, substituted aralkanoylamino, thiol, alkylthio, arylthio, arylalkylthio, alkylthiono, arylthiono, aryalkylthiono, alkylsulfonyl, arylsulfonyl, arylalkylsulfonyl, sulfonamide (e.g. —SO$_2$NH$_2$), substituted sulfonamide, nitro, cyano, carboxy, carbamyl (e.g. —CONH$_2$), substituted carbamyl (e.g. —CONHalkyl, —CONHaryl, —CONHarylalkyl or cases where there are two substituents on one nitrogen from alkyl, aryl, or alkylalkyl), alkoxycarbonyl, aryl, substituted aryl, guanidine, heterocyclyl (e.g. indolyl, imidazoyl, furyl, thienyl, thiazolyl, pyrrolidyl, pyridyl, pyrimidinyl, pyrrolidinyl, piperidinyl, morpholinyl, piperazinyl, homopiperazinyl and the like), substituted heterocyclyl and mixtures thereof and the like.

As used herein, the term "alkyl" unless otherwise specified refers to both branched and straight chain saturated aliphatic primary, secondary, and/or tertiary hydrocarbons of typically $C_1$ to $C_{10}$, and specifically includes, but is not limited to, methyl, trifluoromethyl, ethyl, propyl, isopropyl, cyclopropyl, butyl, isobutyl, t-butyl, pentyl, cyclopentyl, isopentyl, neopentyl, hexyl, isohexyl, cyclohexyl, cyclohexylmethyl, 3-methylpentyl, 2,2-dimethylbutyl, and 2,3-dimethylbutyl. As used herein, the term optionally includes substituted alkyl groups. Exemplary moieties with which the alkyl group can be substituted may be selected from the group including, but not limited to, hydroxyl, amino, alkylamino, arylamino, alkoxy, aryloxy, nitro, cyano, sulfonic acid, sulfate, phosphonic acid, phosphate, or phosphonate or mixtures thereof. The substituted moiety may be either protected or unprotected as necessary, and as known to those skilled in the art.

As used herein, the term "cycloalkyl" refers to cyclized alkyl groups. Exemplary cycloalkyl groups include, but are not limited to, cyclopropyl, cyclobutyl, cyclopentyl, cyclohexyl, norbornyl, and adamantyl. Branched cycloalkyl groups such as exemplary 1-methylcyclopropyl and 2-methylcyclopropyl groups are included in the definition of cycloalkyl as used in the present disclosure.

As used herein, the term "aryl" unless otherwise specified refers to functional groups or substituents derived from an aromatic ring including, but not limited to, phenyl, biphenyl, napthyl, thienyl, and indolyl. As used herein, the term optionally includes both substituted and unsubstituted moieties. Exemplary moieties with which the aryl group can be substituted may be selected from the group including, but not limited to, hydroxyl, amino, alkylamino, arylamino, alkoxy, aryloxy, nitro, cyano, sulfonic acid, sulfate, phosphonic acid, phosphate or phosphonate or mixtures thereof. The substituted moiety may be either protected or unprotected as necessary, and as known to those skilled in the art.

According to a first aspect, the present disclosure relates to a cross-linked polymeric resin of formula (I)

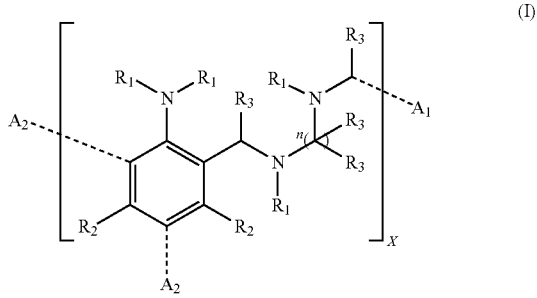

(I)

or a salt, solvate, tautomer or stereoisomer thereof wherein i) each $R_1$ is independently —H, —CS$_2^-$Z$^+$, an optionally substituted alkyl, an optionally substituted cycloalkyl, or an optionally substituted aryl with the proviso that at least one $R_1$ is —CS$_2^-$Z$^+$, ii) each $R_2$ is independently H, —F, —Cl, —Br, —CN, —OR$_3$, an optionally substituted alkyl, an optionally substituted cycloalkyl, or an optionally substituted aryl, iii) each $R_3$ is independently —H, an optionally substituted alkyl, an optionally substituted cycloalkyl, or an optionally substituted aryl, iv) Z is —H, or an alkali metal counter ion, v) n is a positive whole number in the range of 2-16, vi) X is a positive whole number, and vii) $A_1$ forms a bond to $A_2$.

In a preferred embodiment, each $R_1$ is independently —H, —CS$_2^-$Z$^+$, an optionally substituted alkyl, an optionally substituted cycloalkyl, or an optionally substituted aryl with the proviso that at least on $R_1$ is —CS$_2^-$Z$^+$, more preferably each $R_1$ is independently —H, or —CS$_2^-$Z$^+$, more preferably each $R_1$ is —H, —CS$_2^-$Li$^+$, —CS$_2^-$Na$^+$, —CS$_2^-$K$^+$ or Z is another suitable monocation or alkali metal counter ion, most preferably each $R_1$ is —H or —CS$_2^-$K$^+$. In a preferred embodiment, the ratio of $R_1$ sites where $R_1$ is —CS$_2^-$Z$^+$ to $R_1$ sites where $R_1$ is —H is greater than 0.33:1, preferably greater than 1:1, preferably greater than 3:1, preferably greater than 5:1, preferably greater than 7:1, preferably greater than 10:1, preferably greater than 20:1, preferably greater than 40:1, preferably greater than 60:1, preferably greater than 80:1, preferably greater than 100:1, preferably greater than 150:1, preferably greater than 200:1, preferably greater than 300:1, preferably greater than 400:1, preferably the ratio of $R_1$ sites where $R_1$ is —CS$_2^-$Z$^+$ to $R_1$ sites where $R_1$ is —H is greater than 500:1. In a most preferred embodiment, each $R_1$ is —CS$_2^-$Z$^+$.

In a preferred embodiment, each $R_2$ is independently —H, —F, —Cl, —Br, —CN, —OR$_3$, an optionally substituted alkyl, an optionally substituted cycloalkyl, or an optionally substituted aryl, most preferably each $R_2$ is independently —H. In a preferred embodiment, each $R_3$ is independently —H, an optionally substituted alkyl, an optionally substituted cycloalkyl, or an optionally substituted aryl, most preferably each $R_3$ is independently —H.

In a preferred embodiment, n is a positive whole number in the range of 2-16, preferably 3-14, preferably 4-12, preferably n is a positive whole number equal to 4, 6, 8, 10, or 12. In one embodiment, the value of n denotes a straight alkyl chain of CH$_2$ groups, and it is equally envisaged that this alkyl chain moiety may be optionally substituted as described herein. In a preferred embodiment, X is a positive whole number; preferably X is 1-10000, preferably 1-5000, preferably 1-2500, preferably 1-1000, preferably 1-500, preferably 2-400, preferably 3-300, preferably 4-275, preferably 5-250, preferably 10-200, preferably 15-150, preferably 20-100, preferably 25-50. In certain embodiments, the repeating unit X may be repeated in the cross-linked polymeric resin of formula (I) from 10 to 10000 times, preferably 20 to 5000 times, more preferably 25 to 2500 times, more preferably 50 to 1500 times, more preferably 100 to 1000 times. It is equally envisaged that values for X may fall outside of these ranges and still provide suitable cross-linked polymeric resin of formula (I) material.

In a more preferred embodiment, each $R_1$ is —CS$_2^-$K$^+$, each $R_2$ is —H, and each $R_3$ is H, and the cross-linked polymeric resin of formula (I) is

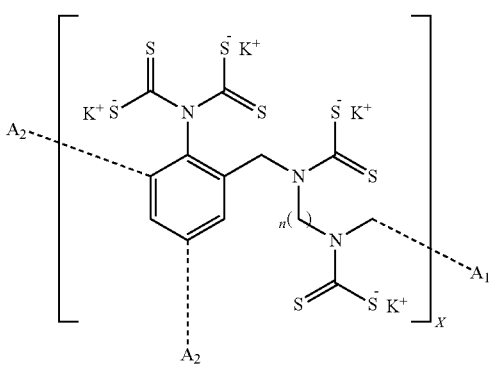

or a salt, solvate, tautomer or stereoisomer thereof wherein i) n is a positive whole number in the range of 4-12, preferably n is a positive whole number equal to 4, 6, 8, 10, or 12, ii) X is a positive whole number, preferably X is 1-10000, preferably 1-5000, preferably 1-2500, preferably 1-1000, preferably 1-500, preferably 2-400, preferably 3-300, preferably 4-275, preferably 5-250, preferably 10-200, preferably 15-150, preferably 20-100, preferably 25-50, and iii) $A_1$ forms a bond to $A_2$.

The cross-linked polymeric resin of the present disclosure is generally described as central aniline units linked via the ortho, meta, para or mixtures thereof sites of the aniline phenyl ring to another ortho, meta, para or mixtures thereof site of an additional aniline unit through diaminoalkane chains through a mannich type polycondensation with an aldehyde forming a $CHR_3$ linker. At least one of the amine sites on the aniline amino group or diaminoalkane chain is then converted to at least one dithiocarbamate. In certain embodiments, one or more of the central aniline units or aniline cores may not be fully substituted at all three positions (ortho, meta, para). For example, some aniline cores may only have a single ortho chain, or one ortho and one para chain attached, most preferably two ortho chains and one para chain attached. In certain embodiments, at least one diaminoalkane or di-dithicarbamate alkane functions as a cross-linking agent for the cross-linked polymeric resin described herein. In a preferred embodiment the diaminoalkane or di-dithiocarbamate chains function as cross-linking agents or monomers. In certain embodiments, the cross-linked polymeric resin may be additionally represented by formula (II).

(II)

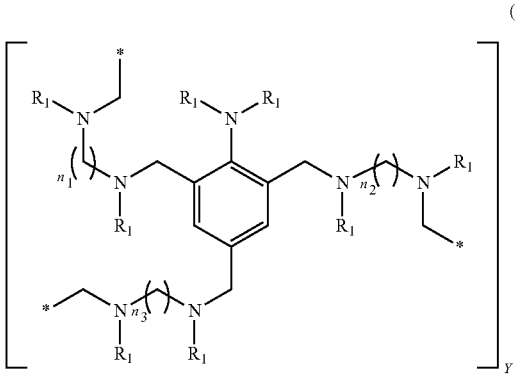

or a salt, solvate, tautomer or stereoisomer thereof wherein each $R_1$ is independently —H, —$CS_2^-Z^+$, an optionally substituted alkyl, an optionally substituted cycloalkyl, or an optionally substituted aryl with the proviso that at least on $R_1$ is —$CS_2^-Z^+$, more preferably each $R_1$ is independently —H, or —$CS_2^-Z^+$, more preferably each $R_1$ is —H, —$CS_2^-Li^+$, —$CS_2^-Na^+$, —$CS_2^-K^+$ or Z is another suitable monocation or alkali metal counter ion, most preferably each $R_1$ is —H or —$CS_2^-K^+$, each n ($n_1$, $n_2$, $n_3$) is independently a positive whole number in the range of 4-12, preferably n is a positive whole number equal to 4, 6, 8, 10, or 12, Y is a positive whole number, preferably Y is 1-10000, preferably 1-5000, preferably 1-2500, preferably 1-1000, preferably 1-500, preferably 2-400, preferably 3-300, preferably 4-275, preferably 5-250, preferably 10-200, preferably 15-150, preferably 20-100, preferably 25-50, and each (*) represents an ortho, meta, para or mixtures thereof site of an additional aniline phenyl ring. In certain embodiments, the cross-linked polymeric resin of the present disclosure may comprise multiple different values of n ($n_1 \neq n_2 \neq n_3$), in other embodiments $n_1 = n_2 \neq n_3$, $n_1 \neq n_2 = n_3$, and more preferably $n_1 = n_2 = n_3$. In a preferred embodiment, each $R_1$ is —$CS_2^-Z^+$. In a more preferred embodiment, each $R_1$ is —$CS_2^-K^+$ and the cross-linked polymeric resin of formula (II) is

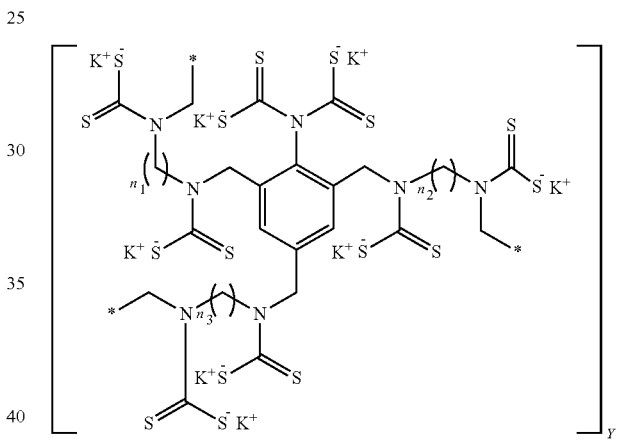

or a salt, solvate, tautomer or stereoisomer thereof wherein each n ($n_1$, $n_2$, $n_3$) is independently a positive whole number in the range of 4-12, preferably n is a positive whole number equal to 4, 6, 8, 10, or 12, Y is a positive whole number, preferably Y is 1-10000, preferably 1-5000, preferably 1-2500, preferably 1-1000, preferably 1-500, preferably 2-400, preferably 3-300, preferably 4-275, preferably 5-250, preferably 10-200, preferably 15-150, preferably 20-100, preferably 25-50, and each (*) represents an ortho, meta, para or mixtures thereof site of an additional aniline phenyl ring.

In certain embodiments, the cross-linked polymeric resin of the present disclosure may describe copolymers. Such copolymers may include, but are not limited to, copolymers of the cross-linked polymeric resin of formula (I) and other polymeric materials, copolymers wherein $n_1 \neq n_2 \neq n_3$, and/or copolymers of varying aniline and/or varying diaminoalkane monomeric units and mixtures thereof. Since a copolymer consists of at least two types of constituent units (structural units) copolymers can be classified based on how these units are arranged along the chain. Alternating copolymers are copolymers consisting of macromolecules comprising two species of monomeric units in a regular alternating sequence. An alternating copolymer may be considered as a homopolymer derived from an implicit or hypothetical monomer. A periodic copolymer is a copolymer which has two species of monomeric units arranged in a repeating sequence. A statistical copolymer is a copolymer in which the sequence of monomeric units follows a statistical rule. Alternatively if the probability of finding a specific monomeric unit at a particular point in the chain is equal to the mole fraction of that monomeric unit in the chain, then the polymer may be referred to as a truly random copolymer. In gradient copolymers the monomer composition changes gradually along the chain. The cross-linked polymeric resin of the present disclosure may refer to an alternating copolymer, a periodic copolymer, a statistical copolymer, a random copolymer or mixtures thereof.

Copolymers are also described in terms of the existence of or arrangement of branches in the polymer structure. Linear copolymers consist of a single main chain whereas branched copolymers consist of a single main chain with one or more polymeric side chains. The cross-linked polymeric resin of the present disclosure may refer to a linear copolymer, a branched copolymer, and other special types of branched copolymers including star copolymers, brush copolymer, comb copolymers and mixtures thereof.

A block copolymer is a specific type of copolymer made up of blocks of different polymerized monomers. In a block copolymer, a portion of the macromolecule comprising many constitutional units has at least one feature which is not present in the adjacent portions. Block copolymers comprise two or more homopolymer subunits linked by covalent bonds. The union of the homopolymer subunits may require an intermediate non-repeating subunit, known as a junction block. Block copolymers with two or more distinct blocks are called diblock copolymers and triblock copolymers respectively, tetrablocks and multiblocks, etc. can also be fabricated. In stereoblock copolymers a special structure can be formed from one monomer where the distinguishing feature is the tacticity of each block. The cross-linked polymeric resin of the present disclosure may describe a block copolymer, a stereoblock copolymer or mixtures thereof.

A graft macromolecule refers to a macromolecule with one or more species of block connected to the main chain as side chains, these side chains having constitutional or configurational features that differ from those in the main chain. Graft copolymers are a specific type of branched copolymer in which the side chains are structurally distinct from the main chain. For example, the main chain and side chains may be composed of distinct homopolymers; however, the individual chains of a graft copolymer may be homopolymers or copolymers. Different copolymer sequencing is sufficient to define a structural difference, thus a diblock copolymer with alternating copolymer side chains may be termed a graft copolymer. As with block copolymers, the quasi-composite graft copolymer product has properties of both "components". The cross-linked polymeric resin of the present disclosure may refer to a graft copolymer.

Polymers can be classified based on their tacticity or structure. Tacticity may be defined as the geometric arrangement (orientation) of the characteristic group (side group or side chain) of monomer units or repeating units with respect to the main chain (backbone) of the polymer. An isotactic polymer is the type of polymer in which the characteristic groups are arranged on the same side of the main chain. A syndiotactic polymer is the type of polymer in which the characteristic groups are arranged in an alternating fashion. An atactic polymer is the type of polymer in which the characteristic groups are arranged in irregular fashion (randomness) around the main chain. The cross-linked polymeric resin of the present disclosure may be isotactic, syndiotactic, atactic or copolymers and mixtures thereof.

In general, polymeric mixtures are far less miscible than mixtures of small molecules. This is a result of the driving force for mixing usually being entropy, rather than interaction energy. Miscible materials generally form a solution not because their interaction with each other is more favorable than their self-interaction, but because of an increase in entropy and hence free energy associated with increasing the amount of volume available to each component. This tends to increase the free energy of mixing for much larger polymeric molecules in polymer solutions and thus makes solvation less favorable. In dilute solution, the properties of the polymer are characterized by the interaction between the solvent and the polymer. In a good solvent, the polymer appears swollen and occupies a large volume, the intermolecular forces between the solvent and monomer subunits dominate over intramolecular interactions. In a bad solvent or poor solvent, intramolecular forces dominate and the chain contracts.

Cross-linking is often measured by swelling experiments. The cross-linked sample is placed into a good solvent at a specific temperature, and either the change in mass or the change in volume is measured. The more cross-linking, the less swelling is attainable. Based on the degree of swelling, the Flory interaction parameter (which relates the solvent interaction with the sample), and the density of the solvent, the theoretical degree of cross-linking can be calculated according to Flory's network theory. Two ASTM standards are commonly used to describe the degree of cross-linking in polymeric resins. In ASTM D2765, the samples is weighted, and then placed in a solvent for 24 hours, weight again while swollen, then dried and weighed a final time. The degree of swelling and the soluble portion can be calculated. In another ASTM standard, F2214, the sample is placed in an instrument that measures the height change in the sample, allowing the used to measure the volume change and the cross-link density can then be calculated.

A synthetic polymer may be loosely described as crystalline if it contains regions of three-dimensional ordering on atomic (rather than macromolecular) length scales, usually arising from intramolecular folding and/or stacking of adjacent chains. The cross-linked polymeric resins described herein may consist of both crystalline and amorphous regions; the degree of crystallinity may be expressed in terms of a weight fraction of volume fraction of crystalline material. The crystallinity of polymers may be characterized by their degree of crystallinity, ranging from zero for a completely non-crystalline polymer to one for a theoretical completely crystalline polymer. In a preferred embodiment, the cross-linked polymeric resin of the present disclosure exhibits a semi-crystalline nature. In a preferred embodiment, the cross-linked polymeric resin series of the present disclosure has a degree of crystallinity in the range of 0.1-0.8, preferably 0.2-0.6, preferably 0.3-0.5. Polymers with microcrystalline regions are generally tougher (can be bent more without breaking) and more impact resistant than totally amorphous polymers. Polymers with a degree of crystallinity approaching zero or one will tend to be transparent, while polymers with intermediate degrees of crystallinity will tend to be opaque due to light scattering by crystalline or glassy regions. Polymers are known to behave in as crystalline materials under X-ray when their chains are closely packed in an orderly manner. A simple explanation for this behavior in the cross-linked polymeric resin described herein may result from a high chelating ability of the polymer or dithiocarbamate moieties. Chelation of suitable monocation $Z^+$ ions, such as for example $K^+$, or chelation of $Hg^{2+}$ in between the long polymer chains may result in a form of chain stacking by inter chain chelation. In a preferred embodiment, as the value of n increases the degree of crystallinity of the cross-linked polymeric resin increases.

The size distribution, morphology, molecular structure, and properties of the cross-linked polymeric resin series described herein may vary with the value of n. Polymer morphology generally describes the arrangement and microscale ordering of polymer chains in space. In a preferred embodiment, the polymer is dispersed into small nanometer sized structures. Preferably, the polymer is dispersed with a few structures having larger sizes of comparable shape and size having polyhedral architecture as revealed by atomic force microscopy (AFM). In a preferred embodiment, these particles have a width of 5-35 nm at the base, preferably 10-30 nm, preferably 12-25 nm, preferably 15-20 nm at the base and a height of 4-16 Å, preferably 6-14 Å, preferably 7-12 Å, preferably 8-10 Å and are characterized by steep slopes correlating with diffraction edges observable by x-ray diffraction (XRD). In certain embodiments, the structure of the dispersed polymer by scanning electron microscopy (SEM) may show a single cluster of the polymer (spherical with an average diameter of 5-20 µm, preferably 6-15, preferably 8-12 µm, or about 10 µm) with polycrystalline sides and high brightness due to strong electron refractions, whereas the un-clusetered polymer structures my show a much smaller size. In a preferred embodiment, after heavy metal ion loading, such as Hg(II) loading of the cross-linked polymeric resin described herein under AFM 3D topography reveals polymer structures with a 10-40 nm base width, preferably 15-30 nm, preferably 20-25 nm base width and a height of 0.5-5.0 nm, preferably 1.0-4.0 nm, preferably 2.0-3.0 nm, or about 2.5 nm with less steep edges and the observation of larger polymer structures supported by SEM observation. In addition, the heavy metal loaded cross-linked polymeric resin may show a dark outer layer and lighter inner core where the outer layer is made of soft, peeled off polymer layers loaded with heavy metal ion (i.e. mercury). In certain embodiments, after prolonged heavy metal ion exposure phase and height images may demonstrate fully exfoliated sheets preferably having a uniform thickness of 0.5-5.0 nm, preferably 1.0-4.0 nm, preferably 1.5-3.0 nm, or about 2.0 nm in good agreement with the thickness of an individual monolayer.

The Brunauer-Emmet-Teller (BET) theory aims to explain the physical adsorption of gas molecules on a solid surface and serves as the basis for an important analysis technique for the measurement of the specific surface area of a material. Specific surface area is a property of solids which is the total surface area of a material per unit of mass, solid or bulk volume, or cross sectional area. In a preferred embodiment, the cross-linked polymeric resin of the present disclosure has a BET surface area in the range of 2.0-15.0 m$^2$ g$^{-1}$, preferably 3.0-14.0 m$^2$ g$^{-1}$, preferably 3.5-12.0 m$^2$ g$^{-1}$, preferably 4.0-11.5 m$^2$ g$^{-1}$. In certain embodiments, larger values of n in the cross-linked polymeric resins of the present disclosure lead to larger surface areas, longer chains lead to larger pores and hence larger surface area. In one embodiment, the cross-linked polymeric resin of formula (I) wherein n is 12 has a BET surface area that is at least 3 times the BET surface area of the cross-linked polymeric resin of formula (I) wherein n is 4, preferably at least 2.75 times, preferably at least 2.5 times, preferably at least 2.0 times the BET surface area of the cross-linked polymeric resin of formula (I) wherein n is 4.

According to a second aspect, the present disclosure relates to a process for producing the cross-linked polymeric resin of formula (I) described herein in any of its embodiments comprising i) reacting an aniline compound with a diaminoalkane compound in the presence of an aldehyde to form the cross-linked polymeric resin wherein $R_1$ is —H and ii) reacting the cross-linked polymeric resin wherein $R_1$ is —H with carbon disulfide in the presence of an alkali metal hydroxide to form the cross-linked polymeric resin wherein at least one $R_1$ is —$CS_2^-Z^+$.

In one step of the process an aniline compound and a series of diaminoalkanes are linked together with an aldehyde via a Mannich-type polycondensation. As used herein a polycondensation refers to a polymerization or polymer formation that is a form of step growth polymerization where molecules join together losing small molecules as byproducts such as water or methanol, preferably water. This is in contrast to addition polymerizations which often involve the reaction of unsaturated monomers. The type of end product resulting from the polycondensation is dependent on the number of functional end groups of the monomeric molecules which can react. As used herein, the Mannich reaction refers to a multicomponent organic reaction which consists of an amino alkylation of an acidic proton. In certain embodiments, the reaction starts with the formation of an iminium ion from the aldehyde and the diaminoalkane. The aniline compound is highly susceptible to electrophilic substitution reactions, this high reactivity reflecting that is it is an enamine, which enhances the electron-donating ability of the ring and can attack the iminium ion once generated, preferably at the ortho and para positions of the aniline compound.

In a preferred embodiment, the aniline compound is a compound of formula (IV)

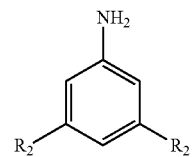

(IV)

or a salt, solvate, tautomer or stereoisomer thereof, wherein each $R_2$ is independently —H, —F, —Cl, —Br, —CN, —$OR_3$, an optionally substituted alkyl, an optionally substituted cycloalkyl, or an optionally substituted aryl, preferably each $R_2$ is —H. In a preferred embodiment, the compound of formula (IV) is

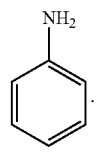

aniline

In a preferred embodiment, the diaminoalkane compound is a compound of formula (V)

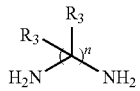

(V)

or a salt, solvate, tautomer or stereoisomer thereof, wherein each $R_3$ is independently —H, an optionally substituted alkyl, an optionally substituted cycloalkyl, or an optionally substituted aryl, preferably each $R_3$ is —H and n is a positive whole number in the range of 2-16, preferably 4-12. In a preferred embodiment the compound of formula (V) is

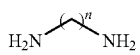

wherein n is a positive whole number in the range of 2-16, preferably 4-12, preferably wherein n is a positive whole number equal to 4, 6, 8, 10, or 12 and the diaminoalkane compound is at least one selected from the group consisting of 1,4-diaminobutane, 1,6-diaminohexane, 1,8-diaminocatane, 1,10-diaminodecane, and 1,12-diaminododecane.

In a preferred embodiment, the aldehyde is a compound of formula (VI)

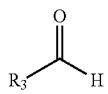

(VI)

or a salt, solvate, tautomer or stereoisomer thereof, wherein each $R_3$ is independently —H, an optionally substituted alkyl, an optionally substituted cycloalkyl, or an optionally substituted aryl, preferably each $R_3$ is —H and n is a positive whole number in the range of 2-16, preferably 4-12. In a preferred embodiment the compound of formula (VI) is

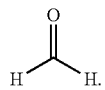

paraformaldehyde

In a preferred embodiment, the reacting of the aniline compound with the diaminoalkane is performed in a non-polar solvent, preferably n-heptane as the reaction medium. Exemplary additional non-polar solvents that may be used in addition to, or in lieu of n-heptane include, but are not limited to pentane, cyclopentane, hexane, cyclohexane, benzene, toluene, 1,4-dioxane, chloroform, diethyl ether, dichloromethane, and mixtures thereof. It is equally envisaged that the reaction may be adapted to be performed in a polar aprotic solvent (i.e. tetrahydrofuran, ethyl acetate, acetone, dimethylformamide, acetonitrile, dimethyl sulfoxide, nitromethane and propylene carbonate), a polar protic solvent (i.e. methanol, formic acid, n-butanol, isopropanol, n-propanol, ethanol, acetic acid and water), and mixtures thereof. In a preferred embodiment, the reaction is performed at a concentration of the aniline compound in the range of 0.01-1.0 M, preferably 0.05-0.80 M, preferably 0.10-0.60 M, preferably 0.20-0.40 M, preferably 0.25-0.35 M.

In a preferred embodiment, the aldehyde is present in the reaction in a molar excess to the aniline compound. In a preferred embodiment, the molar ratio of the aldehyde to the aniline compound is in the range of 4:1 to 8:1, preferably 4.5:1 to 7.5:1, preferably 5:1 to 7:1, preferably 5.5:1 to 6.5:1, or about 6:1. In a preferred embodiment, the diaminoalkane is present in the reaction in a molar equivalent or molar excess to the aniline compound. In a preferred embodiment, the molar ratio of the diaminoalkane to the aniline compound is in the range of 1:1 to 5:1, preferably 1.5:1 to 4.5:1, preferably 2:1 to 4:1, preferably 2.5:1 to 3.5:1, or about 3:1. In a preferred embodiment, the molar ratio of the aldehyde to the diaminoalkane is in the range of 1.1:1 to 4:1, preferably 1.5:1 to 3:1, preferably 1.75:1 to 2.5:1, or about 2:1.

In a preferred embodiment, the reaction is performed under mechanical stirring, preferably a magnetic stirrer at a temperature of up to 115° C., preferably 20-110° C., preferably 40-105° C., preferably 60-100° C., preferably 80-95° C., or about 90° C. and has a stirred reaction time of up to 48 hours, preferably 2-44 hours, preferably 8-38 hours, preferably 12-32 hours, preferably 18-30 hours, or about 23 hours. In a preferred embodiment, this reaction results in a resinous material that may be separated (filtered off), crushed and soaked in water for up to 48 hours, preferably up to 36 hours, preferably up to 24 hours and then filtered and dried under vacuum at 20-100° C., preferably 40-80° C., or about 60° C. until a constant weight is achieved. In a preferred embodiment, this reaction has a yield of greater than 40%, preferably greater than 45%, preferably greater than 50%, preferably greater than 60%, preferably greater than 65%, preferably greater than 70%, preferably greater than 75%, preferably greater than 80%.

In one step of the process, the cross-linked polymeric resin wherein $R_1$ is —H is reacted with carbon disulfide in the presence of an alkali metal hydroxide to form the cross-linked polymeric resin wherein at least one $R_1$ is —$CS_2^-Z^+$. The modification reaction is well known in the literature and to those of ordinary skill in the art. Many primary and secondary amines react with carbon disulfide and alkali hydroxides to form dithiocarbamate salts. In a preferred embodiment, the alkali metal hydroxide is a strong base. Exemplary alkali metal hydroxides include, but are not limited to, lithium hydroxide, sodium hydroxide, potassium hydroxide, and mixtures thereof. In a preferred embodiment, the alkali metal hydroxide is the strong base potassium hydroxide. In a preferred embodiment the cross-linked polymeric resin wherein —H is a compound of formula (VII)

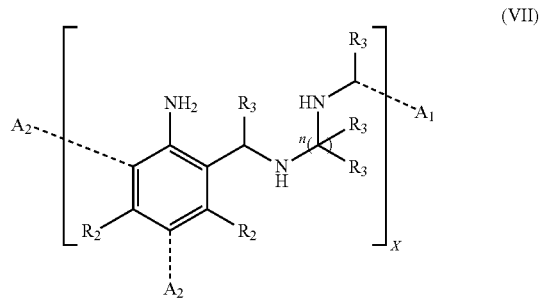

(VII)

or a salt, solvate, tautomer or stereoisomer thereof, wherein each $R_2$ is independently —H, —F, —Cl, —Br, —CN, —$OR_3$, an optionally substituted alkyl, an optionally substituted cycloalkyl, or an optionally substituted aryl, preferably each $R_2$ is —H, each $R_3$ is independently —H, an optionally substituted alkyl, an optionally substituted cycloalkyl, or an optionally substituted aryl, preferably each $R_3$ is —H, n is a positive whole number in the range of 2-16, preferably 4-12, X is a positive whole number, and $A_1$ forms a bond to $A_2$. In a preferred embodiment, the compound of formula (VII) is

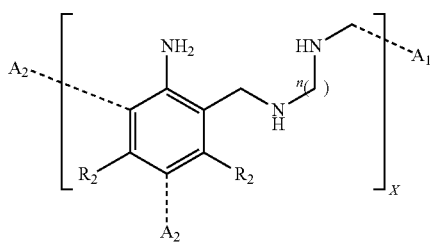

wherein n is a positive whole number in the range of 4-12, preferably wherein n is a positive whole number equal to 4, 6, 8, 10, or 12, X is a positive whole number, and $A_1$ forms a bond to $A_2$.

In a preferred embodiment, the reacting of the cross-linked polymeric resin wherein $R_1$ is —H with carbon disulfide in the presence of an alkali metal hydroxide is performed in a polar aprotic solvent, preferably dimethylformamide as the reaction medium. Exemplary additional polar aprotic solvents that may be used in addition to, or in lieu of dimethylformamide include, but are not limited to, tetrahydrofuran, ethyl acetate, acetone, acetonitrile, dimethyl sulfoxide, nitromethane, propylene carbonate, and mixtures thereof. It is equally envisaged that the reaction may be adapted to be performed in a non-polar solvent (i.e. n-heptane, pentane, cyclopentane, hexane, cyclohexane, benzene, toluene, 1,4-dioxane, chloroform, diethyl ether, and dichloromethane), a polar protic solvent (i.e. methanol, formic acid, n-butanol, isopropanol, n-propanol, ethanol, acetic acid and water), and mixtures thereof. In a preferred embodiment, the reaction is performed at a concentration of the cross-linked polymeric resin wherein $R_1$ is —H in the range of 0.1-5.0 M, preferably 0.5-4.0 M, preferably 0.75-3.0 M, preferably 1.0-2.0 M, preferably 1.25-1.50 M.

In a preferred embodiment, the carbon disulfide is present in the reaction in a molar excess to the cross-linked polymeric resin wherein $R_1$ is —H. In a preferred embodiment, the molar ratio of the carbon disulfide to the cross-linked polymeric resin wherein $R_1$ is —H is in the range of 2:1 to 12:1, preferably 4:1 to 10:1, preferably 6:1 to 8:1, or about 7:1. In a preferred embodiment, the alkali metal hydroxide is present in the reaction in a molar excess to the cross-linked polymeric resin wherein $R_1$ is —H. In a preferred embodiment, the molar ratio of the alkali metal hydroxide to the cross-linked polymeric resin wherein $R_1$ is —H is in the range of 2:1 to 12:1, preferably 4:1 to 10:1, preferably 6:1 to 8:1, or about 7:1. In a preferred embodiment, the molar ratio of the alkali metal hydroxide to the carbon disulfide is in the range of 0.5:1 to 3:1, preferably 0.75:1 to 2:1, preferably 0.9:1 to 1.5:1, or about 1:1.

In a preferred embodiment, the reaction is performed under mechanical stirring, preferably a magnetic stirrer at a temperature of up to 80° C., preferably 10-60° C., preferably 15-40° C., preferably 20-30° C., preferably 22-28° C., or about 25° C. and has a stirred reaction time of up to 96 hours, preferably 12-90 hours, preferably 18-84 hours, preferably 24-78 hours, preferably 48-75 hours, or about 72 hours to ensure complete reaction. In a preferred embodiment, this reaction results in a resinous solution that can be precipitated with a polar aprotic solvent, preferably acetone, filtered and rewashed with the aprotic solvent with the second washing kept for up to 48 hours, preferably up to 36 hours, preferably up to 24 hours to ensure removal of all unreacted material and then filtered and dried under vacuum at 20-100° C., preferably 40-80° C., or about 60° C. until a constant weight is achieved. In a preferred embodiment, this reaction has a yield of greater than 50%, preferably greater than 51%, preferably greater than 52%, preferably greater than 53%, preferably greater than 54%, preferably greater than 55%, preferably greater than 60%, preferably greater than 65%.

According to a third aspect, the present disclosure relates to a method for removing a heavy metal from an aqueous solution comprising i) contacting the cross-linked polymeric resin described herein in any of its embodiments with an aqueous solution comprising at least one heavy metal and ii) adsorbing the heavy metal onto the cross-linked polymeric resin to form a heavy metal loaded cross-linked polymeric resin.

Non-limiting examples of aqueous solutions (i.e. heavy metal contaminated aqueous solutions), water sources and systems include, but are not limited to, surface water that collects on the ground or in a stream, aquifer, river, lake, reservoir or ocean, ground water that is obtained by drilling wells, run-off, industrial water, public water storage towers, public recreational pools and/or bottled water. Methods for removing heavy metals from aqueous solutions according to the present disclosure include contacting the cross-linked polymeric resin of the present disclosure in any of its embodiments with heavy metal contaminated water sources and systems. The methods may be carried out in tanks, containers, or small scale applications in both batch mode and fixed-bed or column mode.

The heavy metal ion is preferably removed by adsorption, meaning the process is primarily physical and preferably no chemical changes are made upon the cyclopolymeric resin or the metal ion. As used herein, adsorption is the adhesion of atoms, ions or molecules from a gas, liquid, or dissolved solid to a surface. The process creates a film of an adsorbate (i.e. heavy metal ions) on the surface of an adsorbent (i.e. the cross-linked polymeric resin). This process differs from absorption, in which a fluid (the adsorbate) permeates or is dissolved by a liquid or solid (the absorbent). Adsorption is a surface-based process while absorption involves the whole volume of the material. The term sorption encompasses both processes, while, desorption is the reverse of it. As used herein, chemisorption is a kind of adsorption which involves a chemical reaction between the adsorbate and adsorbent. New chemical bonds are generated at the adsorbent surface. In contrast with chemisorption is physisorption, which leaves the chemical species of the adsorbate and adsorbent intact and the electronic structure of the atom or molecule is barely perturbed upon adsorption. In terms of the present disclosure, the adsorption may be chemisorption, physisorption, or mixtures thereof.

As used herein, a ligand refers to in coordination chemistry an ion or molecule (functional group) that binds a central metal atom to form a coordination complex. The binding between metal and ligand generally involves formal donation of one or more of the ligand's electron pairs. The nature of the metal-ligand bonding can range from covalent to ionic and the metal-ligand bond order can range from one to three. Ligands are classified in many ways including, but not limited to, size (bulk), the identity of the coordinating atom(s), the number of electrons donated to the metal (i.e. denticity or hapticity). Denticity refers to the number of times a ligand bonds to a metal through noncontiguous donor sites. Many ligands are capable of binding metal ions through multiple sites, usually because the ligands have lone pairs on more than one atom. A ligand that binds through one site is classified as monodentate, a ligand that binds through two sites is classified as bidentate, three sites as tridentate and more than one site as polydentate. Ligands that bind via more than one atom are often termed chelating. Complexes of polydentate ligands are called chelate complexes. As used herein, chelation is a particular type of way ions and molecules bind to metal ions. It involves the formation or presence of two or more coordinate bonds between a polydentate (multiple bonded) ligand and a single central atom. These ligands are often organic compounds and may be referred to as chelants, chelators, chelating agents, or sequestering agents. The chelate effect describes the enhanced affinity of chelating ligands for a metal ion compared to the affinity of a collection of similar non-chelating (i.e. monodentate) ligands for the same metal. In terms of the present disclosure, the cross-linked polymeric resin may adsorb or bind with one or more heavy metal ions by monodentate coordination, or polydentate chelation including, but not limited to bidentate chelation or tridentate chelation to the metal ion to form a heavy metal loaded cross-linked polymeric resin.

The performance of an adsorbent material, polymers inclusive, is largely dependent on the type of functionality it carries. The presence of chelating functionalities such as thiocarbamate, thiol, carbonyl, phosphoryl and amine moieties is known to enhance the performance of materials towards the removal of heavy metal ions from aqueous solutions. The moieties have a known ability to form strong complexes with heavy metal ions. In general sulfur compounds exhibit a significant affinity towards mercury (Hg). For example, sulfur containing moieties such as thiocarbamate, thiol, mercaptobenzothiazole, benzoylthiourea, etc. are known to be effective for Hg(II) removal from aqueous media due to the divalent ion's affinity towards sulfur and its compounds. The cross-linked polymeric resin of formula (I) features at least one dithiocarbamate ($R_1$ is $-CS_2^-Z^+$).

Cross-linked polymeric resins of formula (I) featuring at least one dithiocarbamate ($R_1$ is $-CS_2^-Z^+$) group, preferably a plurality of dithiocarbamate groups present in the same repeating unit. In a preferred embodiment, each repeating unit in the cross-linked polymeric resin of the present disclosure of formula (I) includes multiple ligand center or chelating centers (i.e. $-CS_2^-Z^+$, $-NH$, and the like) to which one or more heavy metal ions can be coordinated. In certain embodiments, the number of ligand centers in a repeating unit of the cyclopolymeric resin may depend on the values of X, n, or both and is in the range of 1-250, preferably 2-200, preferably 5-175, preferably 10-150, preferably 15-100, preferably 20-75, preferably 25-50.

The metal ions that are coordinated to the plurality of ligands centers (i.e. dithiocarbamate moieties) are preferably heavy metal ions. In a preferred embodiment, a heavy metal has a density of greater than 3.5 g/cm$^3$ and/or an atomic weight of greater than 20. Exemplary metal ions that can be adsorbed by the cross-linked polymeric resin of the present disclosure are of a wide range and include, but are not limited to, ions of Ag, Na, Pb, Mn, Fe, Co, Ni, Cu, Sn, Cd, Hg, Cr, Fe, As, Sb, Cr, Zn, V, Pt, Pd, Rh and mixtures thereof. Further, these metal ions may be of any oxidation state $M^{+1}$, $M^{+2}$, $M^{+3}$, etc. In a preferred embodiment, the heavy metal is at least one selected from the group consisting Hg(II), Cu(II), Zn(II), Mn(II), Fe(II) and Ni(II), most preferably the heavy metal ion is Hg(II). It is equally envisaged that the cross-linked polymeric resin may be adapted or chemically modified to adsorb, incorporate and/or bind additional metal ions in addition to, or in lieu of Hg(II) and may bind selectively or collectively. In one embodiment, the additional metal ion may be any ion which is suitably coordinated by the cross-linked polymeric resin of formula (I) in any of its embodiments. Exemplary additional metal ions include, but are not limited to, an alkali metal (Li, Na, K, etc.), and alkaline earth metal (Mg, Ca, Sr, etc.) a lanthanide metal (La, Ce, Eu, Yb, etc.) an actinide metal (Ac, Th, etc.) or a post-transition metal (Al, Sn, Pb, In, etc.). Preferably the additional metal ion is a transition metal ion, most preferably a heavy metal ion.

As used herein, the binding constant is a special case of the equilibrium constant (K or $K_a$). It is associated with the binding and unbinding reaction of receptor and ligand molecules. The reaction is characterized by the on-rate constant and the off-rate constant. In equilibrium, the forward binding transition should be balanced by the backward unbinding transition. The binding constant or association constant is defined by the on-rate constant divided by the off-rate constant or the concentration or the concentration of receptor-ligand complexes (i.e. heavy metal loaded polymeric resins) divided by the concentration of unbound free receptors and divided by the concentration of unbound free ligands. In certain embodiments, the binding of mercury ion the cross-linked polymeric resins follows a greater than 1:1 stoichiometric complex formation, preferably greater than 2:1, preferably greater than 4:1, preferably greater than 8:1, preferably greater than 25:1, preferably greater than 50:1, preferably greater than 100:1, preferably greater than 200:1. In certain embodiments, a dithiocarbamate functionality of the cross-linked polymeric resin of formula (I) in any of its embodiments has a Hg(II) binding constant in the range of $0.1 \times 10^7$ L·mol$^{-1}$ to $5.0 \times 10^7$ L·mol$^{-1}$, preferably $0.5 \times 10^7$ L·mol$^{-1}$ to $1.5 \times 10^7$ L·mol$^{-1}$, preferably $0.6 \times 10^7$ L·mol$^{-1}$ to $1.4 \times 10^7$ L·mol$^{-1}$, preferably $0.7 \times 10^7$ L·mol$^{-1}$ to $1.3 \times 10^7$ L·mol$^{-1}$, preferably $0.8 \times 10^7$ L·mol$^{-1}$ to $1.2 \times 10^7$ L·mol$^{-1}$, $0.9 \times 10^7$ L·mol$^{-1}$ to $1.1 \times 10^7$ L·mol$^{-1}$, preferably $0.95 \times 10^7$ L·mol$^{-1}$ to $1.05 \times 10^7$ L·mol$^{-1}$, or about $1.0 \times 10^7$ L·mol$^{-5}$. In a preferred embodiment, a dithiocarbamate functionality of the cross-linked polymeric resin of formula (I) in any of its embodiments has a binding constant for metal ions that are not Hg(II) in the range of 1.0 to $1.0 \times 10^{-10}$ times its Hg(II) binding constant, preferably 0.1 to $1.0 \times 10^{-9}$ times, 0.01 to $1.0 \times 10^{-8}$ times, preferably 0.001 to $1.0 \times 10^{-7}$ times 0.0001 to $1.0 \times 10^{-5}$ times its Hg(II) binding constant.

In one embodiment, the cross-linked polymeric resin of the present disclosure is effective in removing heavy metal from aqueous samples wherein the initial concentration of the heavy metal ion, preferably Hg(II) in the aqueous solution is in the range of 0.05-1.0 mmol L$^{-1}$, preferably 0.1-0.9 mmol L$^{-1}$, preferably 0.2-0.8 mmol L$^{-1}$, preferably 0.25-0.75 mmol L$^{-1}$ or alternatively 5-500 ppm, preferably 10-200 ppm, preferably 15-100 ppm, preferably 20-80 ppm. In a preferred embodiment, the cross-linked polymeric resin is present in the aqueous solution and/or contacted with the aqueous solution within a concentration range of 0.02-5.0 grams of resin per liter volume of the treated aqueous solution, preferably 0.5-4.0 g L$^{-1}$, preferably 0.75-3.0 g L$^{-1}$, preferably 1.0-2.0 g L$^{-1}$ or 1.5 g L$^{-1}$ of the resin relative to the volume of the aqueous solution.

In a preferred embodiment, the cross-linked polymeric resin of the present disclosure has an adsorption capacity of at least 5 mg of heavy metal per g of the cross-linked polymeric resin, preferably at least 10 mg of heavy metal per g of the cross-linked polymeric resin, preferably at least 15 mg g$^{-1}$, preferably at least 20 mg g$^{-1}$, preferably at least 25 mg g$^{-1}$, preferably at least 30 mg g$^{-1}$, preferably at least 35 mg g$^{-1}$, preferably at least 40 mg of heavy metal per g of the cross-linked polymeric resin. In a preferred embodiment, the cross-linked polymeric resin of the present disclosure has an adsorption capacity in the range of 15-35 mg of heavy metal per g of the cross-linked polymeric resin, preferably 18-32 mg g$^{-1}$, preferably 20-30 mg g$^{-1}$, preferably 22-28 mg of heavy metal per g (total weight) of the polymeric resin.

In certain embodiments, up to 90% of the total mass of the heavy metal present in the aqueous solution is successfully removed from the aqueous solution at the end of the adsorption process following contacting, preferably up to 89%, preferably up to 88%, preferably up to 87%, preferably up to 86%, preferably up to 85%, preferably up to 80%, preferably up to 75%, preferably up to 70%, preferably up to 65%, preferably up to 60%, preferably up to 55%, preferably up to 50%, preferably up to 45%, preferably up to 40%, preferably up to 35%, preferably up to 30%, preferably up to 25%. In a preferred embodiment, greater than 90% of the total mass of the heavy metal present in the aqueous solution is successfully removed from the aqueous solution at the end of the adsorption process following contacting, preferably greater than 92%, preferably greater than 94%, preferably greater than 95%, preferably greater than 96%, preferably greater than 97%, preferably greater than 98%, preferably greater than 99%.

There are various parameters in the method under which heavy metal ions are removed from the aqueous solution. Parameters such as contact time, pH, temperature, and adsorbent dosages can be varied and their impacts on removal efficiency noted. In a preferred embodiment, the treatment and contacting process is carried out for 0.1 to 24 hours, preferably 0.25-12 hours, preferably 0.5-10 hours, preferably 1.0-8.0 hours, preferably 1.5-6.0 hours, preferably 2.0-5.0 hours, preferably 2.5-4.0 hours. The duration needs to be long enough to ensure sufficient contact time between adsorbent polymeric materials and heavy metal; however, if the process is left to run too long it's possible desorption may start to occur, resulting in bound heavy metal ions being released from the polymeric resin. In most instances, adsorption time requirements vary based on the nature of the interaction occurring between the adsorbent and the adsorbate. Generally, the adsorption by the polymeric resin of the heavy metal will increase with time, after which there is a slight and gradual decline in the adsorption. This is explained by the adsorption equilibrium phenomenon, in which the rate of adsorption is greater than the rate of desorption until equilibrium is reached at a certain contact time. At this time, the adsorption sites on the adsorbent may be saturated. Beyond this time, the rate of desorption is greater than the rate of adsorption, accounting for the slight and gradual decline in heavy metal ion adsorption beyond an optimum time. In one embodiment, greater than 90% of the total mass of the metal ion present in the aqueous solution is successfully removed from the aqueous solution within the first 2 hours of contacting, preferably within the first 1.5 hours, preferably within the first 1.0 hour, preferably within the first 0.5 hour, preferably within the first 0.25 hour of contacting.

In a preferred embodiment, the method for removing heavy metal is carried out at an aqueous solution pH range of 2.0-8.0, preferably 2.0-7.0, preferably 3.0-7.0, preferably 3.5-6.5, preferably 4.0-6.0, preferably 4.5-6.5. In certain embodiments, the cross-linked polymeric resin of the present disclosure is effective in adsorbing heavy metal ions in an aqueous solution within a temperature range of 10-100° C., preferably 20-80° C., preferably 25-60° C., preferably 25-40° C., preferably 25-30° C. or room temperature. In a preferred embodiment, the contacting is performed at a temperature in the range of 20-60° C., preferably 25-50° C., preferably 30-45° C., preferably 32-40° C., preferably 35-38° C.

In certain embodiments, the method further comprises agitation of the aqueous solution before, during or after the contacting. The agitation may encompass shaking, stirring, rotating, vibrating, sonication and other means of increasing contact between the adsorbent and the adsorbate. Further, the agitation can be performed by hand or mechanically. In one embodiment, the treatment and contacting process may be enhanced by mechanical shaking or agitation, preferably by a bath shaker at a speed of up to 300 rpm, preferably up to 250 rpm, preferably up to 200 rpm, preferably 50-200 rpm, preferably 75-175 rpm, preferably 100-150 rpm in order to increase contact between the adsorbent (cross-linked polymeric resin) and adsorbate (heavy metal ions). Adsorption is the key mechanism of removing heavy metals in the present disclosure; a requirement is contact between the adsorbent material and the target adsorbate. There is generally an increase in the removal efficiency with increasing agitation speed until a certain level. Any poor removal of heavy metal ions at lower agitation speeds may be attributable to a lack of contact between the active adsorption sites of the polymeric resin and the heavy metal ions as adsorbents may have settled in the vessel the method is carried out in.

In a preferred embodiment, the method further comprises recovering and reusing the heavy metal loaded cross-linked polymeric resin. In certain embodiments, the cross-linked polymeric resin may be removed and recovered from the aqueous solution with methods including, but not limited to, filtration, centrifugation, evaporation, heated evaporation and the like, preferably filtration or centrifugation, most preferably filtration. In certain embodiments, the separated and recovered heavy metal loaded cross-linked polymeric resin may be washed several types with an appropriate solvent to remove all materials present after each round of heavy metal absorption before being desorbed of the heavy metal and reused and/or recycled in another round of removal of heavy metal ions from aqueous solution.

In certain embodiments, the method may further comprise i) desorbing the heavy metal loaded cross-linked polymeric resin by treating with an acid to reform the cross-linked polymeric resin and ii) reusing the cross-linked polymeric resin up to 15 times without a loss in adsorption capacity. In this manner the cross-linked polymeric resin can be recycled and/or reused in another contacting, adsorbing and removal. The a preferred embodiment, the cross-linked polymeric resin can be desorbed and reused up to 15 times without a loss in adsorption capacity, preferably up to 12 times, preferably up to 10 times, preferably up to 8 times, more preferably up to 5 times. In certain embodiments, the cross-linked polymeric resin of the present disclosure can be regenerated and reused as a heavy metal adsorbent for at least 5 cycles with minimal, if any, decrease in adsorption efficiency, no more than a 25% decrease in Hg(II) removal with each regeneration cycle, preferably no more than a 20% decrease, preferably no more than a 15% decrease, preferably no more than a 10% decrease, preferably no more than a 5% decrease, preferably no more than a 2% decrease in Hg(II) removal with each regeneration cycle.

In one embodiment, to regenerate the adsorbent, metal ions are desorbed from the cross-linked polymeric resin of formula (I) by treating or immersing the heavy metal loaded cross-linked polymeric resin in an acidic solution of 0.05-5.0 M in concentration, preferably 0.075-1.0 M, preferably 0.1-0.5 M in concentration for up to 48 hours, preferably up to 36 hours, preferably up to 24 hours, preferably up to 12 hours. Strong acids including, but not limited to, HCl, $H_2SO_4$, and $HNO_3$ are preferred, but organic acids and weak acids (i.e. acetic acid) may also be used in the desorption process, most preferably $HNO_3$.

In one embodiment, the metal ion removal or adsorption process by the cross-linked polymeric resin is an endothermic process, as indicated by a determined positive $\Delta H$ value, preferably greater than 2 kJ/mol, preferably greater than 4 kJ/mol, preferably greater than 6 kJ/mol, preferably greater than 8 kJ/mol, preferably greater than 10 kJ/mol, preferably greater than 12 kJ/mol. In one embodiment, the metal ion removal or adsorption process by the cross-linked polymeric resin is a spontaneous process as indicated by a determined negative $\Delta G$ value, preferably $-1$ to $-10$ kJ/mol, preferably $-2$ to $-5$ kJ/mol, preferably $-3$ to $-4$ kJ/mol. In certain embodiments, the rate determining and/or controlling step in the adsorption mechanism of heavy metal ion by the cross-linked polymeric resin described herein is intraparticle diffusion as modeled by the intraparticle diffusion method. The intraparticle diffusion model describes the adsorption process in three consecutive steps: film diffusion; diffusion of metal ions through a liquid film surrounding the adsorbate, intraparticle diffusion; diffusion of polymer structures through the pores of the adsorbent, and finally mass action; the adsorption and desorption of metal ions between the active sites and adsorbate. In certain embodiments, the adsorption process is monolayer adsorption as modeled by a Langmuir isotherm. The Langmuir isotherm assumes monolayer adsorption wherein one metal ion occupies one active site. It is equally envisaged that the present disclosure may be adapted such that the adsorption process is heterogeneous with uniform energy distribution as modeled by a Feundlich isotherm model. In certain embodiments, the adsorption has a low activation energy or potential barrier, preferably less than 20 kJ/mol, preferably less than 10 kJ/mol, preferably less than 5 kJ/mol, preferably less than 2 kJ/mol, preferably less than 1 kJ/mol. The low activation energy indicates that the adsorption process is favorable and may be predominantly physisorption rather than chemisorption. The physisorption process is readily reversible, equilibrium is attained rapidly and thus the energy requirements are small (i.e. <40 kJ/mol). The chemisorption mechanism is specific and involves stronger forces, and thus requires larger activation energy (i.e. >40 kJ/mol).

The examples below are intended to further illustrate methods protocols for preparing and characterizing the cross-linked polymeric resins of the present disclosure. Further, they are intended to illustrate assessing the properties of these compounds. They are not intended to limit the scope of the claims.

Example 1

General Materials and Methods of Characterization for Prepared Compounds

Aniline (An), carbon disulfide ($CS_2$), 1,4-diaminobutane (Buta), 1,6-diaminohexane (Hexa), 1,8-diaminooctane (Octa), 1,10-diaminodecane (Deca), 1,12-diaminododecane (Dodeca) and paraformaldehyde were supplied by Fluka Chemie AG (Buchs, Switzerland) and used as received without any further purification. Potassium hydroxide pellets were supplied by Sigma-Aldrich, Germany. All solvents and reagents used were of analytical grade. Elemental analysis was carried out on a Perkin-Elmer Elemental Analyzer Series II Model 2400.

Infrared spectra were recorded on a Perkin-Elmer 16F PC FTIR spectrometer using KBr pellets in the 500-4000 $cm^{-1}$ region. Solid state $^{13}C$-NMR spectra were obtained from a Bruker WB-400 spectrometer with an operating frequency at 100.61 MHz (9.40 T). Zirconium oxide rotors of 4 mm were used with samples duly packed into them. The operating temperature was 25° C. and cross polarization was employed. A contact time of 2 ms and a pulse delay of 5.0 s were used in cross polarization magic angle spinning (CP-MAS) experiments. The magic angle spinning rate was 4 KHz. Carbon chemical shifts were referenced to tetramethylsilane using the high frequency isotropic peak of adamantine at 38.56 ppm.

X-ray analysis was on performed on a Rigaku Rint D/Max-2500 diffractometer instrument using CuKα radiation (wave length=1.5418 Å). The scanning step was 0.03 with a scanning speed of 3° per minute. Thermogravimetric analysis (TGA) was performed using a thermal analyzer (STA 429) by Netzsch (Germany). The experiment was performed in a nitrogen atmosphere from 20-800° C. with a heating rate of 10° C./min and a nitrogen flow rate of 20 mL/min. The specific surface area for CS2-buta and CS2-dodeca were measured by Brunauer-Emmett-Teller (BET) $N_2$ method using a Micrometrics ASAP 2020 BET surface area analyzer.

Investigations by atomic force microscopy (AFM) were performed with an Agilent 5100 SPM system, described by PicoSPM, controlled by a MAC Mode module and interfaced with a controller PicoScan from Agilent Technologies, Tempe, Ariz., USA. All AFM measurements (256 samples/line by 256 lines) were made by scanning the surface at a rate of 1-3 lines per second and were conducted at room temperature using the tapping mode. A probe tip, manufactured by Bruker AFM Probes Co, was used having a radius of 10 nm and a specific force constant (k) of 40 N/m with a maximum resonance frequency of 320 KHz. Suspension solutions were prepared fresh before each experiment by suspending CS2-buta in a 50:50 $H_2O$ and ethanol mixture and then ultrasonicating for 30 minutes. A small volume was withdrawn by syringe and added on top of freshly cleaved mica and then placed in an oven at 110° C. for 1 hour. Image analysis was performed using software WSxM v5.0 Develop 6.2 [Horcas I, Fernández R, Gomez-Rodriguez J, Colchero J, Gómez-Herrero J, Baro A. WSXM: a software for scanning probe microscopy and a tool for nanotechnology. Review of Scientific Instruments. 2007; 78(1):013705.—incorporated herein by reference in its entirety]. Scanning electron microscopy micrographs were recorded by a TESCAN LYRA 3 (Czech Republic) instrument equipped with an energy dispersive X-ray spectroscopy (EDX) detector model X-Max.

Mercury analyzer MA-3000 was used to monitor the mercury level for the adsorption studies. Inductively coupled plasma mass spectroscopy (ICP-MS) analysis of the wastewater samples was performed using an ICP-MS XSERIES-II (Thermo Scientific) instrument.

Example 2

Synthesis of Precursor Cross Linked Terpolymers

The precursor cross-linked polyamines and the dithiocarbamate modified polymers were prepared as outlined in FIG. 1. Five precursor polyamines were prepared by reaction of aniline and five monomers of the diaminoalkane series linked together by paraformaldehyde in a Mannich type reaction fashion [Chi K-W, Ahn Y S, Shim K T, Park T H, Ahn J S. One-pot synthesis of Mannich base using hydroxy aromatic rings and secondary amines. Bull Korean Chem Soc. 1999; 20(8):973-976.—incorporated herein by reference in its entirety]. The cross linked terpolymers were prepared by mixing 0.01 mol of aniline, 0.06 mol of paraformaldehyde and 0.03 mol of diaminoalkane with 30 mL of n-heptane as the reaction solvent. The mixture was stirred using a magnetic stirrer. The reaction temperature was increased slowly to 90° C. and kept there for 24 hours with continuous stirring. Subsequently, the resinous material was filtered off, crushed and soaked in water for 24 hours. The resin was filtered and dried under vacuum at 60° C. until a constant weight was achieved.

Table 1 summarizes the prepared terpolymers. The polyamine series was labelled as An-Buta, (Found: C, 64.38; H, 10.37; N, 22.26; Calculated: C, 65.99; H, 10.59; N, 23.42), An-Hexa (Found: C, 67.57; H, 11.65; N, 20.23; Calculated: C, 69.27; H, 11.23; N, 19.5), An-Octa (Found: C, 71.24; H, 12.15; N, 16.55; Calculated: C, 72.21; H, 12.28; N, 15.51), An-Deca (Found: C, 72.85; H, 12.46; N, 14.61; Calculated: C, 73.38; H, 12.02; N, 14.61), and An-Dodeca (Found: C, 74.4; H, 12.49; N, 13.14; Calculated: C, 74.74; H, 12.28; N, 12.98). $^{13}$C NMR spectra showed peaks at ~30 ppm (—$CH_2$— groups on alkyl chain), ~80 ppm (α-carbons to —NH—, between 120-150 ppm (ortho, meta and para aromatic carbons) and ~170 ppm (aromatic α-carbon to —$NH_2$); νmax (KBr) ν(—NH groups) ~3425 cm$^{-1}$, ν(C=C aromatic) ~1600 cm$^{-1}$, ~1467 cm$^{-1}$; ν(C—N) ~1115 cm$^{-1}$, ν(C—H) ~2925 cm$^{-1}$, ~2855 cm$^{-1}$.

Example 3

Preparation of the Dithiocarbamate Modified Polymer Series

The amine groups of the polymers were subsequently converted to dithiocarbamates.

Advantageously, the precursor polymers have the ability to maximize the amine functionality by connecting two amine monomers. This of course translates to the high number of dithiocarbamate groups after conversion, thus increasing the metal chelating capability of the resulting dithiocarbamate modified polymer series. The precursor cross-linked polyamines and the dithiocarbamate modified polymers were prepared as outlined in FIG. 1. The modification reaction was performed at room temperature and was left to react for 72 hours to allow complete conversion of the amine functionality. The amine modifications were performed by mixing 0.01 mol of the precursor polymer with 0.07 mol of carbon disulfide and 0.07 mol of potassium hydroxide. Approximately 7-8 mL of DMF was used as the reaction solvent. There was a distinct color change shortly after the addition of all of the reaction components was complete. The solution colors ranged from deep orange (An-Buta polyamine precursor) to milky white (An-Dodeca polyamine precursor) for the modified polymer series. The reactions were stirred at room temperature for 72 hours to ensure complete reaction. The resulting resinous solution was precipitated with acetone, filtered and rewashed with acetone. The second washing was kept stirring for 24 hours to ensure removal of all unreacted material and thereafter filtered and dried under vacuum at 60° C. until a constant weight was achieved. Upon completion of each reaction, a viscous resin was obtained that easily precipitates in acetone. The resulting dithiocarbamate modified precipitates were insoluble in common solvent such as water, ethanol, acetone, DMF, n-heptane, etc. The polymers appeared to settle quicker in acetone with increasing order from shortest methylene chain length (buta) to longest methylene chain length (dodeca). This may be attributed to the increase in the ratio of hydrophobic aliphatic chain moieties to hydrophilic dithiocarbamate groups as the polymer chain length increases. The polymers swell in acetone but form light powdery materials when dry. The dry polymers are hygroscopic, and as such were stored in a desiccator. The dithiocarbamate modified polymer series (especially the buta derivative which was originally orange in color) showed a distinct color change to black upon contact with a solution of high mercury concentration.

Table 1 summarizes the prepared dithiocarbamate modified polymers (DTCPs). The dithiocarbamate modified polymer series was labelled as CS2-buta, CS2-hexa, CS2-octa, CS2-deca and CS2-dodeca. $^{13}$C NMR spectra showed peaks at below 100 ppm (—$CH_2$— groups on alkyl chain), ~125 ppm (ortho, meta and para aromatic carbons), ~165 ppm (aromatic α-carbon to —$NCS_2$) and ~204 ppm (α-carbons to —$NCS_2$ groups on alkyl chain); νmax (KBr) ν(C=C aromatic) ~1470 cm$^{-1}$ & ~1695 cm$^{-1}$, ν(C—N) ~1115 cm$^{-1}$, ν(C=S) ~1100 cm$^{-1}$ & ~1360 cm$^{-1}$, ν(—CSS$^-$) ~850 cm$^{-1}$ & ~1070 cm$^{-1}$, ν(C—S$^-$) ~930 cm$^{-1}$ & ~960-1000 cm$^{-1}$, ν(—$CH_2$—) ~720 cm$^{-1}$.

TABLE 1

Precursor terpolymer amines before and after modification with dithiocarbamate (DTC) groups

| Terpolymer | Yield (%)$^a$ | DTCP | Yield (%)$^a$ |
|---|---|---|---|
| An-Buta | 44.98 | CS2-buta | 60.08 |
| An-Hexa | 69.49 | CS2-hexa | 55.25 |
| An-Octa | 75.01 | CS2-octa | 53.68 |
| An-Deca | 76.60 | CS2-deca | 52.25 |
| An-Dodeca | 80.10 | CS2-dodeca | 51.73 |

$^a$Yield (%) = (mass of product/mass of reactants) × 100%

Example 4

Figure 2:
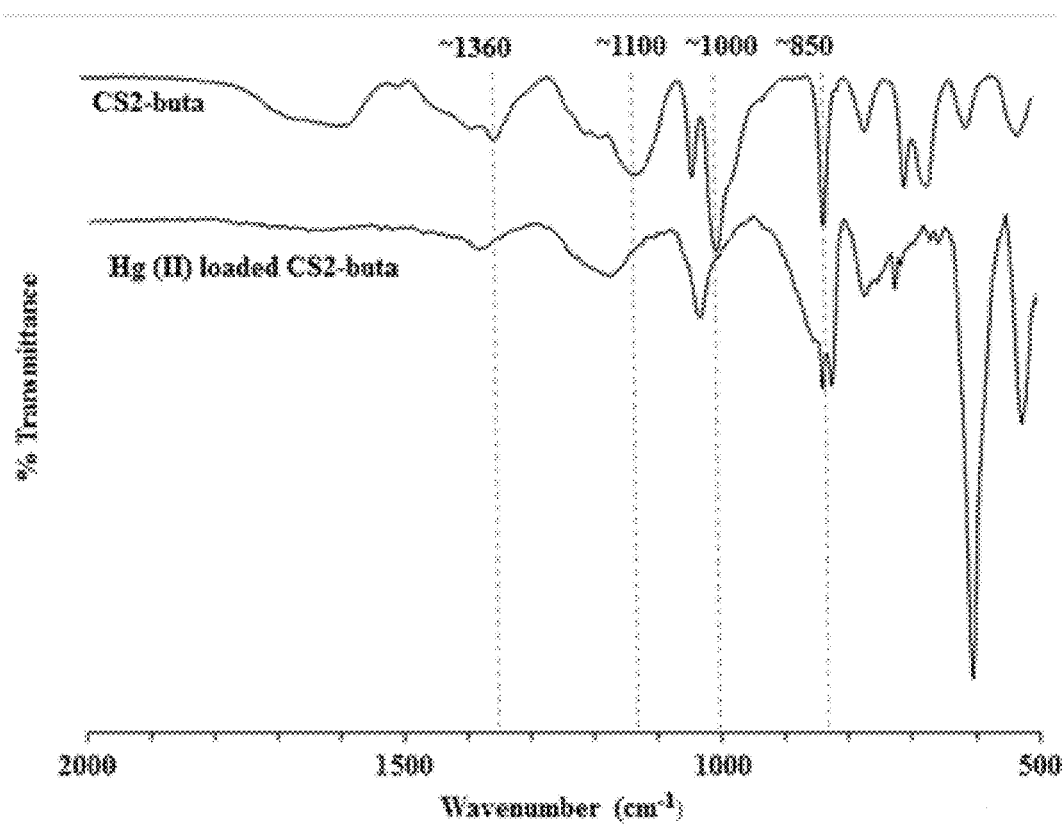
FIG. 2 is a Fourier transform infrared (FT-IR) spectroscopy analysis of a cross-linked polymeric resin of formula (I) wherein $R_1$ is $CS_2^-Z^+$ and n is 4 and a FT-IR analysis of a cross-linked polymeric resin of formula (I) wherein $R_1$ is $CS_2^-Z^+$ and n is 4 loaded with Hg(II).

Fourier Transform Infrared (FT-IR) Spectroscopy and Solid State $^{13}$C-NMR Characterization of the Dithiocarbamate Modified Polymer Series The FT-1R spectra of the series (CS2-buta, CS2-hexa, CS2-octa, CS2-deca and CS2-dodeca) show consistency with the proposed structure in FIG. 1. FIG. 2 depicts the spectra of CS2-buta which generally resembles the spectra of the remaining polymers of the series. The bands at ~1740 cm$^{-1}$ and ~1695 cm$^{-1}$ are assigned to stretching vibrations of the aromatic C=C bond while the strong, sharp band at ~1115 cm$^{-1}$ is assigned to the C—N stretching vibration [Devi S, Devasena T, Saratha S, Tharmaraj P, Pandian K. Dithiocarbamate Post Functionalized Polypyrrole Modified Carbon Sphere for the Selective and Sensitive Detection of Mercury by Voltammetry Method. Int J Electrochem Sci. 2014; 9:670-683; and Azarudeen R S, Subha R, Jeyakumar D, Burkanudeen A R. Batch separation studies for the removal of heavy metal ions using a chelating terpolymer: Synthesis, characterization and isotherm models. Separation and Purification Technology. 2013; 116:366-377.—each incorporated herein by reference in its entirety]. The strong, sharp band at ~720 cm$^1$ assigned to the —CH$_2$— rocking indicates a long alkyl chain which shows consistency with the presence of long aliphatic chains in the dithiocarbamate modified polymer series [Stuart B H. Infrared Spectroscopy-Fundamentals and Applications. Chichester, West Sussex: John Wiley & Sons; 2004.—incorporated herein by reference in its entirety]. The bands at ~1100 cm$^{-1}$ and ~1360 cm$^{-1}$ are assigned to the stretching vibration of the C=S group in the —CSS$^-$ structure [Jing X, Liu F, Yang X, Ling P, Li L, Long C, et al. Adsorption performances and mechanisms of the newly synthesized N,N'-di (carboxymethyl) dithiocarbamate chelating resin toward divalent heavy metal ions from aqueous media. Journal of Hazardous Materials. 2009; 167(1-3):589-596; and Gao B, Jia Y, Zhang Y, Li Q, Yue Q. Performance of dithiocarbamate-type flocculant in treating simulated polymer flooding produced water. Journal of Environmental Sciences. 2011; 23(1):37-43.—each incorporated herein by reference in its entirety]. The bands at ~850 cm$^{-1}$ and ~1070 cm$^{-1}$ are attributed to the various deformation vibrations of the —CSS$^-$ structure [McClain A, Hsieh Y-L. Synthesis of polystyrene-supported dithiocarbamates and their complexation with metal ions. Journal of Applied Polymer Science. 2004; 92(1):218-225.—incorporated herein by reference in its entirety]. The broad bands at ~930 cm$^{-1}$ and from 960 cm$^{-1}$ to 1000 cm$^{-1}$ are attributed to the C—S— group in the —CSS$^-$ structure [Fu H, Lv X, Yang Y, Xu X. Removal of micro complex copper in aqueous solution with a dithiocarbamate compound. Desalination and Water Treatment. 2012; 39(1-3):103-111.—incorporated herein by reference in its entirety]. The presence of the aforementioned dithiocarbamate stretching and deformation vibration in the dithiocarbamate modified polymer series and the disappearance of the broad band at ~3425 cm$^{-1}$ confirm the successful conversion of the amine groups of the precursor polyamine series.

Figure 3:
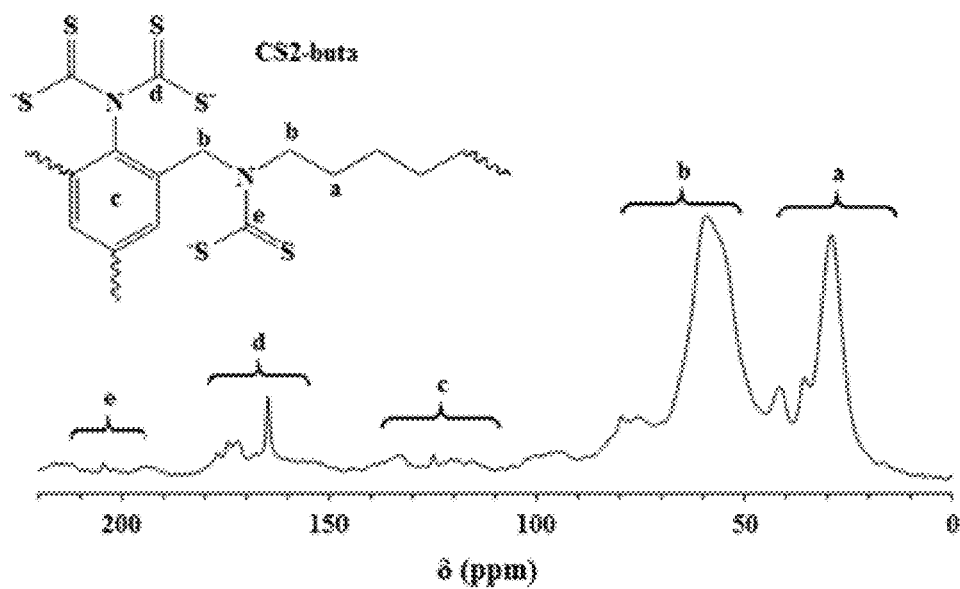
FIG. 3 is the solid state ¹³C nuclear magnetic resonance (NMR) spectra of a cross-linked polymeric resin of formula (I) wherein $R_1$ is $CS_2^-Z^+$ and n is 4.

FIG. 2 additionally reveals the FT-JR spectra of CS2-buta before and after the loading of Hg(II) ions. Comparisons between the spectra of the Hg loaded and unloaded CS-2 buta shows the hypsochromic shift of more than ten wavenumbers for the bands of the —CSS$^-$ peaks (e.g. at ~1360 cm$^{-1}$, ~1100 cm$^{-1}$, ~1000 cm$^{-1}$, and ~850 cm$^{-1}$) indicating the chelation between the dithiocarbamate group of CS2-buta and the mercury ions. The dithiocarbamate group is the most important functionality because it is responsible for the chelation of the Hg(II) ions from aqueous media. The obtained dithiocarbamate modified polymers were almost insoluble in commonly used solvent, such as water, acetone, alcohol, and dimethyl formamide; therefore, it is not possible to characterize them by solution NMR. Solid state $^{13}$C-NMR was used to identify the chemical structure of the dithiocarbamate modified series under conditions described in Example 1. FIG. 3 depicts the solid state $^{13}$C-NMR spectra of CS2-buta and reveals the —NCS$_2$ signals of the CS2-buta polymer at 204 ppm, which confirms the successful conversion of the primary amine groups of the An-Buta precursor terpolymer.

Example 5

Figure 4:
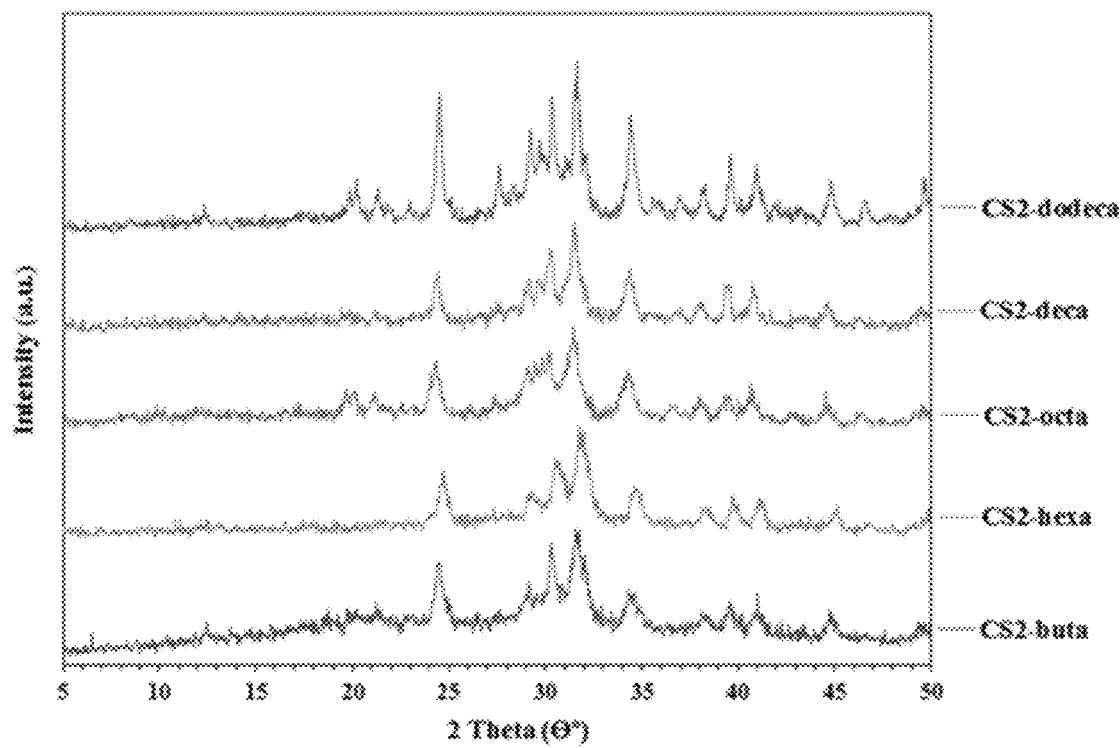
FIG. 4 is a powder X-ray diffraction (PXRD) spectra of a series of dithiocarbamate modified cross-linked polymeric resins of formula (I) wherein $R_1$ is —$CS_2^-Z^+$ and n=4, 6, 8, 10 or 12.
Figure 5:
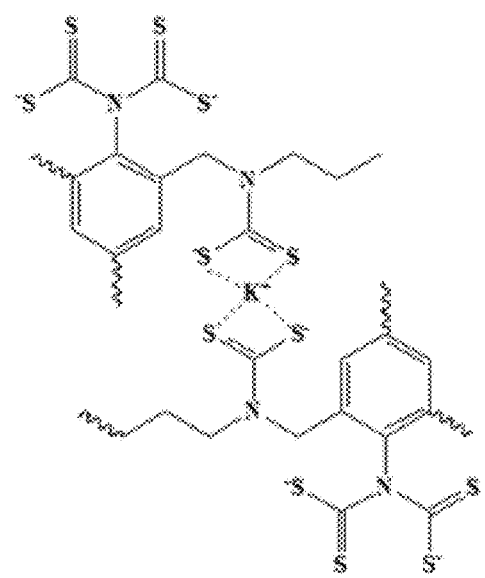
FIG. 5 is a proposed schematic representation for interchain chelation of K⁺ ions between the dithiocarbamate modified polymer chains that may result in a form of chain stacking.

Powder X-Ray Diffraction (PXRD) Spectroscopy, Thermogravimetric Analysis (TGA), and Brunauer-Emmett-Teller (BET) Surface Area Characterization of the Dithiocarbamate Modified Polymer Series Powder X-ray diffraction (PXRD) spectroscopy was used to evaluate the crystallinity of the dithiocarbamate modified polymer series. The polymers showed PXRD patterns (FIG. 4) with several well defined peaks suggesting that the polymers exhibit a semi-crystalline nature. Polymers are known to behave as crystalline materials under X-ray when their chains are closely packed in an orderly manner. One explanation for this behavior is that it may result from a high chelating ability of the polymer. Chelation of K$^+$ ions between the long polymer chains may result in a form of chain stacking by inter-chain chelation (FIG. 5) which may result in distinct XRD peaks resembling that of a crystalline material. The PXRD patterns also reveal that as the chain lengths of the dithiocarbamate modified polymer series increases from CS2-buta to CS2-dodeca, the sharpness of the peaks increases (i.e. the peaks become less broad) [Endrödi B, Mellár J, Gingl Z, Visy C, Janáky C. Molecular and Supramolecular Parameters Dictating the Thermoelectric Performance of Conducting Polymers: A Case Study Using Poly(3-alkylthiophene)s. The Journal of Physical Chemistry C. 2015.—incorporated herein by reference in its entirety].

Figure 6:
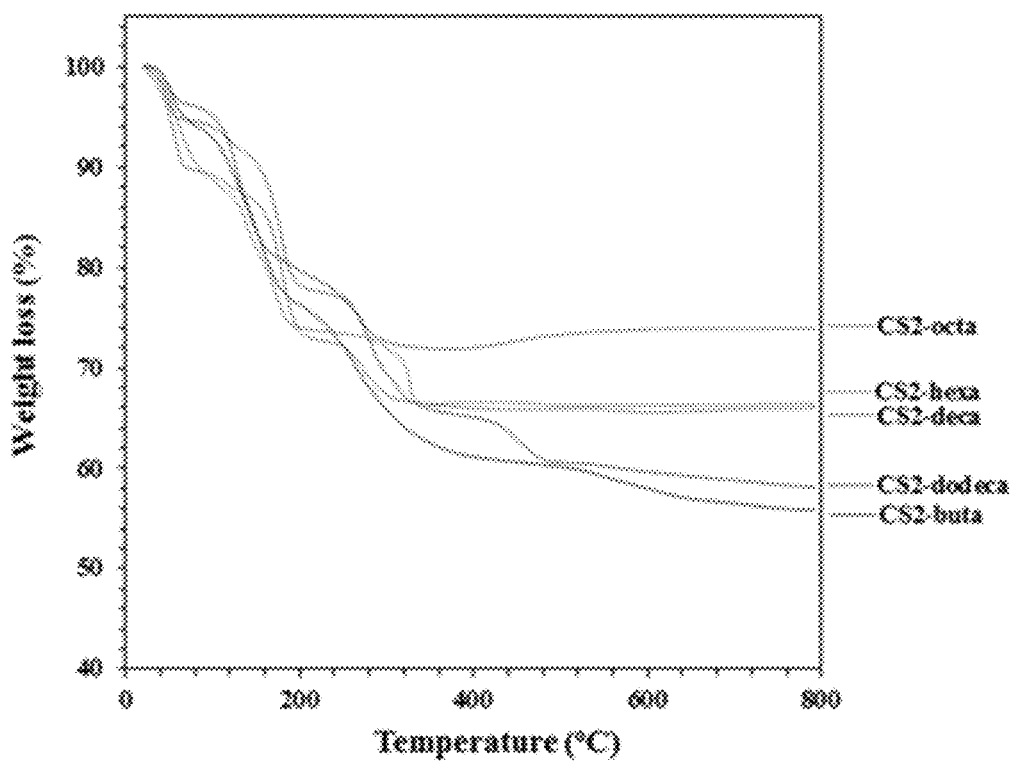
FIG. 6 is a thermal gravimetric analysis (TGA) of a series of dithiocarbamate modified cross-linked polymeric resins of formula (I) wherein $R_1$ is —$CS_2^-Z^+$ and n=4, 6, 8, 10 or 12.

The thermal stability of the synthesized dithiocarbamate modified polymer series was evaluated by thermogravimetric analysis (TGA) (FIG. 6). The TGA thermograms reveal four major degradation steps for each of the 5 prepared polymers. The first step of the weight loss between 0° C. and 100° C. of ~5-10% is due to the loss of water molecules held within the polymer matrix by intermolecular hydrogen bonds indicating the strong hydrophilic nature of the polymers. The second step of the weight loss of ~15-25% between 100° C. and 180° C. is due to the breakdown of the dithiocarbamate moieties thereby forming fragmented sulfide compounds. The third step of the weight loss of ~10-20% between 180° C. and 350° C. is due to the thermal degradation of the aliphatic chains. The gradual weight loss of the final step between 350° C. and 800° C. is attributed mainly to the pyrolysis of the aromatic moieties leaving behind sulfates of potassium and possibly, oxides of potassium which have high melting points. Oxides of potassium may also contribute to the third step of weight loss as they start to decompose at temperatures of ~300° C. [Blackwell J, Nagarajan M, Hoitink T. Structure of polyurethane elastomers: effect of chain extender length on the structure of MDI/diol hard segments. Polymer. 1982; 23(7):950-956; and Fabretti A C, Forghieri F, Giusti A, Preti C, Tosi G. Spectroscopic, magnetic and thermogravimetric studies of piperazine-bis-(dithiocarbamate) complexes. Spectrochimica Acta Part A: Molecular Spectroscopy. 1984; 40(4): 343-346.—each incorporated herein by reference in its entirety].

The Brunauer-Emmett-Teller (BET) surface area of the synthesized crosslinked polymers showed that CS2-buta (3.93 m$^2$ g$^{-1}$) has a lower surface area than CS2-dodeca (11.506 m$^2$ g$^{-1}$) where longer chains lead to larger pores and thus a larger surface area. The larger surface showed no enhancement in the adsorption capacity as the higher concentration of the thiocarbamate functionality in the CS2-buta derivative led to a higher absorption capacity.

Example 6

Figure 7:
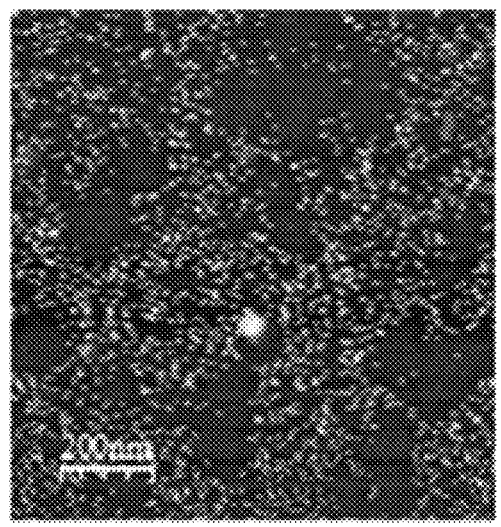
FIG. 7 is an atomic force microscopy (AFM) micrograph image of a cross-linked polymeric resin of formula (I) wherein $R_1$ is $CS_2^-Z^+$ and n is 4 at a 1 m scan range where the polymer is dispersed on a freshly cleaved mica surface with a few structures having larger sizes.
Figure 8:
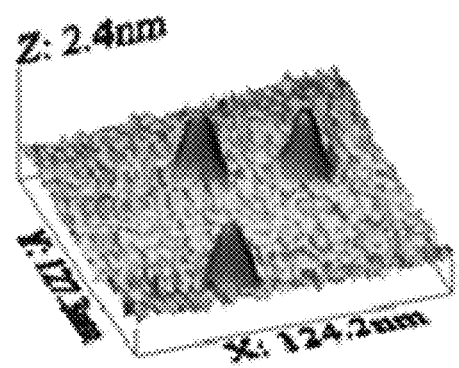
FIG. 8 is an AFM micrograph 3D topography image of a cross-linked polymeric resin of formula (I) wherein $R_1$ is $CS_2^-Z^+$ and n is 4 demonstrating three isolated polymer structures showing comparable size and shape.
Figure 9:
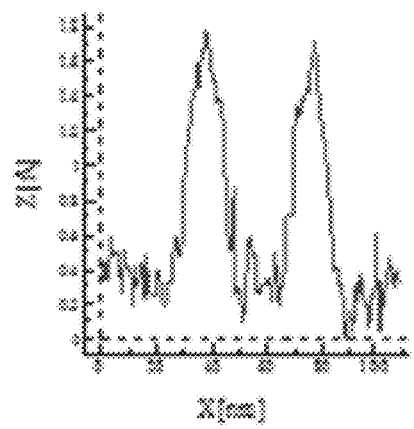
FIG. 9 is a line profile of two isolated polymer structures of a cross-linked polymeric resin of formula (I) wherein $R_1$ is $CS_2^-Z^+$ and n is 4.

Atomic Force Microscopy (AFM), Scanning Electron Microscopy (SEM) and Scanning Electron Microscopy-Energy Dispersive X-Ray Spectroscopy (SEM-EDX) Characterization of the Dithiocarbamate Modified Polymer Series Atomic force microscopy (AFM) scans were carried out and images from the topography and phase modes are presented. A typical image is shown in FIG. 7 wherein the prepared polymer is dispersed with some structures having larger sizes. A three dimensional (3D) image of three isolated polymer structures showing comparable size and shape is shown in FIG. 8. A line profile was carried out on two of these structures as shown in FIG. 9. The line profile reveals similar polyhedral architecture as noted from the steep slopes with base width size in the range of 20 nm.

Figure 10:
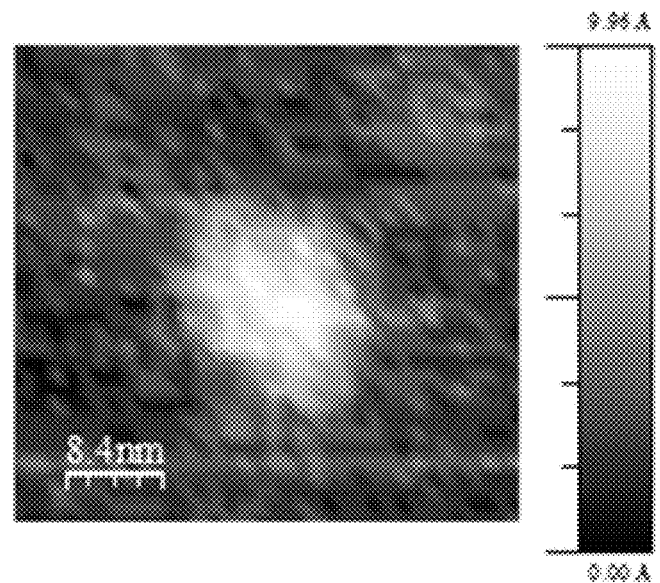
FIG. 10 is a magnified view AFM micrograph image of a cross-linked polymeric resin of formula (I) wherein $R_1$ is $CS_2^-Z^+$ and n is 4.
Figure 11:
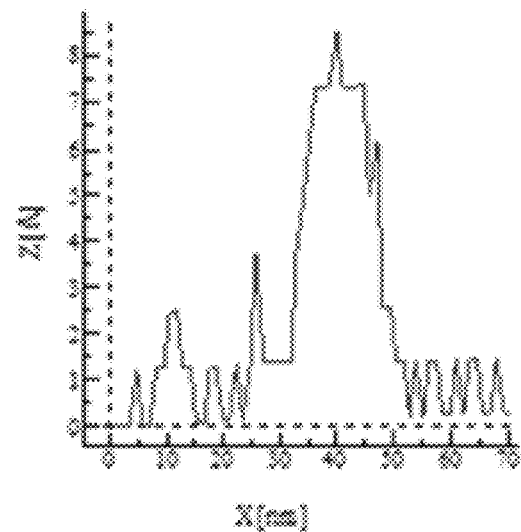
FIG. 11 is a line profile of a single isolated polymer structure of a cross-linked polymeric resin of formula (I) wherein $R_1$ is $CS_2^-Z^+$ and n is 4.
Figure 12:
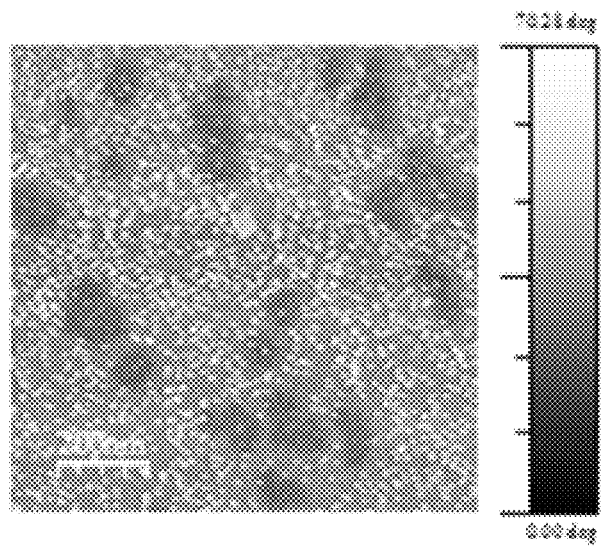
FIG. 12 is an AFM micrograph 2D phase image of a cross-linked polymeric resin of formula (I) wherein $R_1$ is $CS_2^-Z^+$ and n is 4

In order to obtain a more accurate magnitude of the particle size, the line profile of an isolated polymer (FIG. 10 and FIG. 11) shows that the particle width is in the range of 15-20 nm at the base with a height of around 0.8-1.0 nm (8-10 Å) with steep slopes correlating to the diffraction edges observed in the XRD. Height measurements are considered more precise to calculate compared to particle diameter since lateral dimensions are strongly distorted by tip convolution effects. FIG. 12 shows the 2D phase image of a typical prepared polymer sample where they all appear with similar phase angles indicating a homogeneous composition and similar viscoelastic properties. Darker areas may indicate the presence of partially or non-crosslinked polymer structures which are softer than the crystallized polymer.

Figure 13:
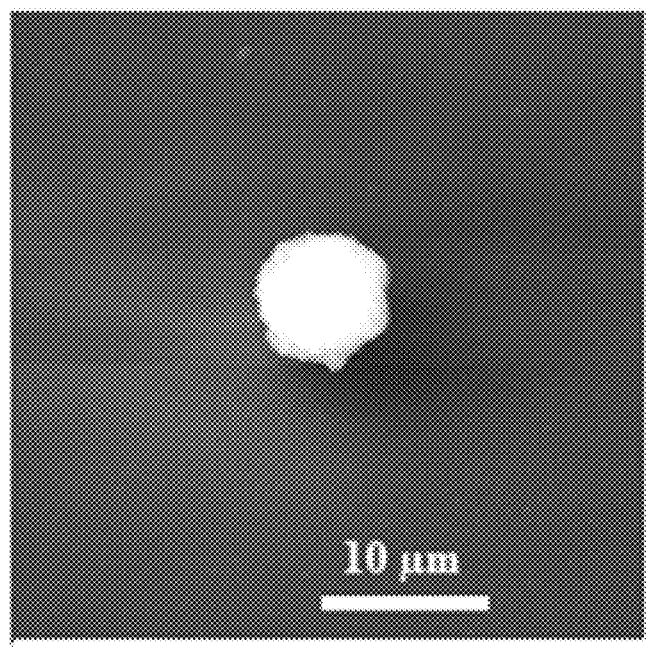
FIG. 13 is a scanning electron microscopy (SEM) image of a cross-linked polymeric resin of formula (I) wherein $R_1$ is $CS_2^-Z^+$ and n is 4 as a cluster.
Figure 14:
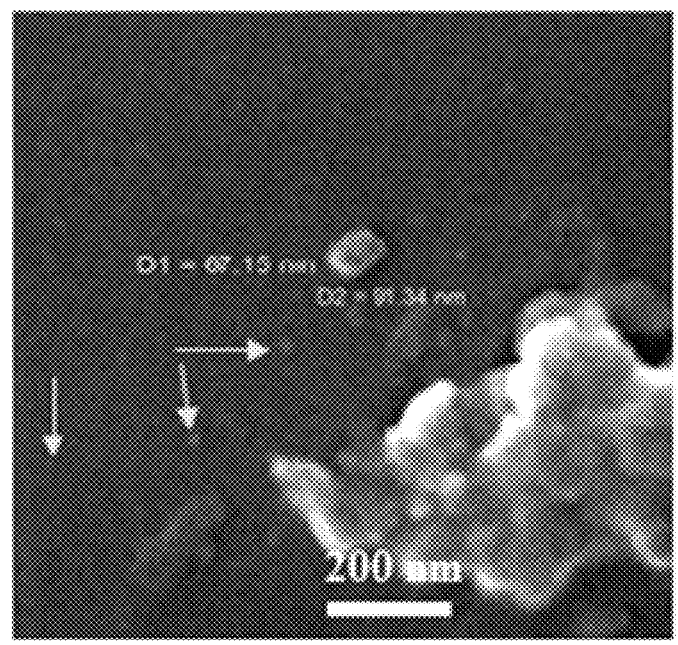
FIG. 14 is a magnified view SEM image of a cross-linked polymeric resin of formula (I) wherein $R_1$ is $CS_2^-Z^+$ and n is 4 as an un-clustered single structure.
Figure 15:
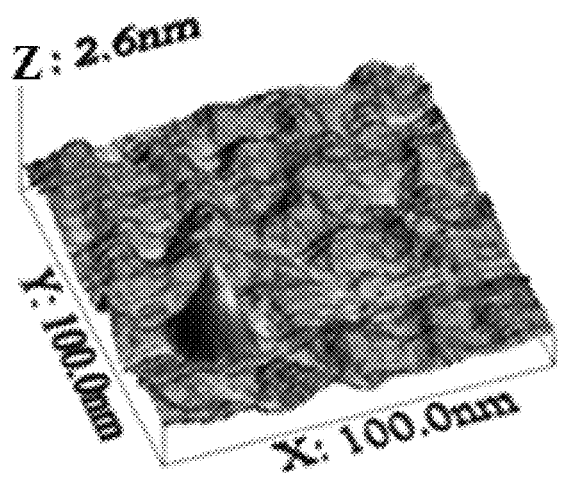
FIG. 15 is an AFM micrograph 3D topography image of a cross-linked polymeric resin of formula (I) wherein $R_1$ is $CS_2^-Z^+$ and n is 4 after loading with Hg(II).
Figure 16:
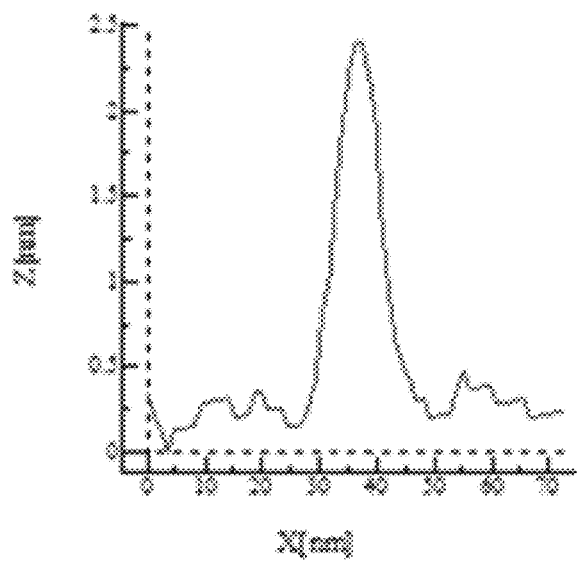
FIG. 16 is a line profile of a single isolated polymer structure of a cross-linked polymeric resin of formula (I) wherein $R_1$ is $CS_2^-Z^+$ and n is 4 after loading with Hg(II).
Figure 17:
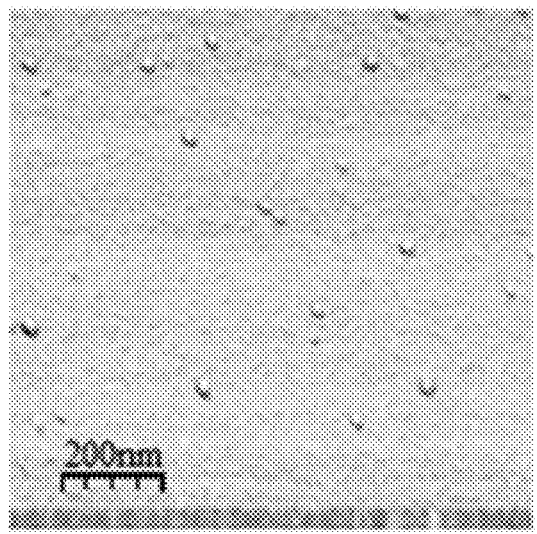
FIG. 17 is an AFM micrograph 2D phase image of a cross-linked polymeric resin of formula (I) wherein $R_1$ is $CS_2^-Z^+$ and n is 4 after loading with Hg(II).
Figure 18:
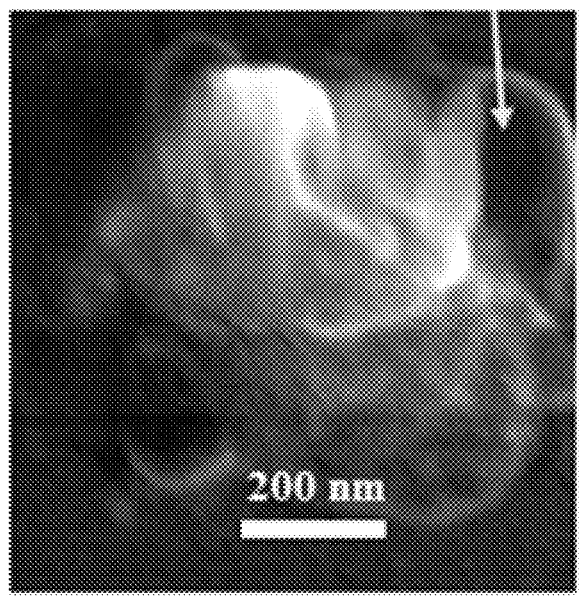
FIG. 18 is a magnified view SEM image of a cross-linked polymeric resin of formula (I) wherein $R_1$ is $CS_2^-Z^+$ and n is 4 after loading with Hg(II).
Figure 19:
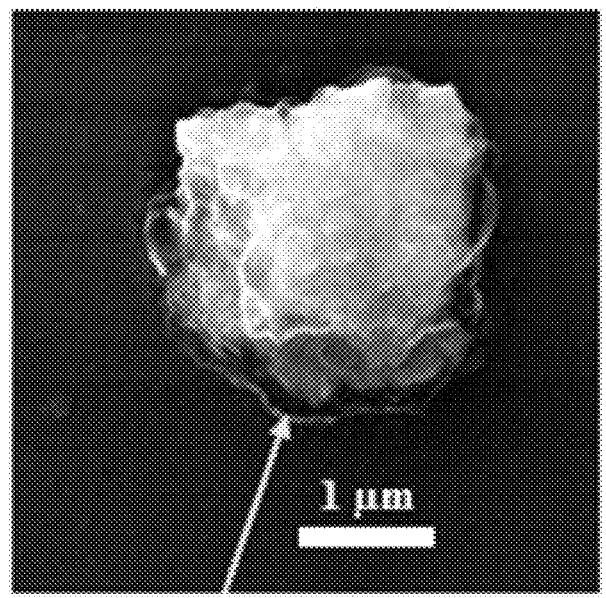
FIG. 19 is a SEM image of a cross-linked polymeric resin of formula (I) wherein $R_1$ is $CS_2^-Z^+$ and n is 4 after loading with Hg(II).
Figure 20:
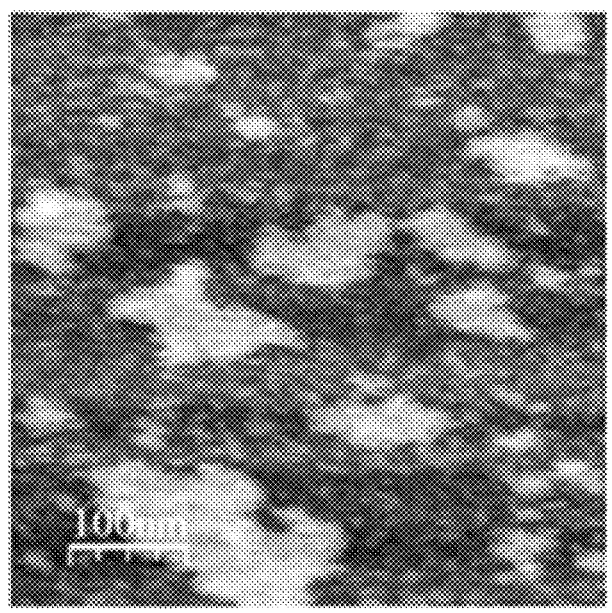
FIG. 20 is an AFM micrograph 2D phase image of a cross-linked polymeric resin of formula (I) wherein $R_1$ is $CS_2^-Z^+$ and n is 4 one week after loading with Hg(II).
Figure 21:
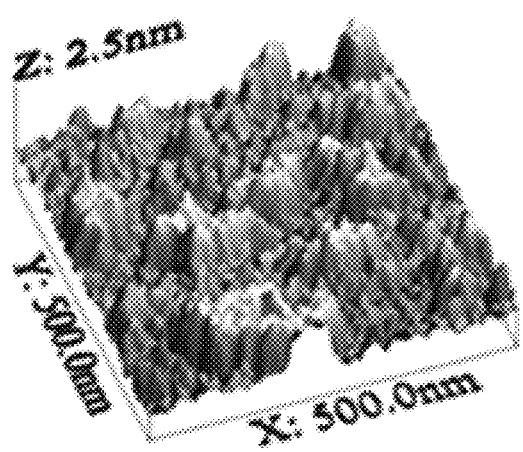
FIG. 21 is an AFM micrograph 3D topography image of a cross-linked polymeric resin of formula (I) wherein $R_1$ is $CS_2^-Z^+$ and n is 4 one week after loading with Hg(II).
Figure 22:
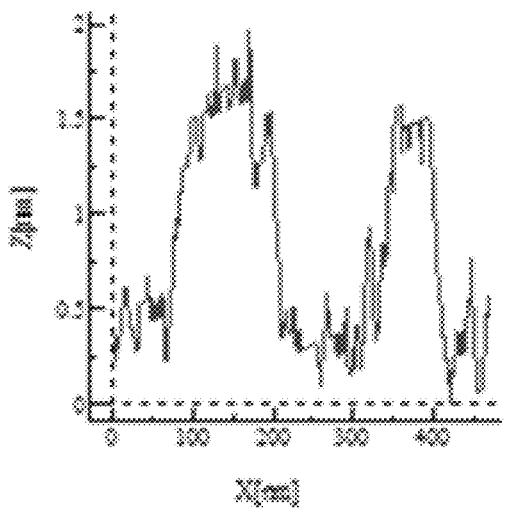
FIG. 22 is a line profile of a fully exfoliated sheet of a cross-linked polymeric resin of formula (I) wherein $R_1$ is $CS_2^-Z^+$ and n is 4 one week after loading with Hg(II).

Scanning electron microscope (SEM) micrographs also reveal the structure of the dispersed polymers. FIG. 13 shows the image of a single cluster of the polymer with polycrystalline sides and high brightness due to the strong electron refraction from the steep sides while FIG. 14 reveals the small size of the un-clustered polymer structures (indicated by arrows). After a mercury loading experiment, AFM was again performed and micrographs are shown in FIG. 15, FIG. 16 and FIG. 17. The micrographs show the 3D topography (FIG. 15) where the polymer base width appears to be in the range of 20-25 nm and the height around 2.5 nm with less steep edges as noted by the line profile (FIG. 16) which correlated with the observation of large polymer structures supported by the SEM micrographs in FIG. 14. In addition, FIG. 17 shows the polymer with a dark outer layer and lighter inner core where the outer layer is made of soft, peeled off polymer layers loaded with mercury. This can also be observed in the SEM micrographs of the mercury loaded polymer in FIG. 18 and FIG. 19. In FIG. 20, FIG. 21 and FIG. 22, phase (FIG. 20) and height (FIG. 21 and FIG. 22) images show fully exfoliated sheets. Line profile analysis (FIG. 22) versus distance in the topography image (FIG. 21) shows a uniform thickness of approximately 2.0 nm in good agreement with the thickness for an individual monolayer [Kissel P, Erni R, Schweizer W B, Rossell M D, King B T, Bauer T, et al. A two-dimensional polymer prepared by organic synthesis. Nat Chem. 2012; 4(4):287-291.—incorporated herein by reference in its entirety].

Figure 23:
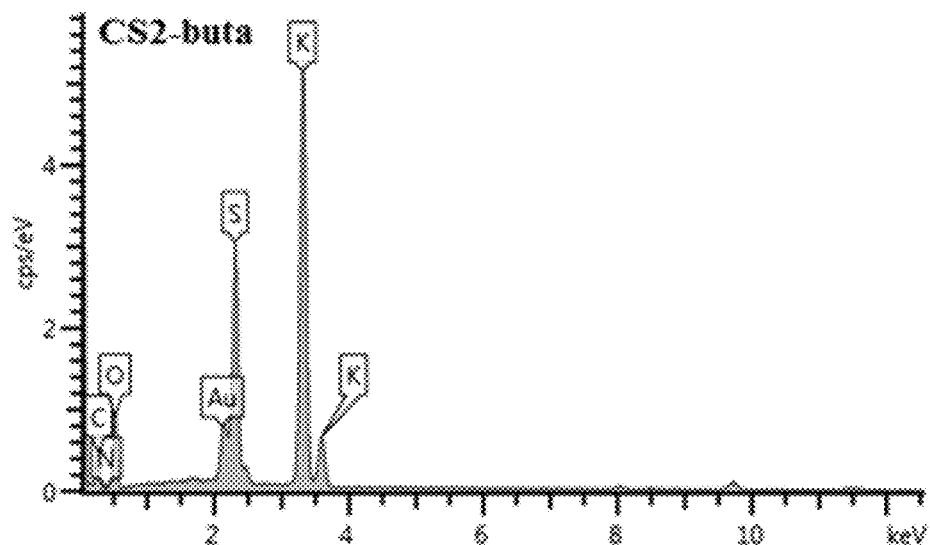
FIG. 23 is a scanning electron microscopy-energy dispersive X-ray spectroscopy (SEM-EDX) elemental analysis of a cross-linked polymeric resin of formula (I) wherein $R_1$ is $CS_2^-Z^+$ and n is 4.
Figure 24:
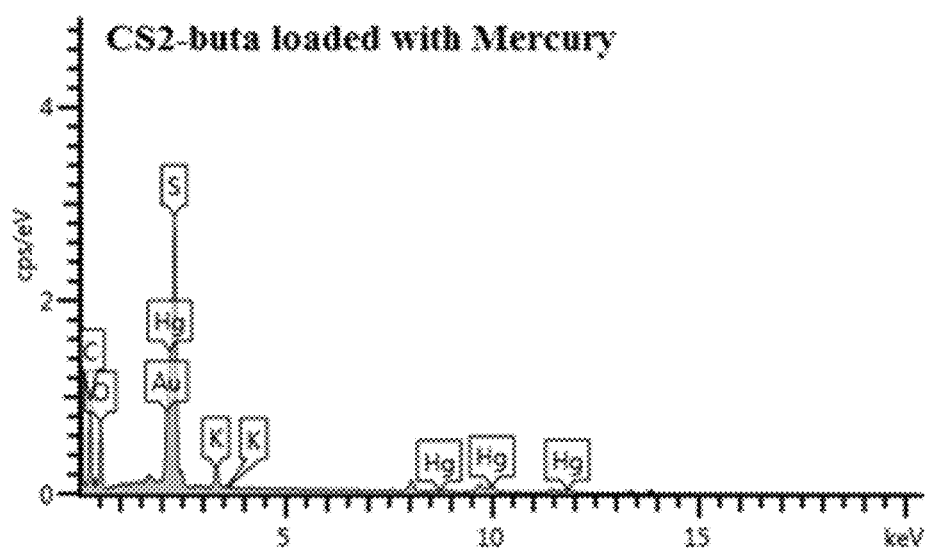
FIG. 24 is a SEM-EDX elemental analysis of a cross-linked polymeric resin of formula (I) wherein $R_1$ is $CS_2^-Z^+$ and n is 4 after loading with Hg(II).
Figure 25:
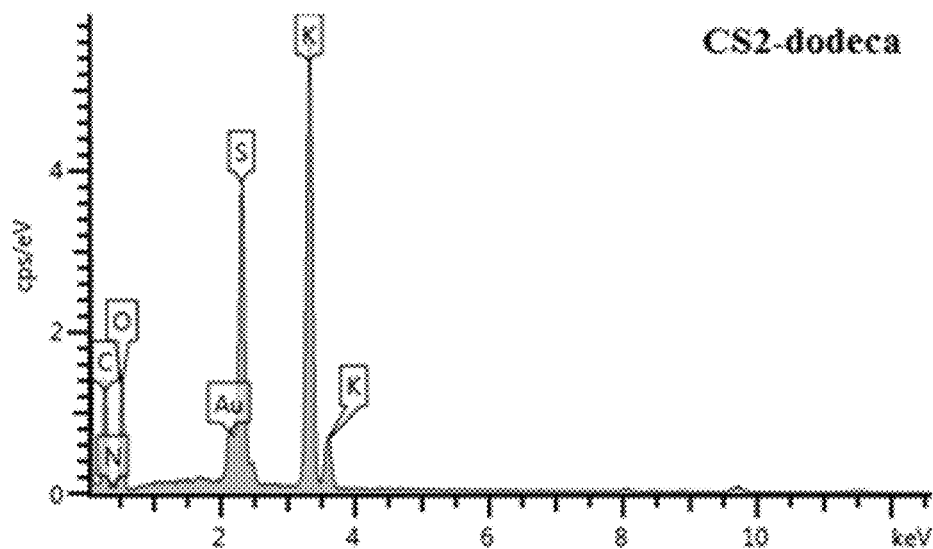
FIG. 25 is a SEM-EDX elemental analysis of a cross-linked polymeric resin of formula (I) wherein $R_1$ is $CS_2^-Z^+$ and n is 12.
Figure 26:
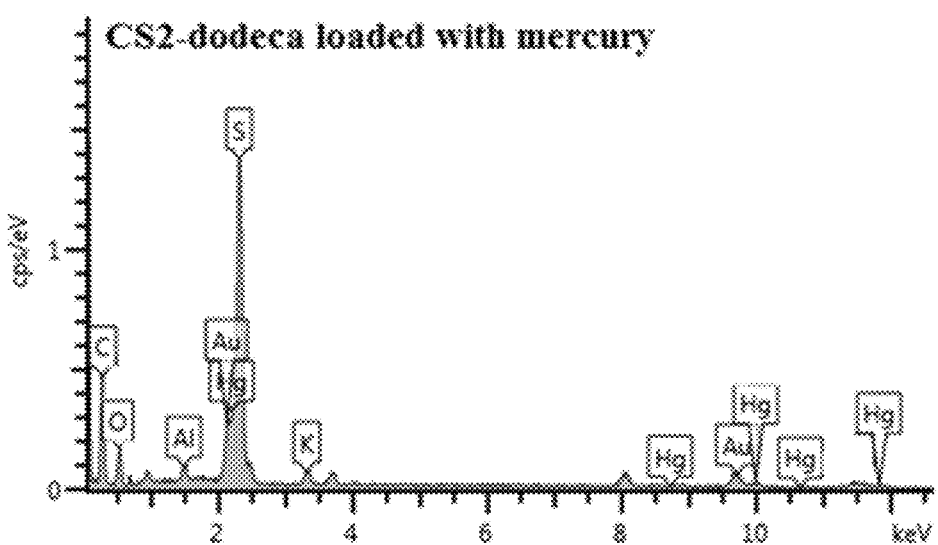
FIG. 26 is a SEM-EDX elemental analysis of a cross-linked polymeric resin of formula (I) wherein $R_1$ is $CS_2^-Z^+$ and n is 12 after loading with Hg(II).
Figure 27:
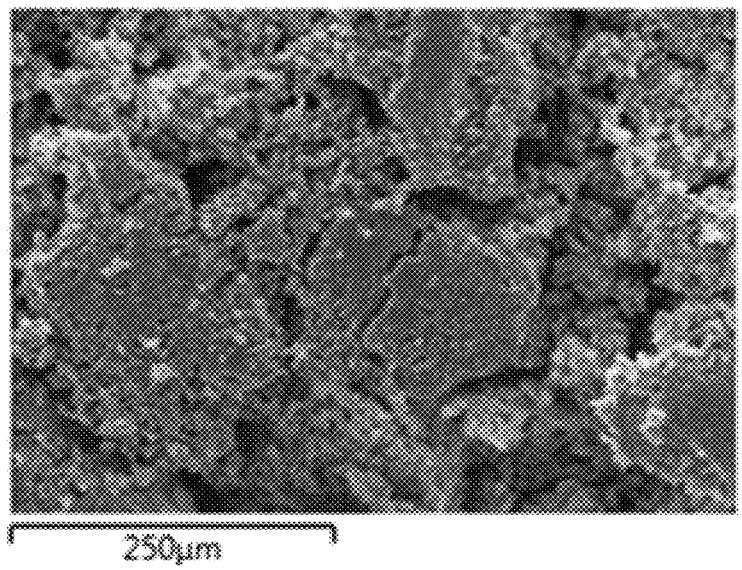
FIG. 27 is a SEM-EDX micrograph image of a cross-linked polymeric resin of formula (I) wherein $R_1$ is $CS_2^-Z^+$ and n is 4.
Figure 28:
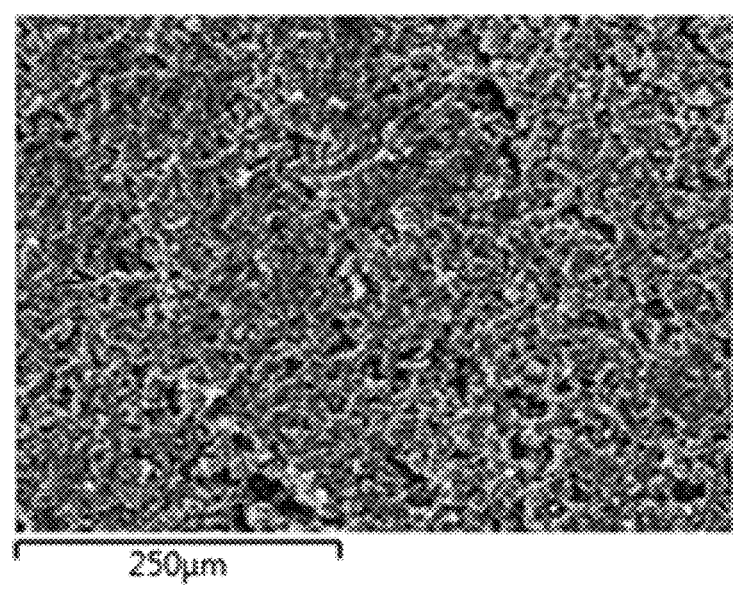
FIG. 28 is a SEM-EDX micrograph image of a cross-linked polymeric resin of formula (I) wherein $R_1$ is $CS_2^-Z^+$ and n is 12.
Figure 29:
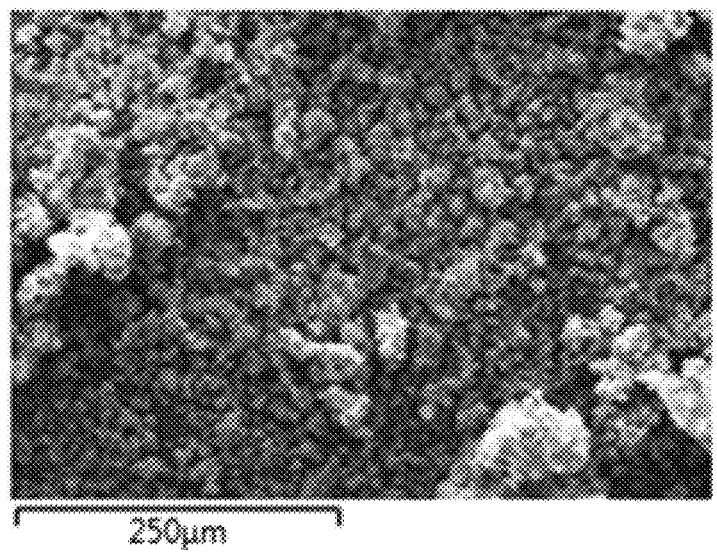
FIG. 29 is a SEM-EDX micrograph image of a cross-linked polymeric resin of formula (I) wherein $R_1$ is $CS_2^-Z^+$ and n is 4 after loading with Hg(II).
Figure 30:
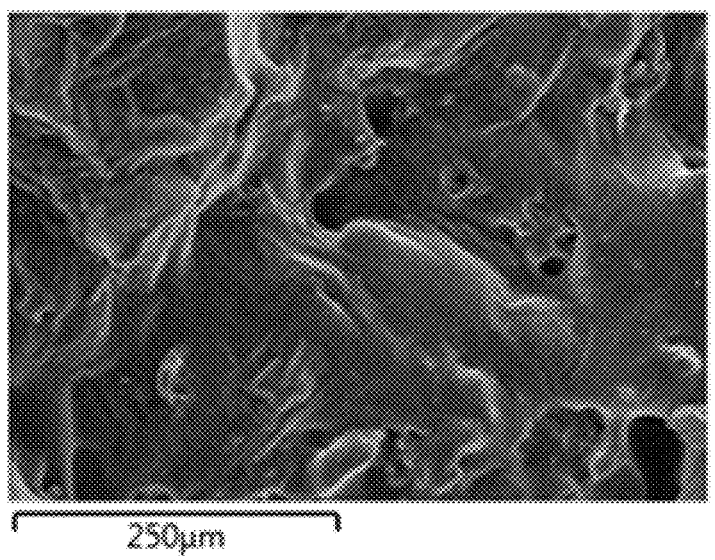
FIG. 30 is a SEM-EDX micrograph image of a cross-linked polymeric resin of formula (I) wherein $R_1$ is $CS_2^-Z^+$ and n is 12 after loading with Hg(II).

In addition, the CS2-buta polymer underwent scanning electron microscopy-energy dispersive X-ray spectroscopy (SEM-EDX) analysis. For comparison, the dithiocarbamate modified polymer with the longest chain length, the CS2-dodeca polymer, underwent the same analysis. Both polymers were examined before and after deposition of Hg(II) ions. Unloaded CS-buta polymer and unloaded CS2-dodeca polymer were immersed in a 0.01 mmol L$^{-1}$ solution of Hg(II) ions and stirred overnight, then filtered and dried at 60° C. under vacuum until a constant weight was reached. The loaded and unloaded dithiocarbamate modified polymers were then coated by sputtering with a thin film of gold before undergoing the SEM-EDX analysis. The successful loading of mercury was confirmed by the EDX spectral analysis shown in comparison of FIG. 23 and FIG. 24 as well as comparison of FIG. 25 and FIG. 26. EDX analysis also shows the successful ion exchange of K ions by Hg(II) ions in the polymers. The unloaded SEM micrographs show that the dithiocarbamate modified polymers are made up of agglomerations of small polymeric structures which appear bulkier as alkyl chain length increases from CS2-buta (FIG. 27 to CS2-dodeca (FIG. 28). After the loading of mercury, the SC2-buta polymer structures appear to have increased in size (FIG. 29) while in the case of the CS2-dodeca polymer the entire polymer surface appears to become rough and fused due to the mercury loading (FIG. 30). The differences in morphology after mercury loading may be due to the different mercury loading capacities of both polymers as CS2-buta seems to have more capacity to mercury due to the less fused nature of the entire polymer.

Example 7

Adsorption Experiments

The dithiocarbamate modified polymer series exhibits excellent affinity towards the removal of Hg(II) ions from simulated wastewater even at Hg concentration as high as 0.1 mmol L$^{-1}$. This affinity can easily be attributed to the known excellent affinity of sulfur compounds towards mercury. There are two sulfur atoms per dithiocarbamate group which participate in the chelation of metal ions; thus, there is an expectation of increased performance for the dithiocarbamate modified polymer series compared to the precursor polyamine series.

Adsorption studies of the DTCP series were performed via two steps; at first, a design of experiment (DOE) was created using the Minitab® software. The DOE method factorial design was conducted to evaluate the interactions and importance of four key factors: methylene chain length of the polymer unit, pH, initial Hg concentration and contact time. The response variable examined in this study is the percentage removal of Hg, which defines the removal efficiency of the prepared polymers. The design of experiment method was employed in this work in order to simultaneously investigate the effect of the multiple factors and their interactions, rather than using one variable at a time experimental procedures that do not give any indication of the interactions between the factors.

The four adsorption determining variables or factors examined are methylene chain length (4, 6, 8, 10, and 12 corresponding to CS2-buta, CS2-hexa, CS2-octa, CS2-deca, and CS2-dodeca), pH (3, 5, and 7), initial Hg(II) concentration (0.1, 0.3, and 0.5 mml L$^{-1}$) and contact time (10, 65, and 120 minutes). Methylene chain length was chosen based on the nature of the units used for the polymer synthesis. The low and high levels of pH were selected as 3 and 7 because at a pH of greater than 7, mercury removal can be accomplished by concomitant precipitation and sorption. The low and high levels of the initial Hg concentrations and contact time were selected based on preliminary results and tentative tests. The type of design was a 2 level factorial (default generators). A number of center points as well as the full factorial design option were chosen. The factors were imputed and the factorial design was created. Table 2 presents the generated data as a result of the design. The adsorption experimental step was the second step, from which the percentage removal (%) was obtained and inputted into the Minitab® software for data generation

TABLE 2

Design matrix of the factorial design and their corresponding percent removal (%)

| Factor | Low level (−1) | High Level (+1) |
|---|---|---|
| (A): Methylene chain length (polymer) | 4 | 12 |
| (B): pH | 3 | 7 |
| (C): Contact time (min) | 20 | 100 |
| (D): Initial Hg concentration (mmol/L) | 0.05 | 0.6 |

| Run | (A): Methylene chain length (polymer) | (B): pH | (C): Contact time (min) | (D): Initial Hg concentration (mmol/L) | Percentage removal (%) |
|---|---|---|---|---|---|
| 1 | CS2-buta (4) | 3 | 10 | 0.1 | 97.50 |
| 2 | CS2-dodeca (12) | 3 | 10 | 0.1 | 71.00 |
| 3 | CS2-buta (4) | 7 | 10 | 0.1 | 99.80 |
| 4 | CS2-dodeca (12) | 7 | 10 | 0.1 | 83.85 |
| 5 | CS2-buta (4) | 3 | 120 | 0.1 | 99.60 |
| 6 | CS2-dodeca (12) | 3 | 120 | 0.1 | 87.15 |
| 7 | CS2-buta (4) | 7 | 120 | 0.1 | 99.50 |
| 8 | CS2-dodeca (12) | 7 | 120 | 0.1 | 89.00 |
| 9 | CS2-buta (4) | 3 | 10 | 0.5 | 13.96 |
| 10 | CS2-dodeca (12) | 3 | 10 | 0.5 | 8.02 |
| 11 | CS2-buta (4) | 7 | 10 | 0.5 | 14.77 |
| 12 | CS2-dodeca (12) | 7 | 10 | 0.5 | 8.43 |
| 13 | CS2-buta (4) | 3 | 120 | 0.5 | 33.89 |
| 14 | CS2-dodeca (12) | 3 | 120 | 0.5 | 17.55 |
| 15 | CS2-buta (4) | 7 | 120 | 0.5 | 33.93 |
| 16 | CS2-dodeca (12) | 7 | 120 | 0.5 | 18.01 |
| 17 | CS2-hexa (6) | 5 | 65 | 0.3 | 52.50 |
| 18 | CS2-octa (8) | 5 | 65 | 0.3 | 50.24 |
| 19 | CS2-deca (10) | 5 | 65 | 0.3 | 51.03 |
| 20 | CS2-octa (8) | 3 | 65 | 0.3 | 50.45 |
| 21 | CS2-hexa (6) | 3 | 65 | 0.3 | 54.49 |
| 22 | CS2-deca (10) | 3 | 65 | 0.3 | 48.51 |
| 23 | CS2-octa (8) | 7 | 65 | 0.3 | 48.20 |
| 24 | CS2-hexa (6) | 7 | 65 | 0.3 | 53.41 |
| 25 | CS2-deca (10) | 7 | 65 | 0.3 | 46.74 |

For a general adsorption experiment, 0.03 g of the dithiocarbamate modified polymer was stirred for a certain period of time in 20 mL of aqueous solution containing a certain concentration of Hg(II) in mmol $L^{-1}$ and at a given pH. The pH of the solutions was adjusted using 0.1 M $HNO_3$ or 0.1 M NaOH. The factorial design was analyzed using the Minitab® software and a confidence limit of 95% was used for the analysis. In the software Normal and Pareto effect plots as well as four-in-one residual plots were selected under the "graphs" section. In addition, two factorial plots were created and labelled the "main effect plot" and the "interaction plot". Contour and surface plots were also generated for a clearer visual representation of the effects of varying the factors had on the adsorption.

In order to clearly choose the best adsorbent amongst the dithiocarbamate modified polymer series, the same procedure of analysis was repeated for each polymer at a pH of 5, and an initial Hg(II) concentration of 0.2 mmol $L^{-1}$ for 65 minutes.

Figure 33:
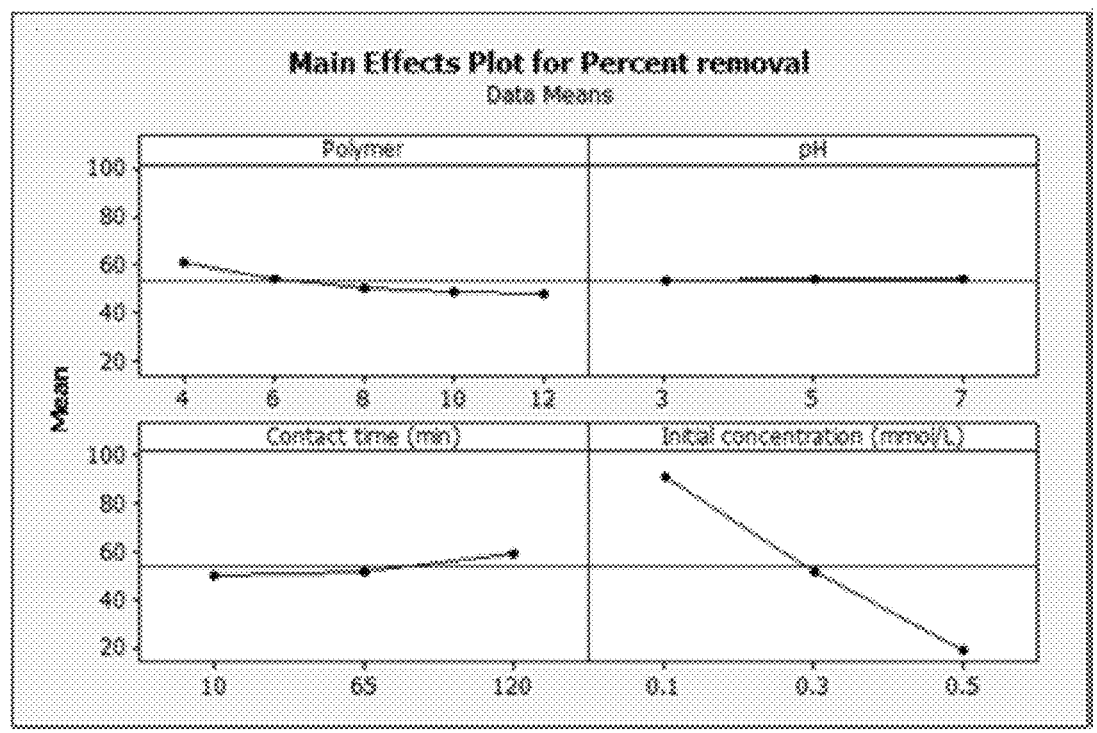
FIG. 33 is a factorial design experiment plot showing a main effects plot for percent removal.
Figure 34:
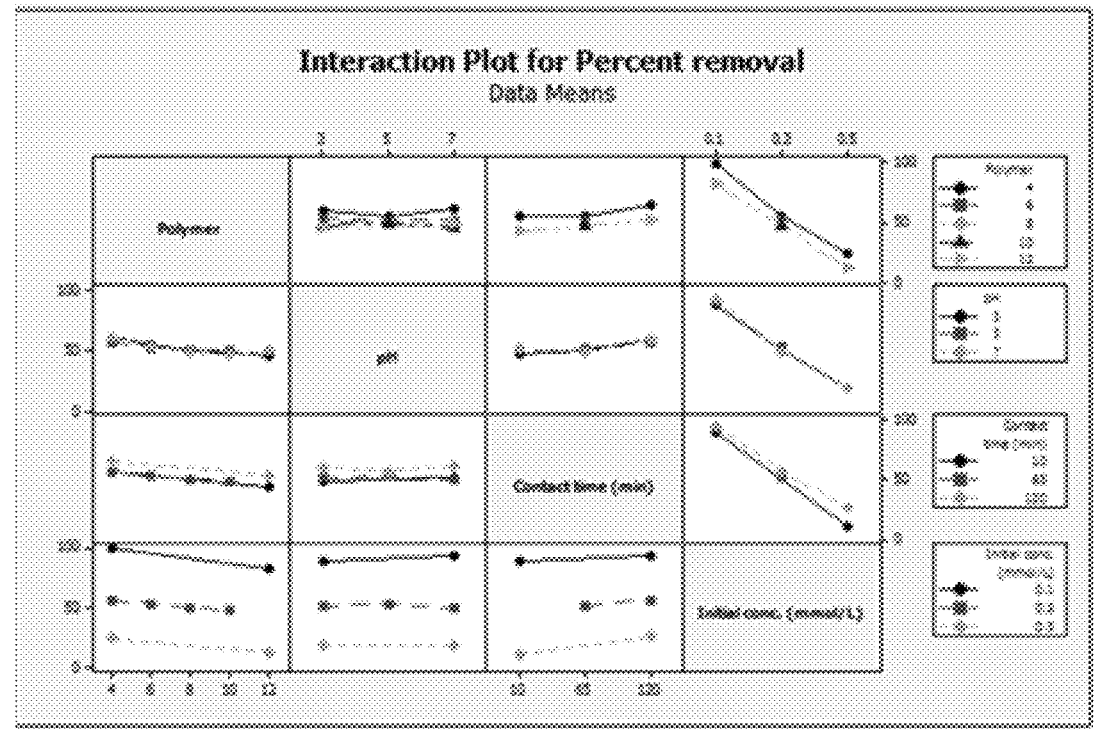
FIG. 34 is a factorial design experiment plot showing an interaction plot for percent removal.

Experiments were conducted according to the generated design and their results were recorded accordingly as "percent removal". The analysis took into account the individual effects of each facto and how they interact with each other. At least 3 points were considered per factor; pH value was 3, 5 and 7; contact times were 10, 65 and 120 minutes; and initial mercury (Hg) concentrations were 0.1, 0.3 and 0.6 mmol/L. Four plots were generated from the analysis of the design, namely: normal plot for the standardized effect (FIG. 31), Pareto chart for the standardized effect (FIG. 32), main effect plot for percentage removal (FIG. 33) and interaction effects for percentage removal (FIG. 34). The normal plot and Pareto chart help to determine the main and interaction factors that have significant effects on the adsorption.

The factorial design results show that apart from the Hg(II) ions initial concentration, the polymer type had the largest effect on mercury removal efficiency. Decreasing the chain length increases the mercury removal efficiency. This behavior may be attributed to the functionality of the dithiocarbamate modified polymer series since the short chain dithiocarbamate modified polymers have relatively more dithiocarbamate groups than the long chain polymers. For the same mass of the polymers, the short chain polymers are likely to have a higher ratio of dithiocarbamate groups to hydrophobic aliphatic chains compared to the long chain polymers in the series.

Figure 31:
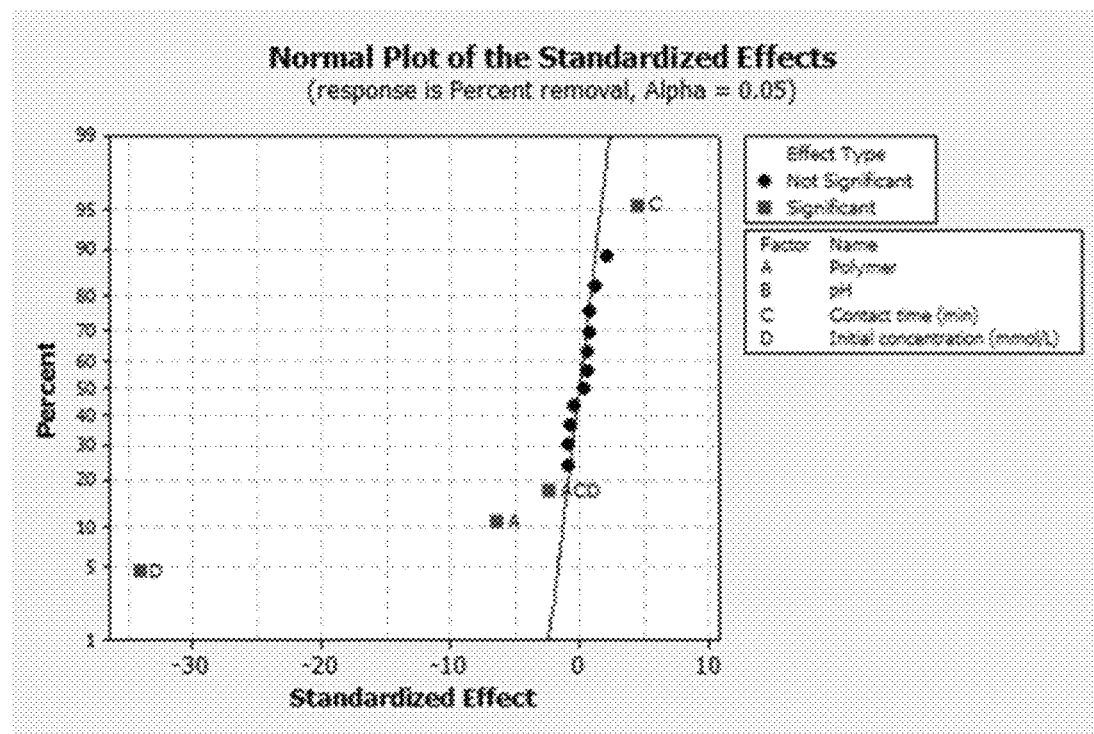
FIG. 31 is a factorial design experiment plot showing a normal plot of standardized effects.
Figure 32:
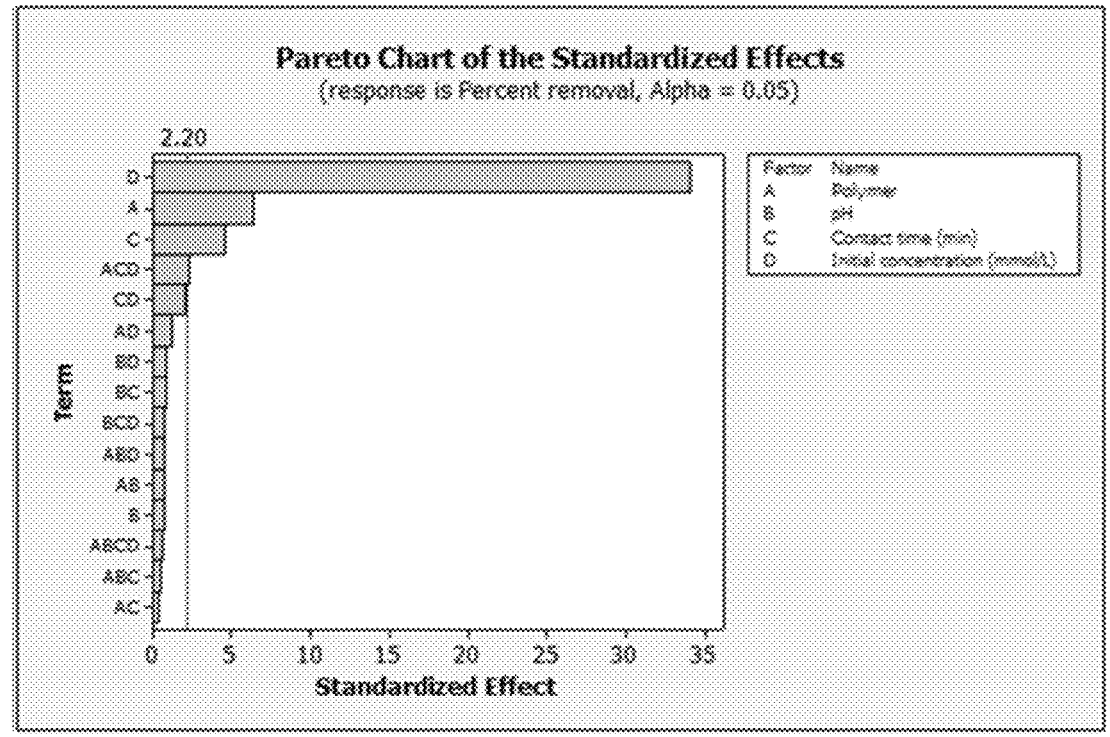
FIG. 32 is a factorial design experiment plot showing a Pareto chart of standardized effects.

The strongest interaction effect was found between the polymer type, contact time and the initial mercury concentration as shown by outliers in FIG. 31. For explanation, each factor is designated by codes [A (polymer, where CS2-buta is 4, CS2-hexa is 6, CS2-octa is 8, CS2-deca is 10, CS2-dodeca is 12), B (pH), C (contact time in minutes), and D (initial concentration of mercury in mmol $L^{-1}$)]. From the normal plot (FIG. 31), A, D, and ACD all have negative effects while C has a positive effect. From the Pareto chart (FIG. 32); D is the most significant main effect followed by A and C, it is thus clear that it is preferable to use the dithiocarbamate modified polymer with the shortest aliphatic chain for Hg(II) ion chelation. Both C and D have positive and negative effects respectively signifying that a longer contact time (i.e. 120 minutes) and a lower initial mercury concentration (i.e. 0.1 mmol $L^{-1}$) favor higher percentage removal by the dithiocarbamate modified polymer series. The only significant interaction effect, ACD, reveals that the dithiocarbamate modified polymer performs better as the initial concentration of Hg(II) ions in solution is decrease from 0.5 to 0.1 mmol $L^{-1}$ while a short chain polymer is preferred with an adsorption contact time of 120 min. These significant main and interaction effects (A, C, D, and ACD) are further represented in a clearer manner by the main effect and interaction effect plots which compile the means of the data (FIG. 33 and FIG. 34). The interaction effect plots confirm the conclusions draw from the normal and Pareto plots. It can be seen clearly in FIG. 26 (first row) that the significant interactions involve the effect of polymer type and response is favored when the polymer type is CS2-buta. From this data, it can be concluded that to achieve the maximum adsorption of Hg(II) ions the most influential factor, which is the polymer type, should be CS2-buta while contact time and initial concentration of Hg(II) ions is preferably 120 minutes and 0.1 mmol $L^{-1}$ respectively.

Figure 35:
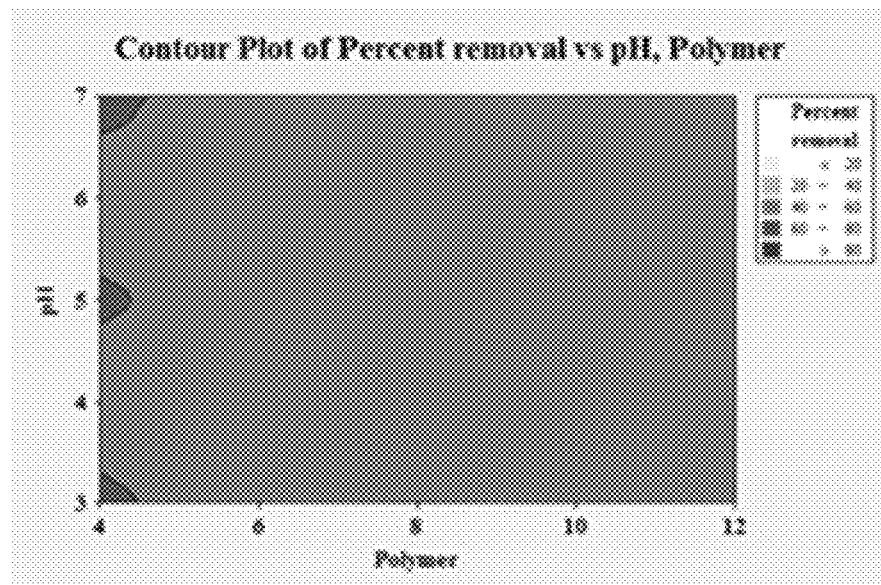
FIG. 35 is a factorial design experiment contour plot illustrating the effect of alkyl chain length of a series of dithiocarbamate modified cross-linked polymeric resins of formula (I) wherein $R_1$ is $—CS_2^-Z^+$ and n=4, 6, 8, 10 or 12 and pH of an aqueous solution on percent removal of Hg(II) from the aqueous solution.

It is noteworthy that the effect of pH is not very pronounced as depicted in FIG. 33, revealing only a slight increase in the overall percentage adsorption as pH is increased from 3 to 7. At a low pH of about 3, there is completion for adsorption sites on the polymers between $H^+$ and Hg(II) ions. As a result, at low values of pH, the $CS_2$ portion of the dithiocarbamate functionality exists as —CSSH thus reducing its affinity towards Hg(II) ions. Alternatively, at higher values of pH, the negative charge on the dithiocarbamate functionality is preserved, thus increasing its affinity towards Hg(II) ions. Another factor to consider is metal speciation. Mercury exists predominately as $Hg^{2+}$ between pH values of 3 and 5 but may exist as $Hg(OH)^+$ at pH values of up to <7 [Babić B M, Milonjić S K, Polovina M J, Čupić S, Kaludjerović B V. Adsorption of zinc, cadmium and mercury ions from aqueous solutions on an activated carbon cloth. Carbon. 2002; 40(7):1109-1115;

and Zhang F-S, Nriagu J O, Itoh H. Mercury removal from water using activated carbons derived from organic sewage sludge. Water Research. 2005; 39(2-3):389-395.—each incorporated herein by reference in its entirety]. It is observed that for short chain dithiocarbamate modified polymers, especially CS2-buta, the effect of pH is a little more pronounced compared to that of the long chain dithiocarbamate modified polymers. This phenomenon is depicted in the contour plot in FIG. 35 which was generated by the Minitab® software which may apply some extrapolations where appropriate. The plot shows that at polymer point 4 (CS2-buta), a higher percentage removal was achieved at pH 3, 5, and 7. This suggests a superior affinity of CS2-buta towards mercury ions which could likely be attributed to high concentration of the dithiocarbamate functionality in the polymer as previously described. For polymer points 6 (CS2-hexa), 8 (CS2-octa), 10 (CS2-deca), and 12 (CS2-dodeca), the contour plot suggests a very minimal effect of pH on the percentage removal showing the same removal efficiency for all polymers (6-12) at all pH values (3-7). Further studies were carried out on CS2-buta at a pH value of 5 in order to avoid interference of the hydroxides of mercury (e.g. $Hg(OH)^+$) on the results.

Figure 36:
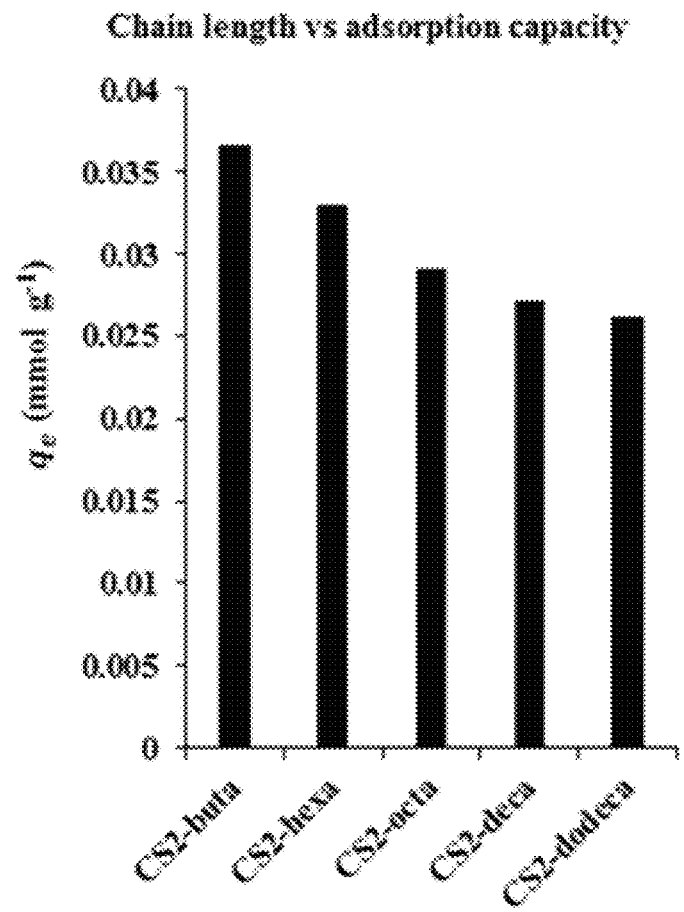
FIG. 36 is a bar graph chart illustrating the relationship between alkyl chain length of a series of dithiocarbamate modified cross-linked polymeric resins of formula (I) wherein $R_1$ is $—CS_2^-Z^+$ and n=4, 6, 8, 10 or 12 and Hg(II) adsorption capacity.

The effect of polymer type is estimated to primarily be dependent on the ratio of the dithiocarbamate functionality to the hydrophilic methylene chain in the dithiocarbamate series. Short chain dithiocarbamate modified polymers will have more dithiocarbamate groups than the long chain ones given the same mass of polymer. This model was tested where 0.03 g of each polymer was stirred in a 20 mL solution of Hg(II) ions at a pH value of 5, and an initial mercury concentration of 0.2 mmol $L^{-1}$ for 65 minutes. The results are presented in the bar chart in FIG. 36 which shows CS2-buta as the best adsorbent relative to other polymers having the highest efficiency in the removal of Hg(II) ions.

On this basis, CS2-buta was chosen as the best adsorbent and further studies were performed on this polymer. Further studies were performed on the removal of Hg(II) ions by the polymer CS2-buta in a fashion similar to an earlier study of polyphosphonate polymers for the removal of lead and copper from an aqueous solution [Al Hamouz O C S, Ali S A. Novel Cross-Linked Polyphosphonate for the Removal of Pb2+ and Cu2+ from Aqueous Solution. Ind Eng Chem Res. 2012; 51(43):14178-14187—incorporated herein by reference in its entirety]. In these further studies a mixture of 0.03 g of the polymer was stirred in a 20 mL solution of Hg(II) ions at an initial concentration of 0.2 mmol $L^{-1}$ with a pH value of 5 for a time period of 150 minutes. The polymer was then filtered and washed with deionized water. The amount of Hg(II) ions in the filtrate was analyzed with a mercury analyzer. The adsorption capacity ($q_e$) in mmol $g^{-1}$ can be determined by the equation of formula (VIII).

$$q_e = \frac{(C_0 - C_f)V}{W} \quad \text{(VIII)}$$

In this equation, $C_0$ and $C_f$ are initial and final concentrations respectively of Hg(II) ions in mmol $L^{-1}$, W is the weight of the dried dithiocarbamate modified polymer in grams (g), and V is the volume of the solution in liters (L). The results obtained represent the average of three runs and varied by less than 5%

Example 8

Effect of Contact Time and Adsorption Kinetic Model Studies

Figure 37:
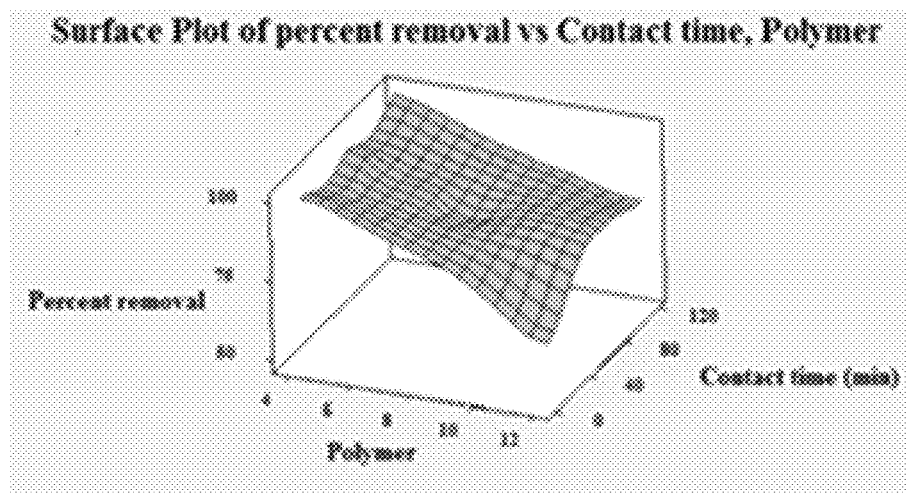
FIG. 37 is a factorial design experiment surface plot illustrating the effect of alkyl chain length of a series of dithiocarbamate modified cross-linked polymeric resins of formula (I) wherein $R_1$ is $—CS_2^-Z^+$ and n=4, 6, 8, 10 or 12 and contact time with an aqueous solution on percent removal of Hg(II) from the aqueous solution.
Figure 38:
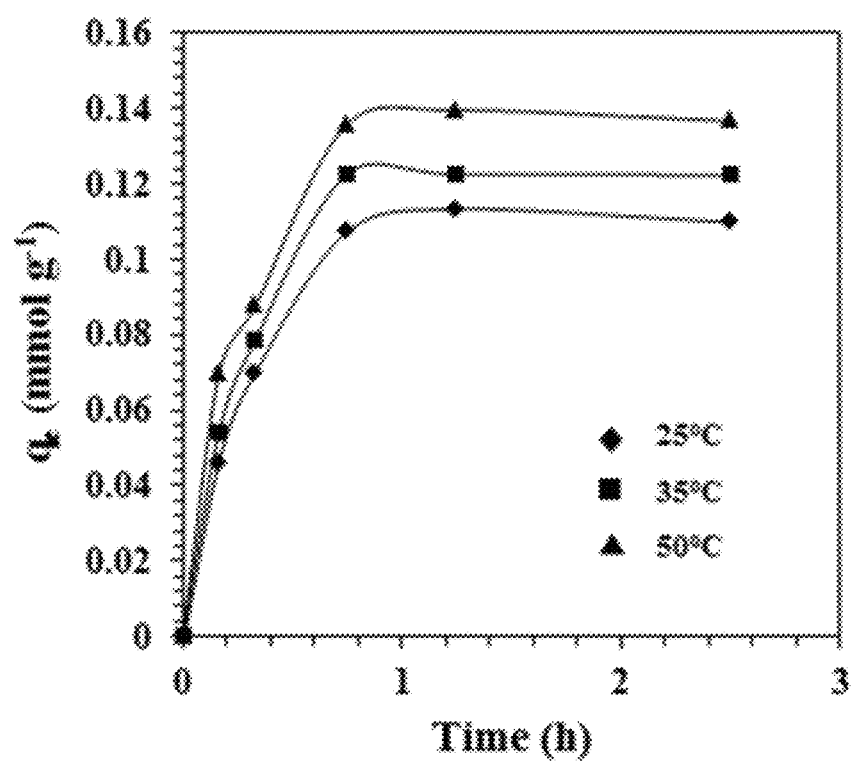
FIG. 38 is a plot illustrating the relationship between contact time of a cross-linked polymeric resin of formula (I) wherein $R_1$ is $CS_2^-Z^+$ and n is 4 and adsorption capacity at a temperature of 25° C., 35° C. and 50° C.

Initially, a relationship between polymer type and contact time was generated from the factorial design as previously described to give a general picture of the pattern of the adsorption. This was represented in the form of a surface plot of the previously described factors against the percent removal (FIG. 37). This surface plot further supports the fact that the best adsorbent is the CS2-buta polymer and also shows that the dithiocarbamate modified polymer series reaches an equilibrium percentage of adsorption at a contact time of less than 40 minutes. The relationship between the adsorption capacity and the contact time at three different temperatures (25° C., 35° C., and 50° C.) was further investigated for CS2-buta. As another factor, the effect of temperature was studied showing that the adsorption capacity increased with increases in temperature indicating that the adsorption process is endothermic in nature (FIG. 38), which could be attributed to the increased swelling by CS2-buta at elevated temperatures, which allows higher amounts of Hg(II) ions to diffuse through the polymer structure [Silvia Martinez-Tapia H, Cabeza A, Bruque S, Pertierra P, Garcia-Granda S, Aranda M A G. Synthesis and Structure of $Na_2[(HO_3PCH_2)_3NH]_{1.5}H_2O$: The First Alkaline Triphosphonate. Journal of Solid State Chemistry. 2000; 151(1):122-129.—incorporated herein by reference in its entirety].

For adsorption kinetics, the CS2-buta polymer was immersed in a 20 mL solution of Hg(II) ions at an initial concentration of 0.2 mmol $L^{-1}$ with a pH value of 5 for different times and at different temperatures (25° C., 35° C., and 50° C.). In order to investigate the potential rate determining step of the adsorption process, two kinetic models were used to investigate the fit of the experimental data at a pH value of 5 and three different temperatures; the pseudo second order kinetic model and the intraparticle diffusion model. The pseudo second order kinetic model is considered to be a good tool to investigate the properties of polymers of this type, while the intraparticle diffusion model is useful in predicting the adsorption mechanism to be either controlled by film diffusion, intraparticle diffusion, or both [He Z-Y, Nie H-L, Branford-White C, Zhu L-M, Zhou Y-T, Zheng Y. Removal of Cu2+ from aqueous solution by adsorption onto a novel activated nylon-based membrane. Bioresour Technol. 2008; 99 (Copyright (C) 2014 American Chemical Society (ACS). All Rights Reserved):7954-7958; and Boparai H K, Joseph M, O'Carroll D M. Kinetics and thermodynamics of cadmium ion removal by adsorption onto nano zerovalent iron particles. J Hazard Mater. 2011; 186 (Copyright (C) 2014 American Chemical Society (ACS). All Rights Reserved):458-465; and Shen S, Guishen L, Pan T, He J, Guo Z. Selective adsorption of Pt ions from chloride solutions obtained by leaching chlorinated spent automotive catalysts on ion exchange resin Diaion W A21J. Journal of Colloid and Interface Science. 2011; 364(2):482-489; and Wu F-C, Tseng R-L, Juang R-S. Initial behavior of intraparticle diffusion model used in the description of adsorption kinetics. Chem Eng J (Amsterdam, Neth). 2009; 153 (Copyright (C) 2014 American Chemical Society (ACS). All Rights Reserved): 1-8.—each incorporated herein by reference in its entirety].

The linear form of the pseudo second order kinetic model can be linearly expressed by formula (IX).

$$\frac{t}{q_t} = \frac{1}{k_2 q_e^2} + \frac{1}{q_e}t \quad \text{(IX)}$$

Figure 39:
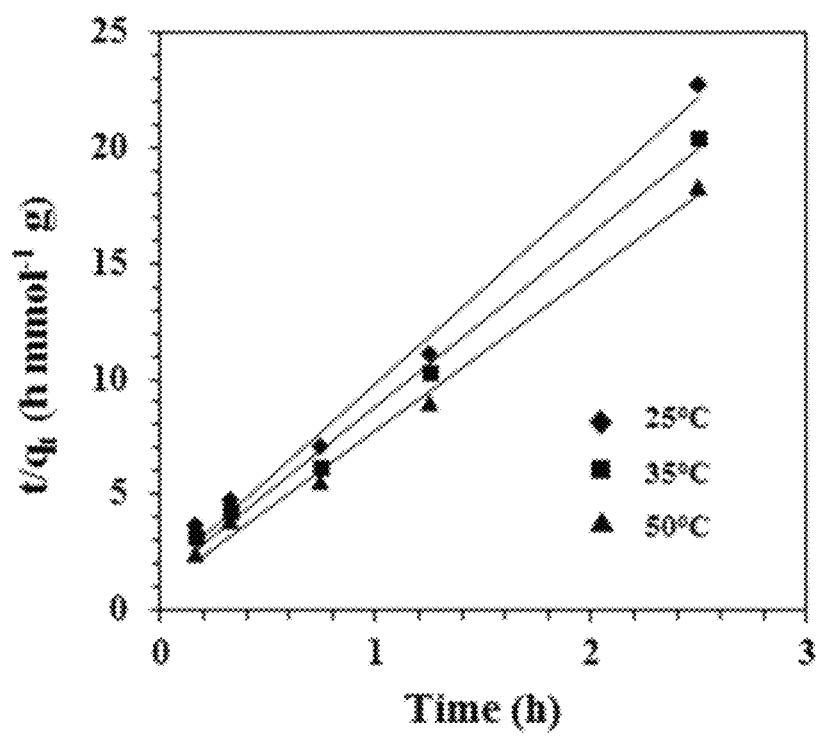
FIG. 39 is a second order kinetic model plot for Hg(II) adsorption on a cross-linked polymeric resin of formula (I) wherein $R_1$ is $CS_2^-Z^+$ and n is 4 at a temperature of 25° C., 35° C. and 50° C.

In this formula, $k_2$ is the pseudo second order rate constant (g mmol$^{-1}$ h$^{-1}$), $q_e$ and $q_t$ are the equilibrium adsorption capacity (mmol g$^{-1}$) and adsorption capacity at time t (mmol g$^{-1}$) respectively, which are found from the slope and intercept of the plot shown in FIG. 39. As shown in FIG. 39 and Table 3, the experimental data fit the pseudo second order kinetic model, suggesting that the adsorption process could be considered as chemical adsorption. By plotting ln $k_2$ versus 1/T, the activation energy for the adsorption process can be found using the Arrhenius equation [Ma X, Li L, Yang L, Su C, Wang K, Yuan S, et al. Adsorption of heavy metal ions using hierarchical CaCO3-maltose meso/macroporous hybrid materials: Adsorption isotherms and kinetic studies. J Hazard Mater. 2012; 209-210 (Copyright (C) 2014 American Chemical Society (ACS). All Rights Reserved):467-477.—incorporated herein by reference in its entirety]. The Arrhenius equation is expressed by formula (X).

$$\ln k_2 = -\frac{E_a}{RT} + \text{constant} \quad (X)$$

Figure 40:
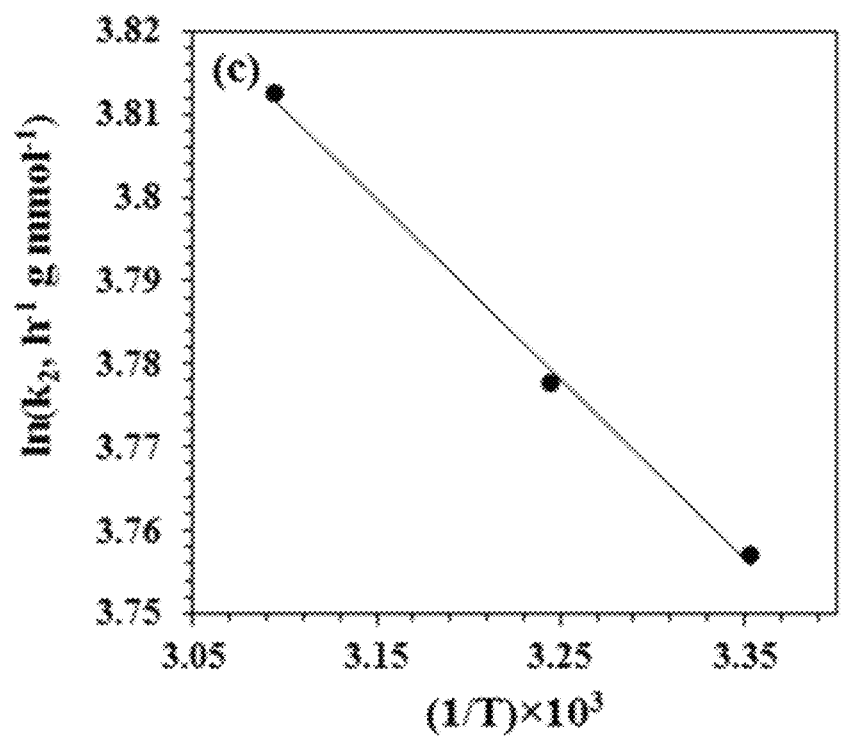
FIG. 40 is an Arrhenius plot for Hg(II) adsorption on a cross-linked polymeric resin of formula (I) wherein $R_1$ is $CS_2^-Z^+$ and n is 4 for determining the activation energy of the process.

From the plot shown in FIG. 40, the activation energy ($E_a$) is found to be 0.98 kJ/mol for the adsorption of Hg(II) by the CS2-buta polymer. The low activation energy indicates that the adsorption process is favorable.

diffusion, with reasonable regression values (Table 3) until adsorption reaches equilibrium.

Example 9

Effect of Initial Concentration and Isotherm Model Studies

Figure 42:
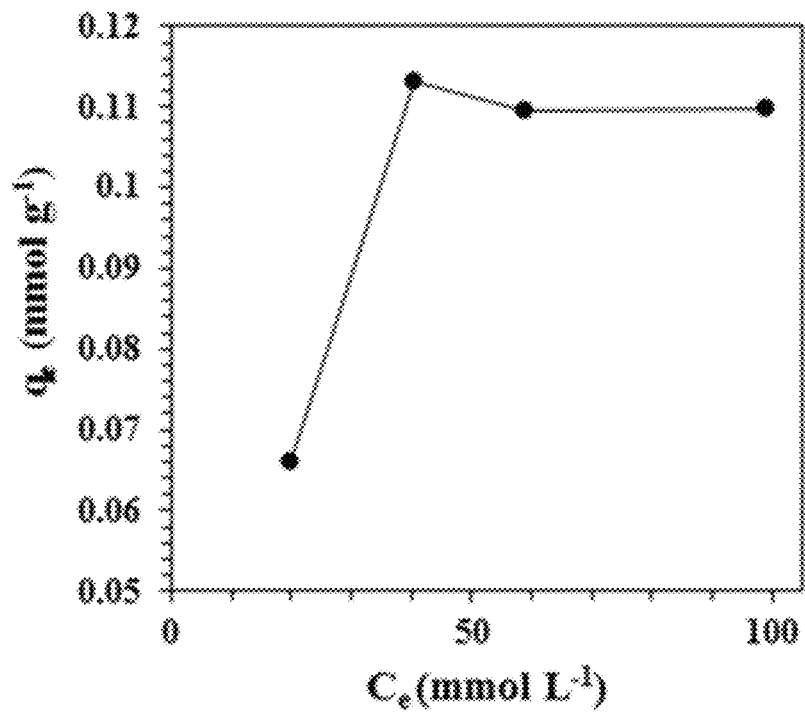
FIG. 42 is a plot illustrating the relationship between initial concentration of Hg(II) ions and the adsorption capacity of a cross-linked polymeric resin of formula (I) wherein $R_1$ is $CS_2^-Z^+$ and n is 4.

The adsorption isotherm was constructed by changing the initial concentration of the Hg(II) ion solution held at 25° C. for 150 minutes. The effect of initial concentration of Hg(II) ions was investigated in a range of 0.1 mmol L$^{-1}$ to 0.5 mmol L$^{-1}$. As shown in FIG. 42, the adsorption capacity increases until it reaches and equilibrium with a maximum adsorption capacity of ~0.11 mmol g$^{-1}$. To further investigate the adsorption mechanism, two isotherm models were utilized; the Lanmuir and the Freundlich isotherm models [Kampalanonwat P, Supaphol P. Preparation and adsorption behavior of aminated electrospun polyacrylonitrile nanofiber mats for heavy metal ion removal. ACS Appl Mater Interfaces. 2010; 2 (Copyright (C) 2014 American Chemical Society (ACS). All Rights Reserved):3619-3627; and Chen Y, He M, Wang C, Wei Y. A novel polyvinyltetrazole-grafted resin with high capacity for adsorption of Pb(ii), Cu(ii) and Cr(iii) ions from aqueous solutions. Journal of Materials Chemistry A. 2014; 2(27):10444-10453.—each incorporated herein by reference in its entirety]. The Langmuir isotherm model assumes monolayer adsorption where one

TABLE 3

Second order kinetic model and intraparticle diffusion kinetic model constants

| Temp. (° C.) | $q_e$, exp. (mmol g$^{-1}$) | $q_e$, calc. (mmol g$^{-1}$) | Pseudo second order model | | | Intraparticle diffusion model | |
|---|---|---|---|---|---|---|---|
| | | | $K_2$ (g mmol$^{-1}$ h$^{-1}$) | $h^a$ (g mmol$^{-1}$ h$^{-1}$) | $R^2$ | $K_i$ (g mmol$^{-1}$ h$^{0.5}$) | $R^2$ |
| 25° C. | 0.1098 | 0.1213 | 42.81 | 0.6300 | 0.9906 | 0.1574 | 0.9957 |
| 35° C. | 0.1223 | 0.1337 | 43.71 | 0.7518 | 0.9926 | 0.1390 | 0.9983 |
| 50° C. | 0.1367 | 0.1470 | 45.26 | 0.9780 | 0.9935 | 0.1217 | 0.9962 |

$^a h = k_2 q_e^2$ (initial rate of adsorption)

Figure 41:
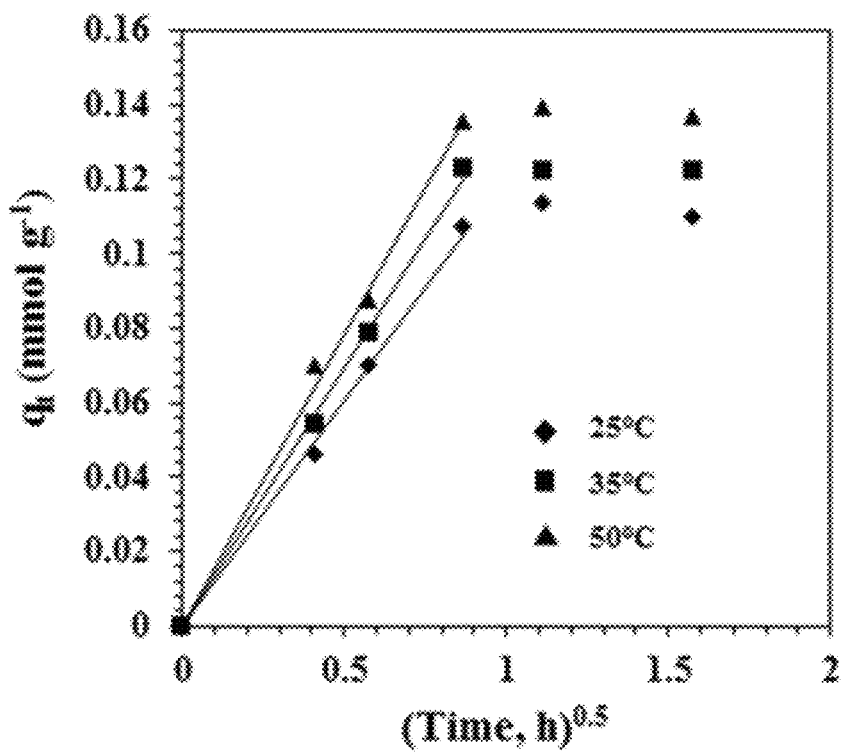
FIG. 41 is an intraparticle diffusion model plot for Hg(II) adsorption on a cross-linked polymeric resin of formula (I) wherein $R_1$ is $CS_2^-Z^+$ and n is 4 at a temperature of 25° C., 35° C. and 50° C.

The adsorption mechanism for the adsorption of Hg(II) ions by the CS2-buta polymer was investigated by the intraparticle diffusion model which describes the adsorption process in three consecutive steps: i) film diffusion, the diffusion of metal ions through a liquid film surrounding the adsorbate, ii) intraparticle diffusion, the diffusion of polymer structures through the pores of the adsorbent, and iii) mass action, the adsorption and desorption of metal ions between the active sites and adsorbate. As can be seen in FIG. 41, the adsorption of Hg(II) ions by the CS2-buta polymer is relatively fast and reaches equilibrium within 40 minutes, indicating that the adsorption process is controlled by either film diffusion or intraparticle diffusion and subsequently reaching equilibrium. The linear form of the intraparticle diffusion model can be express by formula (XI).

$$q_t = k_i t^{0.5} + C \quad (XI):$$

In this formula, $k_i$ is the rate constant in the intraparticle diffusion model (mmol g$^{-1}$ h$^{0.5}$) and C is a constant related to boundary layer thickness. According to the intraparticle diffusion model, the rate determining step can be controlled by intraparticle diffusion if the experimental data first the model and the plots passes through the origin. As can be seen from FIG. 41, the adsorption mechanism of Hg(II) ions by the CS2-buta polymer is solely controlled by intraparticle metal ion occupies one active site on the polymer surface. The linear form of the Langmuir isotherm model can be expressed by formula (XII).

$$\frac{C_e}{q_e} = \frac{C_e}{Q_m} + \frac{1}{Q_m b} \quad (XII)$$

Figure 43:
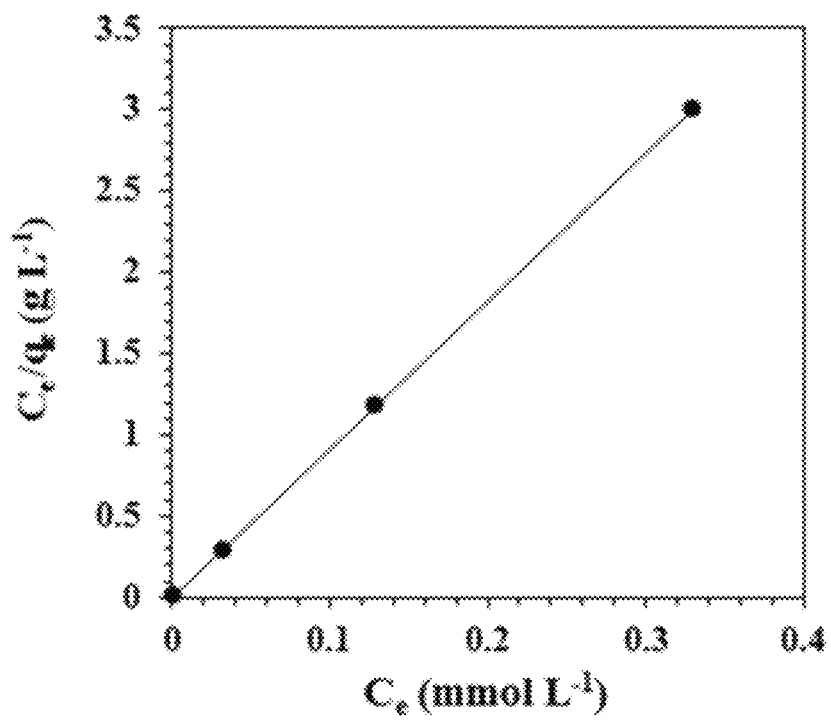
FIG. 43 is a Langmuir adsorption isotherm for Hg(II) adsorption on a cross-linked polymeric resin of formula (I) wherein $R_1$ is $CS_2^-Z^+$ and n is 4.

In this formula, $Q_m$ is the maximum adsorption capacity (mmol g$^{-1}$), and b is the Langmuir constant related to adsorption energy (L mmol$^{-1}$). Qm and b can be calculated from the slope and intercept from a plot of $C_e/q_e$ versus Ce. As shown in FIG. 43 and Table 4, the experimental data fits the Langmuir model with a regression coefficient reaching unity, assuming that the adsorption process is monolayer adsorption. Table 5 shows the efficiency of the synthesized polydithiocarbamates compared with reference adsorbents used for the removal of Hg(II) ions [Tran L, Wu P, Zhu Y, Yang L, Zhu N. Highly enhanced adsorption for the removal of Hg(II) from aqueous solution by Mercaptoethylamine/Mercaptopropyltrimethoxysilane functionalized vermiculites. Journal of Colloid and Interface Science. 2015; 445 (0):348-356; and Bayen S P, Chowdhury P. Synthesis of chromatographic material by immobilization of thioacetamide onto silica gel for easy detection and removal of mercury. Journal of Environmental Chemical Engineering. 2015; 3(1):70-78; and Jafari S A, Cheraghi S. Mercury removal from aqueous solution by dried biomass of indigenous *Vibrio parahaemolyticus* PG02: Kinetic, equilibrium, and thermodynamic studies. International Biodeterioration & Biodegradation. 2014; 92(0):12-19; and Yetimoğlu E K, Kahraman M V, Bayramoğlu G, Ercan Ö, Apohan N K. Sulfathiazole-based novel UV-cured hydrogel sorbents for mercury removal from aqueous solutions. Radiation Physics and Chemistry. 2009; 78(2):92-97; and Song B Y, Eom Y, Lee T G. Removal and recovery of mercury from aqueous solution using magnetic silica nanocomposites. Applied Surface Science. 2011; 257(10):4754-4759.—each incorporated herein by reference in its entirety].

TABLE 4

Langmuir isotherm model and Freundlich isotherm model constants for Hg(II) ions adsorpotion

| Crosslinked DTCP | Langmuir isotherm model | | | Freundlich isotherm model | | |
|---|---|---|---|---|---|---|
| | $Q_m$ (mmol g$^{-1}$) | b (L mmol$^{-1}$) | $R^2$ | $k_f$ (mmol$^{1-1/n}$ g$^{-1}$ L$^{1/n}$) | n | $R^2$ |
| CS2-buta | 0.1098 | −6072 | 1.000 | 0.1310 | 9.111 | 0.8549 |

TABLE 5

Comparison between the dithiocarbamate modified polymer CS2-buta and other known adsorbents

| Adsorbent | $Q_m$ mg g$^{-1}$ (mmol g$^{-1}$) |
|---|---|
| Mercaptoethylamine/ Mercaptopropyltrimethyloxysilane functionalized vermiculites | 0.099-0.29 (4.94 × 10$^{-4}$-1.45 × 10$^{-3}$) |
| Immobilization of thioacetamide onto silica gel | 17.50 (0.0872) |
| Dried biomass of Vibrio parahaemolyticus | 0.164 (8.18 × 10$^{-4}$) |
| Sulfathiazole based novel UV cured hydrogel | 13.46 (0.0671) |
| Magnetic silica nanocomposite | 19.79 (0.0987) |
| Novel polydithiocarbamate | 22.03 (0.1098) |

In contrast, the Freundlich model assumes that the adsorption process is heterogeneous with uniform energy distribution [Zhu Y, Hu J, Wang J. Competitive adsorption of Pb(II), Cu(II) and Zn(II) onto xanthate-modified magnetic chitosan. J Hazard Mater. 2012; 221-222 (Copyright (C) 2014 American Chemical Society (ACS). All Rights Reserved):155-161; and Azarudeen R S, Subha R, Jeyakumar D, Burkanudeen A R. Batch separation studies for the removal of heavy metal ions using a chelating terpolymer: Synthesis, characterization and isotherm models. Sep Purif Technol. 2013; 116 (Copyright (C) 2014 American Chemical Society (ACS). All Rights Reserved):366-377.—each incorporated herein by reference in its entirety]. The linear form of the Freundlich isotherm model can be represented by formula (XIII).

$$\log q_e = \log k_f + \frac{1}{n} \log C_e \quad \text{(XIII)}$$

Figure 44:
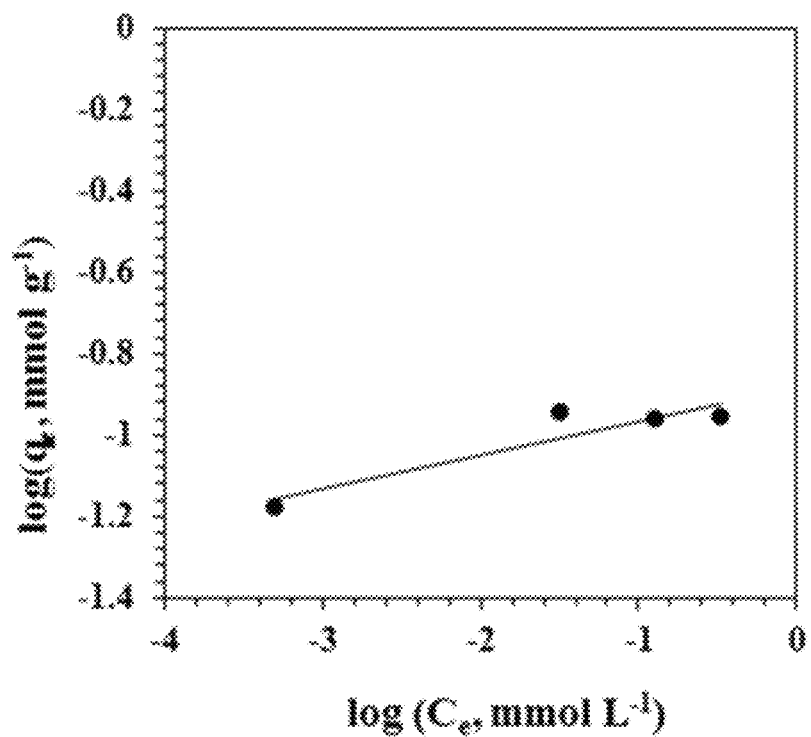
FIG. 44 is a Freundlich adsorption isotherm for Hg(II) adsorption on a cross-linked polymeric resin of formula (I) wherein $R_1$ is $CS_2^-Z^+$ and n is 4.

In this formula, $k_f$ and n are Freundlich constants and are calculated from the slope and intercept of the plot of log $q_e$ versus log $C_e$ as shown in FIG. 44. As shown in Table 4, the experimental data did not fit the isotherm model with a poor regression value of ~0.8.

Based on the data from the adsorption kinetic and adsorption isotherm experiments, the activation energy for the adsorption process and thermodynamic parameters ΔG, ΔH, and ΔS for Hg(II) ion removal process were calculated. The thermodynamic parameters ΔG, ΔH and ΔS can be calculated using the linear form of the Vant-Hoff equation expressed as formula (XIV).

$$\log\left(\frac{q_e}{C_e}\right) = -\frac{\Delta H}{2.303RT} + \frac{\Delta S}{2.303R} \quad \text{(XIV)}$$

Figure 45:
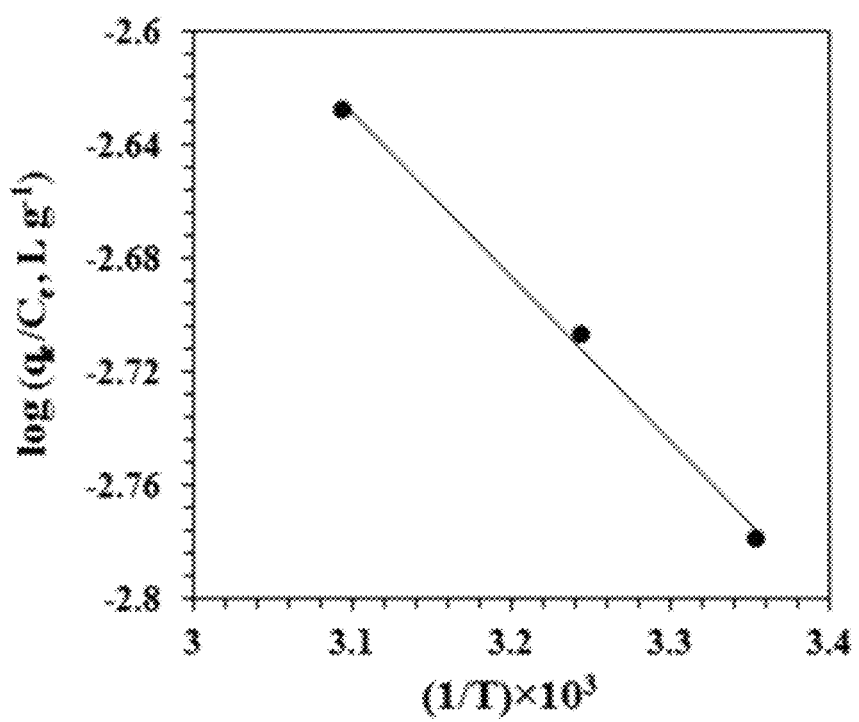
FIG. 45 is a Vant-Hoff plot for calculating thermodynamic parameters of Hg(II) adsorption on a cross-linked polymeric resin of formula (I) wherein $R_1$ is $CS_2^-Z^+$ and n is 4.

A plot of log ($q_e/C_e$) versus 1/T as shown in FIG. 45, from this plot ΔH and ΔS can be calculated from the slope and the intercept. From the results which are shown in Table 6, the adsorption process was found to be endothermic in nature with a positive ΔH. The entropy ΔS was also found to be positive which may be attributed to the release of hydration water molecules [Mahdavi S, Jalali M, Afkhami A. Heavy metals removal from aqueous solutions using TiO2, MgO, and Al2O3 nanoparticles. Chem Eng Commun. 2013; 200 (Copyright (C) 2014 American Chemical Society (ACS). All Rights Reserved):448-470; and Unuabonah E I, Adebowale K O, Olu-Owolabi B I. Kinetic and thermodynamic studies of the adsorption of lead (II) ions onto phosphate-modified kaolinite clay. J Hazard Mater. 2007; 144 (Copyright (C) 2014 American Chemical Society (ACS). All Rights Reserved):386-395.—each incorporated herein by reference in its entirety]. The negative ΔG values prove the spontaneity of the adsorption process, also as the temperature increases the negative values of ΔG become more negative indicating higher efficiency at higher temperatures.

TABLE 6

Thermodynamic data and activation energy for the adsorption of Hg(II) ions onto the CS2-buta polymer

| Metal ion | Temperature (° C.) | ΔG (kJ/mol) | ΔH (kJ/mol) | ΔS (J/mol K) | $R^2$ |
|---|---|---|---|---|---|
| Hg$^{2+}$ | 25 | −3.636 | 11.11 | 12.24 | 0.9956 |
| | 35 | −3.758 | | | |
| | 50 | −3.942 | | | |

Example 10

Desorption Experiments

Recycling and reuse are determining factors towards the effective usage of an adsorbent in industry. Desorption experiments were conducted. A desorption experiment was carried out by stirring 0.050 g of CS2-buta in 50 mL of a Hg(II) ion solution having a concentration of 0.1 mmol L$^{-1}$ for 24 hours. The loaded polymer was thereafter filtered, dried to constant weight and immersed in a 0.1 M HNO$_3$ solution for 24 hours. The solution was then filtered and the amount of Hg(II) ions desorbed in the filtrate was determined. The polymers efficiency for the process was calculated by the ratio of the amount of Hg(II) ions desorbed to the amount of Hg(II) ions initially absorbed as described by formula (XV).

$$\text{Polymer Efficiency} = \left(\frac{Hg \text{ adsorbed} - Hg \text{ released}}{Hg \text{ adsorbed}} \times 100\right)\% \quad (XV)$$

The results showed the percentage efficiency of the desorption process was 78.4% for the CS2-buta polymer. This additionally confirms the superior affinity of the CS2-buta polymer towards Hg(II) ions.

Example 11

Treatment of Wastewater Samples

It is necessary to test the applicability of adsorbents towards the removal of heavy metals from real wastewater samples. Two wastewater samples (unspiked and spiked with 2 mg L$^{-1}$ Hg(II)) were utilized to test the efficiency of CS2-buta. Treatment of real wastewater samples was performed by immersing 0.03 g of the polymer CS2-buta in a 20 mL solution of spiked (with 2 mg L-1) and unspiked wastewater samples and allowing them to stir for 24 hours at room temperature. The metal concentration before and after treatment were analyzed by a mercury analyzer. Two wastewater samples (unspiked and spiked with 2 mg L$^{-1}$ Hg(II)) were utilized to test the efficiency of CS2-buta. CS2-buta demonstrated excellent selectivity and efficiency in the removal of Hg(II) ions from wastewater samples with a percentage removal of 99.88% for the spiked wastewater. CS2-buta also showed a demonstrative chelating ability towards other heavy metal ions present in the spiked wastewater such as Cu, Zn, Mn, Fe, Pb, and Ni with percentage removal values of 990.33%, 990.67%, 98.29, 960.05%, 100% and 98.6% respectively. Similarly, the removal efficiency demonstrated by CS2-buta towards the removal of toxic metal ions from unspiked wastewater was equally as impressive as the results observed for the spiked wastewater sample showing similar percentages of removal for most of the heavy metal ion species. Table 7 summarizes the results of treatment with CS2-buta for the unspiked wastewater sample. Table 8 summarizes the results of treatment with CS2-buta for the spiked (with 2 mg L$^{-1}$ Hg(II)) wastewater sample. Overall, the results obtained validate that CS2-buta has excellent potential as an adsorbent for the treatment of aqueous and wastewater solutions.

TABLE 7

Results of metal concentration before and after treatment with CS2-buta in wastewater samples obtained from a water treatment plant (Doha, Saudi Arabia)

| Dithiocarbamate Modified Polymer | Metal | Original Sample (μg L$^{-1}$) | After Treatment (μg L$^{-1}$) | Percentage removal (%) |
|---|---|---|---|---|
| CS2-buta (4) | Co | 1.269 ± 0.004 | 0.443 ± 0.003 | 65.09 |
| | Cu | 1189.000 ± 7.061 | 28.93 ± 11.11 | 97.57 |
| | Zn | 1001.000 ± 4.667 | 12.17 ± 1.063 | 98.78 |
| | As | 5.839 ± 0.04 | 5.494 ± 4.41 | 5.91 |
| | Mn | 103.200 ± 0.004 | 4.592 ± 0.018 | 95.55 |
| | Mo | 23.51 ± 0.152 | 22.48 ± 0.152 | 4.38 |
| | Fe | 1471.000 ± 16.020 | 55.860 ± 5.811 | 96.20 |
| | Pb | 39.39 ± 0.17 | < MDL | ~100.00 |
| | Hg | 4.694 ± 0.401 | 2.189 ± 0.174 | 53.37 |
| | Ni | 316.7 ± 1.891 | 7.328 ± 0.206 | 97.69 |

Mean and standard deviation of triplicates (n = 3). Values of (+) are the minimum detection limit (MDL), 3σ of a blank sample.

TABLE 8

Results of metal concentration before and after treatment with CS2-buta in spiked (with 2 mg L$^{-1}$ mercury (II)) wastewater samples obtained from a water treatment plant (Doha, Saudi Arabia)

| Dithiocarbamate Modified Polymer | Metal | Original Sample (μg L$^{-1}$) | After Treatment (μg L$^{-1}$) | Percentage removal (%) |
|---|---|---|---|---|
| CS2-buta (4) | Co | 1.269 ± 0.004 | 0.361 ± 0.003 | 71.55 |
| | Cu | 1189.000 ± 7.061 | 7.96 ± 1.513 | 99.33 |
| | Zn | 1001.000 ± 4.667 | 3.267 ± 0.323 | 99.67 |
| | As | 5.839 ± 0.04 | 5.403 ± 0.03 | 7.47 |
| | Mn | 103.200 ± 0.004 | 1.769 ± 0.055 | 98.29 |
| | Mo | 23.51 ± 0.152 | 23.97 ± 0.267 | ~0.00 |
| | Fe | 1471.000 ± 16.020 | 58.060 ± 3.605 | 96.05 |
| | Pb | 39.39 ± 0.17 | < MDL | ~100.00 |

TABLE 8-continued

Results of metal concentration before and after treatment with CS2-buta in spiked (with 2 mg L$^{-1}$ mercury (II)) wastewater samples obtained from a water treatment plant (Doha, Saudi Arabia)

| Dithiocarbamate Modified Polymer | Metal | Original Sample (μg L$^{-1}$) | After Treatment (μg L$^{-1}$) | Percentage removal (%) |
|---|---|---|---|---|
| | Hg (spiked) | 2045.29 ± 15.010 | 2.483 ± 0.083 | 99.88 |
| | Ni | 316.7 ± 1.891 | 4.32 ± 0.067 | 98.64 |

Mean and standard deviation of triplicates (n = 3). Values of (±) are the minimum detection limit (MDL), 3σ of a blank sample.

Thus, a novel series of polyamines were synthesized via Mannich-type polycondensation reaction and then modified with carbon disulfide to convert the amine groups into dithiocarbamate groups, whose successful incorporation were confirmed by FT-IR and NMR studies. Detailed AFM studies after ultrasonication suggest that the CS2-buta polymer was dispersed into small nanometer sized structures, which may explain the demonstrated improved affinity of the polymer towards Hg(II) ions and other heavy toxic metals. The selectivity towards Hg(II) ions can be attributed to the presence of dithiocarbamate groups in the polymer. Upon application to real wastewater samples, CS2-buta showed high selectivity and efficacy in the removal of Cu, Zn, Mn, Fe, Pb, and Ni ions with percentage removal values of 99.33%, 990.67%, 980.28%, 960.05%, 100% and 98.6% respectively. The synthesized dithiocarbamate polymers, especially CS2-buta, showed high potential for applications as a new industrial adsorbent for wastewater treatment.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A cross-linked polymeric resin of formula (I)

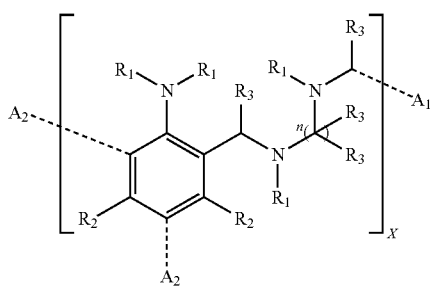

(I)

or a salt, solvate, tautomer or stereoisomer thereof;
wherein, each $R_1$ is independently H, —$CS_2^-Z^+$, an alkyl, a cycloalkyl, or an aryl with the proviso that at least one $R_1$ is —$CS_2^-Z^+$;
each $R_2$ is independently H, —F, —Cl, —Br, —CN, —$OR_3$, an alkyl, a cycloalkyl, or an aryl;
each $R_3$ is independently —H, an alkyl, a cycloalkyl, or an aryl;
Z is —H or an alkali metal counter ion;
n is a positive whole number in the range of 2-16;
X is a positive whole number; and
$A_1$ forms a bond to $A_2$.

2. The cross-linked polymeric resin of claim 1, wherein each $R_1$ is —$CS_2^-Z^+$.

3. The cross-linked polymeric resin of claim 1, wherein the compound of formula (I) is

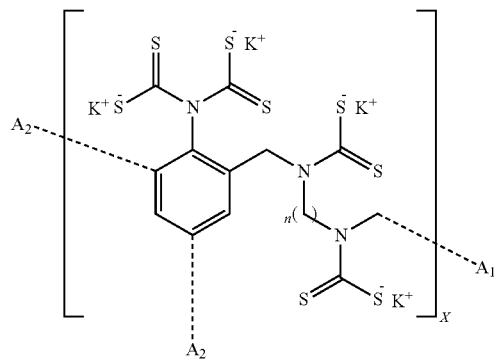

or a salt, solvate, tautomer or stereoisomer thereof;
wherein, n is a positive whole number in the range of 4-12;
X is a positive whole number; and
$A_1$ forms a bond to $A_2$.

4. The cross-linked polymeric resin of claim 1, which is in the form of polyhedral nanometer sized structures having an average width in the range of 10 to 30 nm and an average height in the range of 4-16 Å.

5. The cross-linked polymeric resin of claim 1, which has a BET surface area in the range of 2.0 to 15.0 m$^2$ g$^{-1}$.

6. A process for producing the cross-linked polymeric resin of claim 1, comprising:
reacting an aniline compound with a diaminoalkane compound in the presence of an aldehyde to form the cross-linked polymeric resin wherein $R_1$ is —H; and
reacting the cross-linked polymeric resin wherein $R_1$ is —H with carbon disulfide in the presence of an alkali metal hydroxide to form the cross-linked polymeric resin wherein at least one $R_1$ is $CS_2^-Z^+$.

7. The process of claim 6, wherein the molar ratio of the aldehyde to the aniline compound is in the range of 4:1 to 8:1.

8. The process of claim 6, wherein the molar ratio of the diaminoalkane compound to the aniline compound is in the range of 1:1 to 5:1.

9. The process of claim 6, wherein the aniline compound is aniline, the aldehyde is paraformaldehyde and the diaminoalkane compound is at least one selected from the group consisting of 1,4-diaminobutane, 1,6-diaminohexane, 1,8-diaminooctane, 1,10-diaminodecane, and 1,12-diaminododecane.

10. A method for removing a heavy metal from an aqueous solution, comprising:
   contacting the cross-linked polymeric resin of claim 1 with the aqueous solution comprising the heavy metal; and
   adsorbing the heavy metal onto the cross-linked polymeric resin to form a heavy metal loaded cross-linked polymeric resin.

11. The method of claim 10, further comprising:
   desorbing the heavy metal from the heavy metal loaded cross-linked polymeric resin by treating with an acid to reform the cross-linked polymeric resin; and
   reusing the cross-linked polymeric resin up to 15 times without a loss in adsorption capacity.

12. The method of claim 10, wherein the heavy metal is at least one ion selected from the group consisting of Hg, Cu, Zn, Mn, Fe, and Ni.

13. The method of claim 10, wherein the heavy metal is Hg(II).

14. The method of claim 10, wherein the cross-linked polymeric resin has an adsorption capacity in the range of 15-35 mg of the heavy metal per g of the cross-linked polymeric resin.

15. The method of claim 10, wherein the aqueous solution has a pH in the range of 2 to 8.

16. The method of claim 10, wherein the aqueous solution has an initial heavy metal concentration in the range of 0.05 mmol $L^{-1}$ to 1.0 mmol $L^{-1}$.

17. The method of claim 10, wherein the cross-linked polymeric resin is present at a concentration in the range of 0.02-5.0 g of the cross-linked polymeric resin per L of the aqueous solution during the contacting.

18. The method of claim 10, wherein the cross-linked polymeric resin is contacted with the aqueous solution for 0.1 to 24 hours.

19. The method of claim 10, wherein the contacting is performed at a temperature in the range of 20° C. to 60° C.

20. The method of claim 10, wherein greater than 90% of the total mass of the heavy metal is removed from the aqueous solution.

* * * * *